US007227821B2

(12) United States Patent
Horii et al.

(10) Patent No.: US 7,227,821 B2
(45) Date of Patent: Jun. 5, 2007

(54) INFORMATION RECORDING, INFORMATION REPRODUCING AND COPYING APPARATUSES, AND INFORMATION RECORDING MEDIUM FOR RECORDING AND REPRODUCING MUSIC

(75) Inventors: Noriaki Horii, Osaka (JP); Masaya Yamamoto, Osaka (JP); Masatoshi Shimbo, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 547 days.

(21) Appl. No.: 10/277,229

(22) Filed: Oct. 21, 2002

(65) Prior Publication Data
US 2003/0081515 A1    May 1, 2003

(30) Foreign Application Priority Data
Oct. 30, 2001    (JP)    ............................. 2001-332193

(51) Int. Cl.
*G11B 7/00*    (2006.01)
(52) U.S. Cl. .................................. 369/47.16
(58) Field of Classification Search .................... None
See application file for complete search history.

(56) References Cited

U.S. PATENT DOCUMENTS

| | | | | |
|---|---|---|---|---|
| 5,856,958 A | * | 1/1999 | Yokota et al. | ......... 369/124.09 |
| 6,310,854 B1 | * | 10/2001 | Sato et al. | ............... 369/275.3 |
| 6,437,228 B2 | * | 8/2002 | Tanji | .......................... 84/609 |
| 6,707,784 B2 | * | 3/2004 | Sako et al. | ............... 369/275.3 |

FOREIGN PATENT DOCUMENTS

JP    11-120748    4/1999

* cited by examiner

*Primary Examiner*—William Kurzuch
*Assistant Examiner*—Joseph Haley
(74) *Attorney, Agent, or Firm*—Renner, Otto, Boisselle & Sklar, LLP

(57) ABSTRACT

The present invention provides an information recording medium in which at least one set of an audio data portion and a music block, which represent a piece of music, is recorded. The audio data portion includes first audio data. The music block includes first music reproduction information associated with the first audio data so as to manage reproduction of the first audio data. The first music reproduction information includes a first block type which indicates that the first audio data is audio data for a first use.

5 Claims, 54 Drawing Sheets

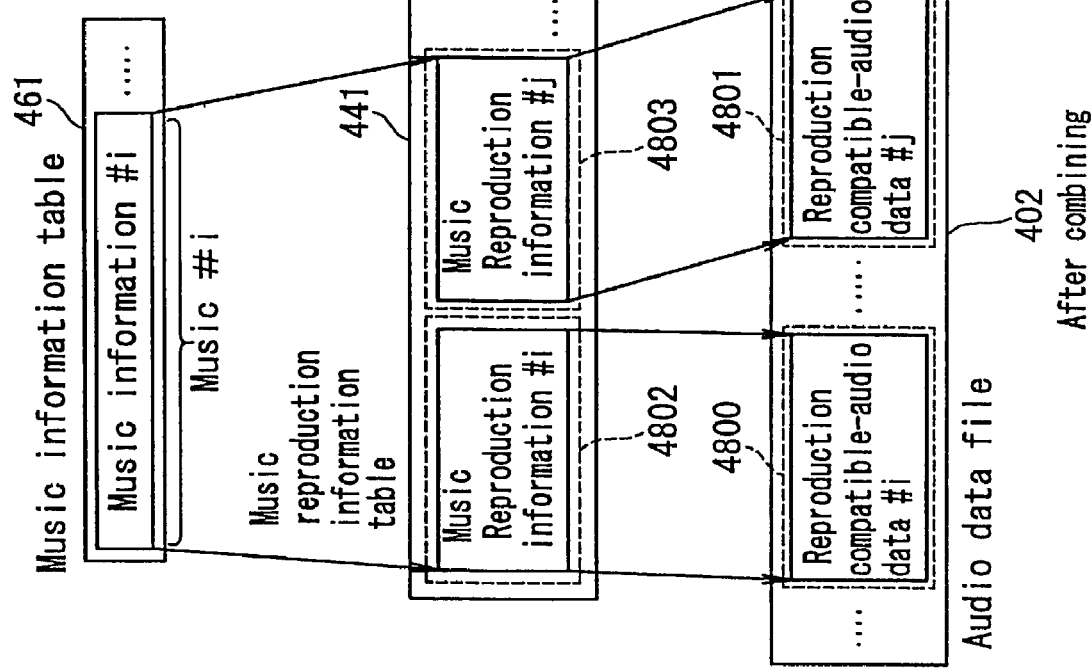
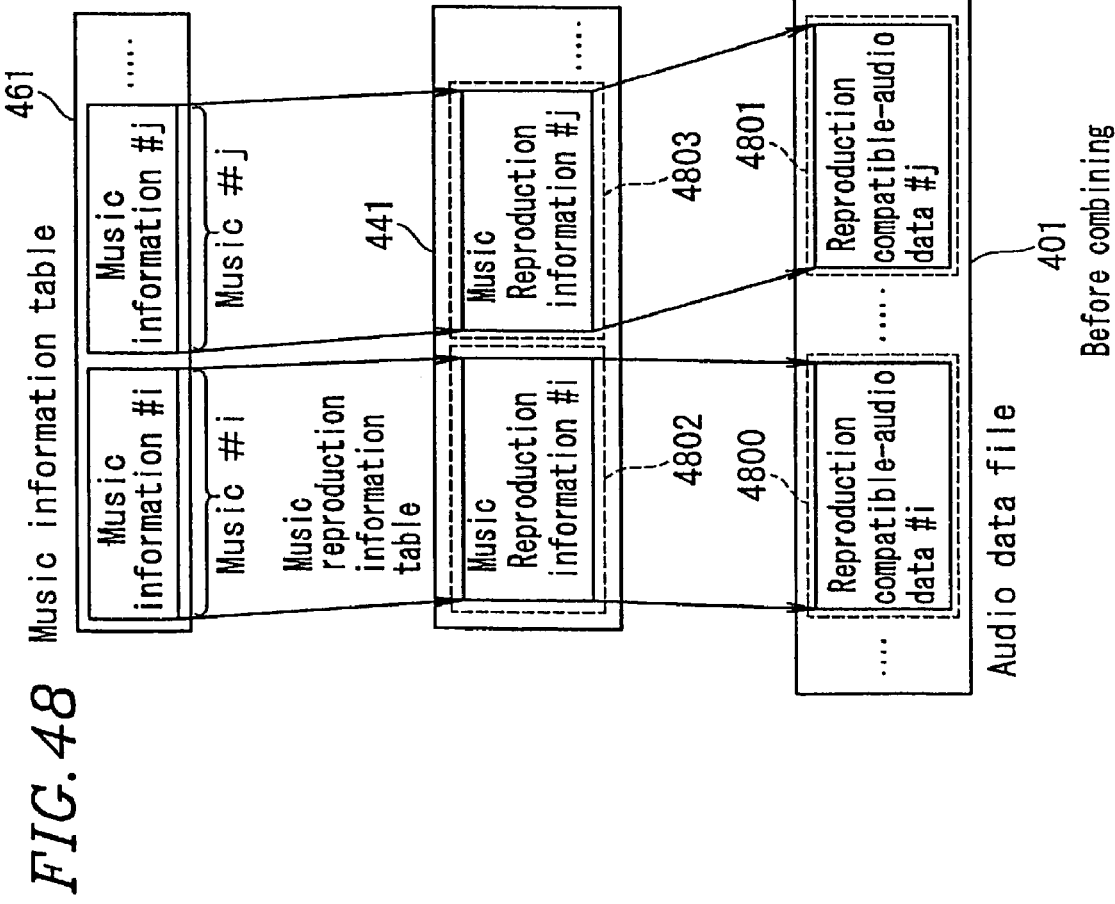
FIG. 48

FIG. 49 Music information table 461

INFORMATION RECORDING, INFORMATION REPRODUCING AND COPYING APPARATUSES, AND INFORMATION RECORDING MEDIUM FOR RECORDING AND REPRODUCING MUSIC

BACKGROUND OF THE INVENTION

1. Field of the Invention

The present invention relates to a rewritable information recording medium, and more particularly to an information recording medium to which distributed music content (music) is recorded. The present invention also relates to an information recording apparatus for recording distributed music content to such an information recording medium, a reproducing apparatus for reproducing recorded music content from the information recording medium, and a copying apparatus.

2. Description of the Related Art

In recent years, with the result that various compression encoding methods were invented and technologies related to the internet rapidly came into wide use, a number of electronic music distribution systems have been offering music distribution services. In such systems, compression encoding methods, such as MP3, are utilized to allow music to be distributed to a user in a short amount of time even if a narrow-band network is used. In the present specification, data including distributed music is referred to as "EMD (electronic music distribution) data". Most of such electronic music distribution systems presuppose the use of a PC (personal computer), and therefore reproduction compatibility, i.e., distributed music can be reproduced by any PC, is not a major problem. As a result, a large number of electronic music distribution systems are currently in service, and there are differences in format for the EMD data among the electronic music distribution systems.

Further, in many cases, the electronic music distribution system employs a copy control method which is different from a conventional copy control method. The conventional copy control method is of a generation management type, which allows an original medium to be copied but is controlled such that a grandchild copy of the original medium cannot be created. As methods for realizing such copy control, there are SCMS (serial copy management system) for use with a CD (compact disc) or an MD (MiniDisc), CPPM (content protection for prerecorded media) for use with DVD (digital versatile disc) Audio, and the like. On the other hand, in many cases, the electronic music distribution system employs methods, such as "MOVE", "CHECK OUT/IN", and the like. The "MOVE" method is used to copy contents of an original medium to another medium, and the contents of the original medium are deleted upon completion of copying. Moreover, in many cases, contents of a target medium, which are created by copying, are also allowed to be "MOVED", as contents of an original medium, to another medium.

In an original medium which is in conformity with the "CHECK OUT" method, counter information is recorded together with contents thereof. When copying the contents of the original medium to another medium, the counter information is modified simultaneously with copying the contents. When the value of the counter amounts to a prescribed number, additional copying of the original medium is not allowed. Moreover, a grandchild copy is not allowed to be created from a target medium to which the contents of the original medium are recorded. The "CHECK IN" method is used in a manner opposite to the "CHECK OUT" method. That is, counter information recorded in an original medium is updated simultaneously with deleting contents of a target medium, which are copied from the original medium in accordance with the "CHECK OUT" method. This allows the contents of the original medium to be copied to another medium. With regard to such copying, most of the current electronic music distribution systems also presuppose the use of a PC, and therefore the fact that any PC can make a copy of distributed music content does not cause any major problems.

Since most of the current electronic music distribution systems presuppose the use of a PC, any user who does not have a PC cannot receive electronic music distribution services. Therefore, there is a need for consumer apparatuses which can be readily handled by a large number of users and can record/reproduce EMD data to/from an information recording medium (disc). For example, a case where a household audio recorder/player, which is in conformity with DVD-RAM standards, is used for recording/reproducing EMD data to/from a DVD-RAM disc is considered. In this case, there are necessities for a data format and an information recording apparatus which allow conversion of distributed EMD data into LPCM (linear pulse code modulation) audio data or audio data processed by other compression coding methods, recording of the converted audio data to a DVD-RAM disc, and the use of new copy control methods, such as "MOVE", "CHECK OUT", and the like. Moreover, it is necessary to realize reproduction compatibility which allows audio data recorded in a disc to be reproduced by any reproducing apparatus, long-time recording which allows data to be recorded as much as possible, and high-speed copying performed by any copying apparatus in accordance with a "MOVE" or "CHECK OUT" method.

It is conceivable that a method which realizes such reproduction compatibility, long-time recording, and high-speed copying, uses a mandatory compression encoding method defined as a disc standard. Where the mandatory compression encoding method is defined as a disc standard, audio data is always required to be recorded to a disc by such a compression encoding method, so as to ensure reproduction compatibility with any reproducing apparatus. Moreover, when audio data is recorded to a disc by a compression encoding method, it is possible to realize long-time recording and high-speed-copying. However, when a mandatory compression encoding method is defined as a disc standard, any apparatus, which is in conformity with such a standard, is always required to mount a decoder, which uses the mandatory compression encoding method, and there is an obligation to pay a license fee. Moreover, even if any new high sound-quality and high compression-rate encoding method is developed in the future with the advance of technology, data recording has to be performed using a conventional mandatory compression encoding method.

Further, in the case of copying music data for use in one application program, which uses a mandatory compression method, in order to use the music data in another application program, if the mandatory compression encoding method is different from a compression encoding method supported by the target application program in which the copied music data is used, the copied music data is required to be converted so as to conform to the compression encoding method supported by the target application program. As a result, high-speed copying cannot be realized and even deterioration in sound quality is caused by such conversion. In this manner, various problems are caused by defining the mandatory compression encoding method as a disc standard.

In order to realize reproduction compatibility, long-time recording, and high-speed copying while avoiding the problems as described above, it is conceivable to define a mechanism which allows a user to choose whether to record LPCM audio data created by decoding the original audio data, which is encoded by a specific compression encoding method, so as to ensure reproduction compatibility, or to record the original audio data without converting the format therefor so as to realize long-time recording and high-speed copying. Alternatively, in some cases, music data encoded by both an LPCM encoding method and a specific compression-encoding method are recorded to a disc. In such a case, any one of the following data formats (1), (2), and (3) is required.

(1) Data format with music data which ensures reproduction compatibility.

Unlike a PC, it is difficult for a household audio player to be compatible with all of a large number of electronic music distribution systems. Therefore, by defining an audio data reproducing means, which is necessarily mounted on all audio players, and recording audio data in conformity with a specific encoding method which can be reproduced using such an audio data reproducing means, reproduction compatibility is ensured. In this case, LPCM is desirable as the specific encoding method.

(2) Data format with compressed audio data included in EMD data, which can be copied from one disc to another disc at high speed using any copying apparatus.

In order to perform a "Move" operation or a "CHECK OUT" operation on EMD data distributed by an electronic music distribution system, the format for the EMD data is required to be decoded, and therefore it is difficult for a household audio apparatus to be compatible with all electronic music distribution systems. Therefore, by defining an audio data copying means, which is necessarily mounted on all copying apparatuses, and recording compressed music data, which can be copied at high speed using such an audio copping means, to a disc, it is ensured that the EMD data can be copied at high speed using any copying apparatus.

(3) Data format with a mechanism which realizes long-time recording.

Specifically, the mechanism provides a choice between recording of both the audio data specified by (1) and the compressed audio data specified by (2) and recording of only the compressed audio data specified by (2). Alternatively, only the compressed audio data specified by (2) is recorded without any choice. When simultaneously recording the audio data specified by both (1) and (2), reproduction compatibility can be ensured but long-time recording cannot be realized. On the other hand, when recording only the compressed audio data specified by (2), long-time recording can be realized but reproduction compatibility is not ensured. Therefore, the compressed audio data specified by (2) can be reproduced only by a player having a reproducing means which can reproduce the compressed audio data.

As described above, when both the audio data specified by (1) and the compressed audio data specified by (2) are recorded in an information recording medium for the same piece of music, in the light of convenience for a user, it is desirable that either one of the audio data specified by (1) and (2) is used for reproduction or copying. Prior art documents, e.g., Japanese Laid-Open Patent publication No. 11-120748, disclose reproducing apparatuses for reproducing audio data according to reproduction environment, i.e., according to their ability to receive a data stream. However, such reproducing apparatuses cannot choose either the audio data specified by (1) or the compressed audio data specified by (2) for reproduction.

An objective of the present invention are to provide an information recording medium in which data is recorded using a disc format which solves the above-described problems, and the other objectives of the present invention are to provide an information recording apparatus, an information reproducing apparatus, and a copying apparatus, which are used with such an information recording medium.

SUMMARY OF THE INVENTION

According to one aspect of the present invention, there is provided an information recording medium in which at least one set of an audio data portion and a music block, which represent a piece of music, is recorded, the audio data portion including first audio data, the music block including first music reproduction information associated with the first audio data so as to manage reproduction of the first audio data, and the first music reproduction information including a first block type which indicates that the first audio data is audio data for a first use.

In one embodiment of the invention, the audio data portion included in at least one set of the at least one set of the audio data portion and the music block further includes second audio data, the music block included in the at least one set of the at least one set of the audio data portion and the music block further includes second music reproduction information associated with the second audio data so as to manage reproduction of the second audio data, and the second music reproduction information includes a second block type which indicates that the second audio data is audio data for a second use, which is different from the audio data for a first use.

In one embodiment of the invention, the first block type indicates that the audio data for a first use is reproduction compatible-data and the second block type indicates that the audio data for a second use is copyable data.

In one embodiment of the invention, the music block includes only a piece of the first music reproduction information which includes the first block type.

According to another aspect of the present invention, there is provided an information recording apparatus including: an acquisition section for acquiring audio data representing a piece of music; an audio data conversion section for converting the acquired audio data to first audio data; a reproduction control information creation section for creating first music reproduction information which is associated with the first audio data so as to manage reproduction of the first audio data and includes a first block type indicating that the first audio data is audio data for a first use; and a recording section for recording the first audio data as an audio data portion and the first music reproduction information as a music block, which makes a set in conjunction with the audio data portion, to an information recording medium.

In one embodiment of the invention, the audio data conversion section converts the audio data so as to create the first audio data and second audio data; the reproduction control information creation section further creates second music reproduction information which is associated with the second audio data so as to manage reproduction of the second audio data and includes a second block type indicating that the second audio data is audio data for a second use which is different from the audio data for a first use, and the recording section for recording the first and second audio data as the audio data portion and the first and second music reproduction information as the music block, which makes a set in conjunction with the audio data portion, to the information recording medium.

In one embodiment of the invention, the first block type indicates that the audio data for a first use is reproduction compatible-data and the second block type indicates that the audio data for a second use is copyable data.

According to still another aspect of the present invention, there is provided an information reproducing apparatus for reproducing at least one set of an audio data portion and a music block which represent a piece of music recorded in an information recording medium, the audio data portion including first audio data, the music block including first music reproduction information, which is associated with the first audio data so as to manage reproduction of the first audio data and includes a first block type indicating that the first audio data is audio data for a first use, and the information reproducing apparatus including: an acquisition section for acquiring the first audio data and the first music reproduction information; a determination section for determining, based on the first block type included in the acquired first music reproduction information, whether the first audio data is the audio data for a first use or audio data for a second use which is different from the audio data for a first use; and a reproducing section for reproducing the first audio data based on the determination result.

According to still another aspect of the present invention, there is provided a copying apparatus for copying at least one set of an audio data portion and a music block, which represent a piece of music recorded in an information recording medium, to another information recording medium, which is different from the information recording medium, the audio data portion including first audio data, the music block including first music reproduction information, which is associated with the first audio data so as to manage reproduction of the first audio data and includes a first block type indicating that the first audio data is audio data for a first use, and the copying apparatus including: an acquisition section for acquiring the first audio data and the first music reproduction information; a determination section for determining, based on the first block type included in the acquired first music reproduction information, whether the first audio data is the audio data for a first use or audio data for a second use which is different from the audio data for a first use; and an output section for outputting the first audio data based on the determination result.

Thus, the invention described herein makes possible the advantages of providing: (1) an information recording medium in which two pieces of audio data for the same piece of music, which can be selectively reproduced, are recorded; and (2) an information recording apparatus, an information reproducing apparatus, and a copying apparatus, which are used with such an information recording medium.

These and other advantages of the present invention will become apparent to those skilled in the art upon reading and understanding the following detailed description with reference to the accompanying figures.

BRIEF DESCRIPTION OF THE DRAWINGS

FIG. 48 illustrates relationships among the audio data file 401, the music reproduction information table 441, and the music information table 461, with respect to the situation before and after combining pieces of music.

DESCRIPTION OF THE EMBODIMENTS

Figure 1:
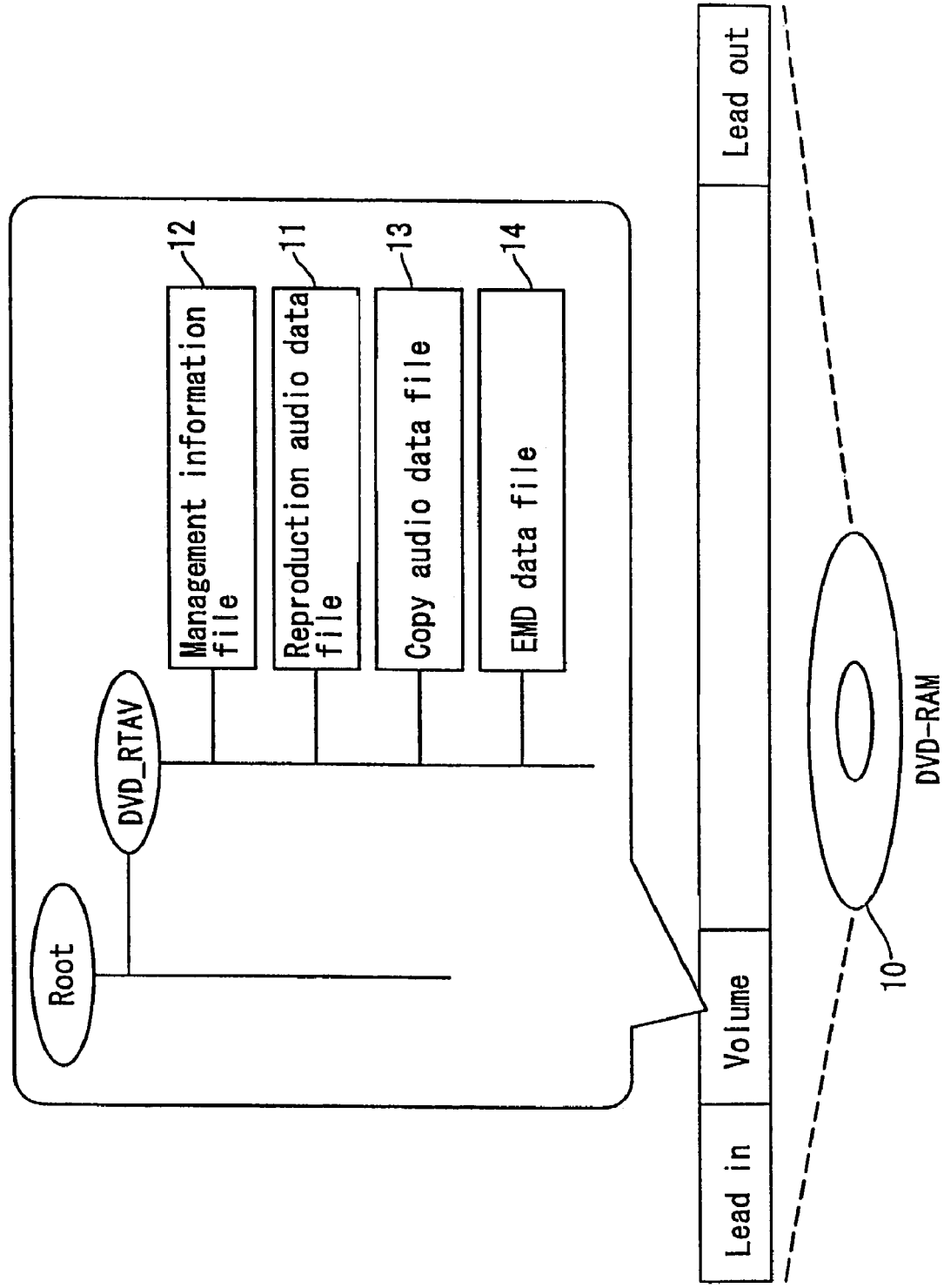
FIG. 1 is a schematic diagram of an information recording medium 10 according to Embodiment 1 of the present invention.

In order to solve the above-described problems, an information recording medium according to the present invention includes: only audio data for ensuring reproduction compatibility; only compressed audio data for allowing EMD data to be copied at high speed using any copying apparatus; or both the audio data for ensuring reproduction compatibility and the compressed audio data for high-speed copying.

Specifically, the data format for the information recording medium according to the present invention includes: either one of reproduction audio data, which is decoded so as to be reproduced, copy audio data, which is compressed by a compression encoding method, e.g., an MP3 (MPEG1 Audio Layer III) method, supported by a target recording medium to which audio data is copied, and distributed EMD data; and a management information file for managing information associated with these data. Note that the reproduction audio data is recorded to a reproduction audio data file, the copy audio data is recorded to a copy audio data file, and the EMD data is recorded to an EMD data file. There are five kinds of data formats for the information recording medium according to the present invention.

A. A management information file, a reproduction audio data file, a copy audio data file, and an EMD data file (Embodiment 1).

B. A management information file, a reproduction audio data file, and an EMD data file (Embodiment 2).

C. A management information file, a reproduction audio data file, and a copy audio data file (Embodiment 3).

D. A management information file and an audio data file. Note that the audio data file includes reproduction audio data and EMD data (Embodiment 4).

E. A management information file and an audio data file. Note that the audio data file includes reproduction audio data and copy audio data (Embodiment 5).

Hereinafter, embodiments of the present invention will be described in detail with reference to the accompanying drawings. In the drawings, elements having similar effects are denoted by similar reference numerals.

(Embodiment 1)

1. Structure of an information recording medium according to Embodiment 1 of the present invention A data format for an information recording medium according to Embodiment 1 of the present invention includes a management information file, a reproduction audio data file, a copy audio data file, and an EMD data file. Such a data format ensures reproduction compatibility and allows audio data included in EMD data to be copied at high speed.

FIG. 1 is a schematic diagram of an information recording medium 10 according to Embodiment 1. For example, the information recording medium 10 is a DVD-RAM disc. The DVD-RAM disc 10 includes a reproduction audio data file 11 to which reproduction-compatible audio data (first audio data) is recorded, a management information file 12 to which reproduction control information mainly related to reproduction of the reproduction-compatible audio data is recorded, a copy audio data file 13 to which copy audio data (second audio data) is recorded, and an EMD data file 14 to which distributed EMD data is recorded as it is distributed.

Next, the data recorded to each file will be described in further detail.

Figure 2:
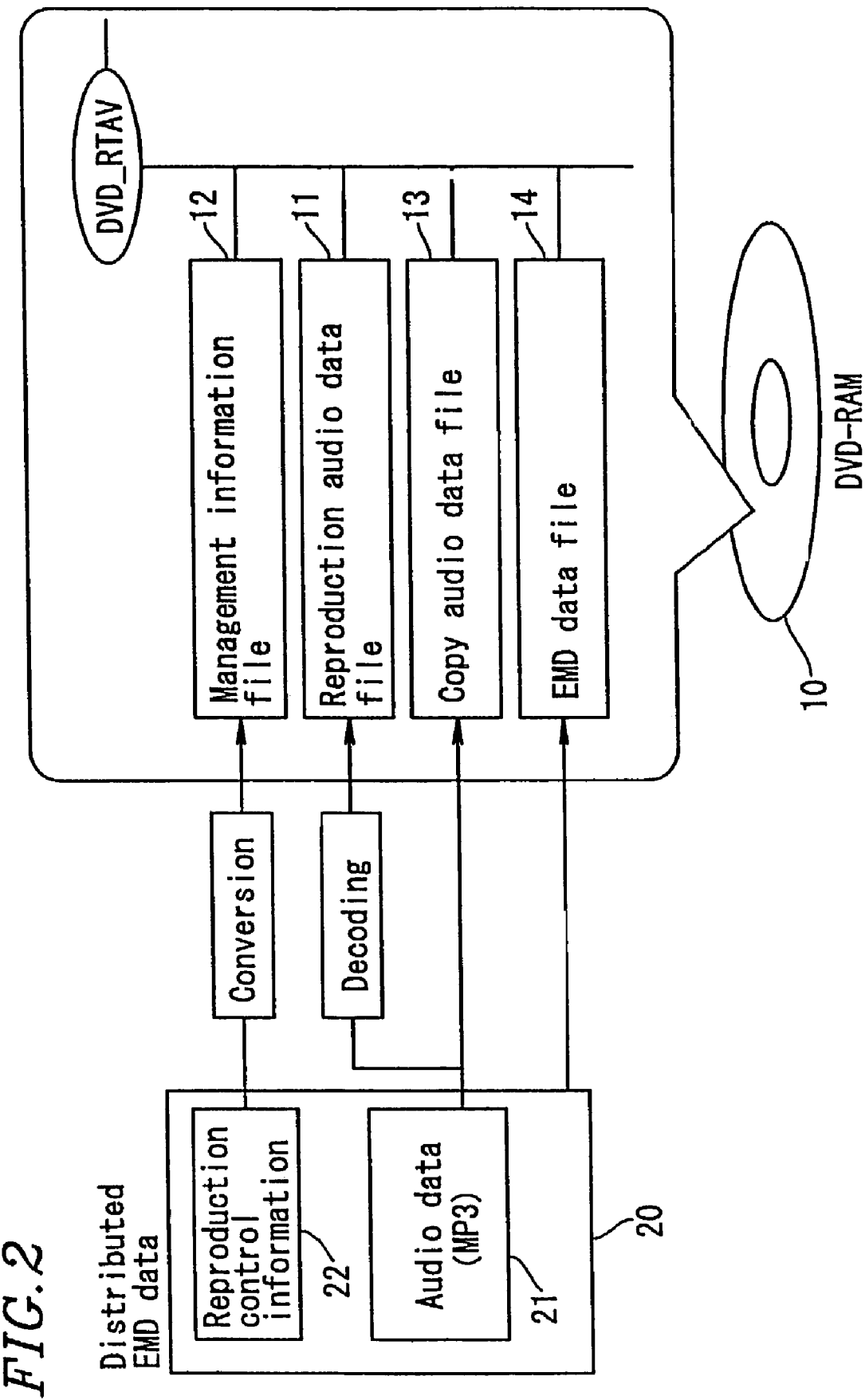
FIG. 2 illustrates how EMD data 20 is recorded to the information recording medium 10 of FIG. 1.

FIG. 2 schematically illustrates how EMD data 20 is recorded to the DVD-RAM disc 10 of FIG. 1. In Embodiment 1, the EMD data 20 includes compressed audio data 21, which is compressed according to an MP3 method, and reproduction control information 22 associated with the compressed audio data 21.

When the EMD data 20 is distributed, the distributed EMD data 20 is recorded to the EMD data file 14 as it is distributed. The compressed MP3 audio data 21 included in the EMD data 20 is decoded so as to create LPCM reproduction-compatible audio data. The LPCM reproduction-compatible audio data is recorded to the reproduction audio data file 11, while the compressed MP3 audio data 21 included in the EMD data 20 is recorded to the copy audio data file 13 as it is distributed. Lastly, information, which is converted from the reproduction control information 22 included in the EMD data 20 so as to be decodable in the DVD-RAM disc 10, and information, which is used for managing the EMD data file 14, the reproduction audio data file 11, and the copy audio data file 13, are recorded to the management information file 12. As a result, the distributed EMD data 20, the reproduction-compatible audio data for ensuring reproduction compatibility, i.e., audio data decoded by an LPCM method, and compressed copy audio data used for realizing high-speed copying, i.e., the audio data 21 included in the EMD data 20, are recorded to the EMD data file 14, the reproduction audio data file 11, and the copy audio data file 13, respectively.

Figure 3:
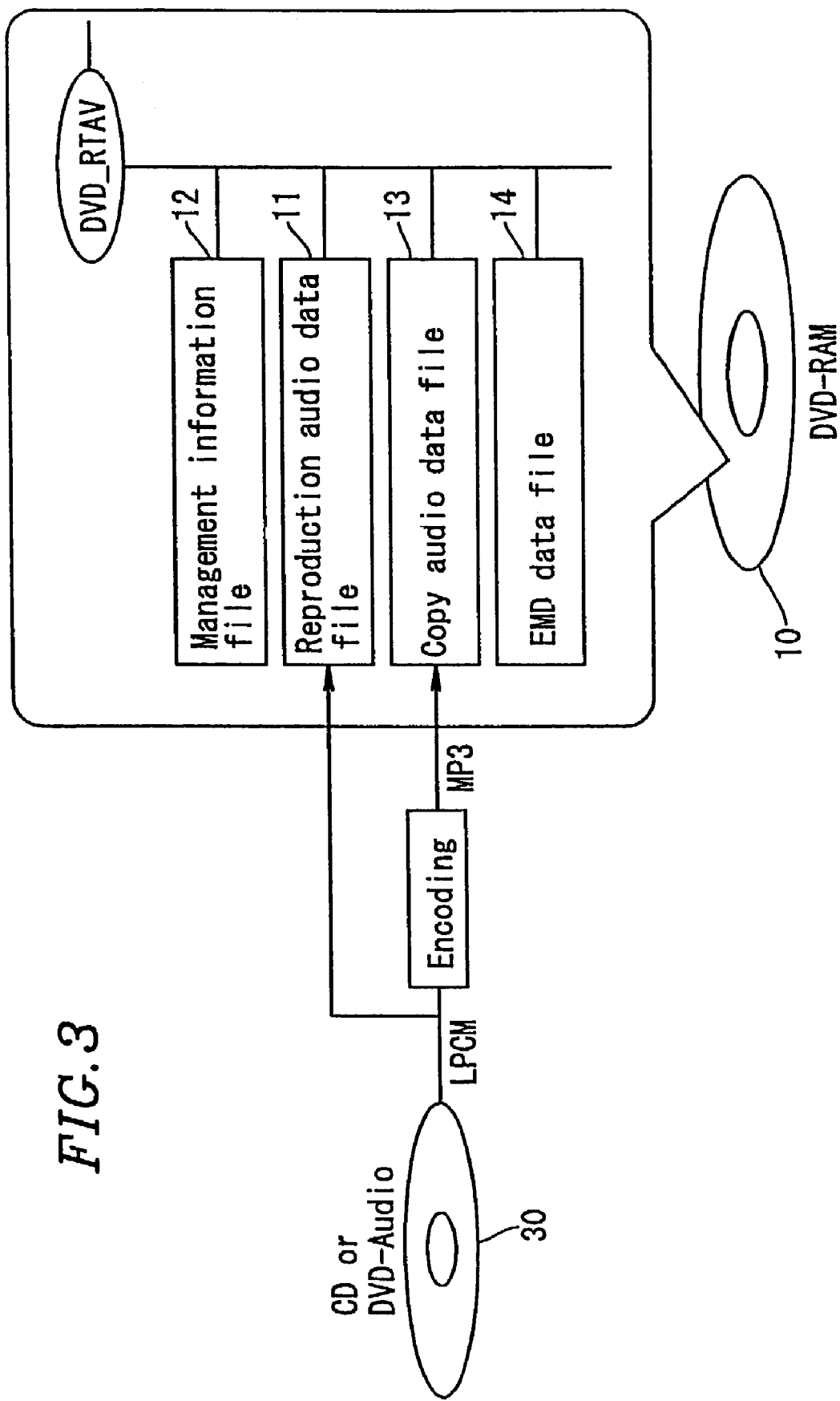
FIG. 3 illustrates how audio data recorded in a CD or DVD-Audio 30 is recorded to the information recording medium 10 of FIG. 1.

FIG. 3 schematically illustrates how audio data recorded in a CD or DVD-Audio 30 is recorded to the DVD-RAM disc 10 of FIG. 1. LPCM audio data output from the CD or DVD-Audio 30 is recorded to the reproduction audio data file 11 as it is output as the LPCM audio data. The output LPCM audio data is also compressed by an MP3 compression encoding method or the like and is recorded to the copy audio data file 13. Lastly, information for managing the reproduction audio data file 11 and the copy audio data file 13 is recorded to the management information file 12. No information may be recorded to the EMD data file 14. As a result, the reproduction-compatible audio data for ensuring reproduction compatibility, i.e., the LPCM audio data, is recorded to the reproduction audio data file 11, and compressed copy audio data used for realizing high-speed copying, i.e., the compressed MP3 audio data, is recorded to the copy audio data file 13.

Figure 4:
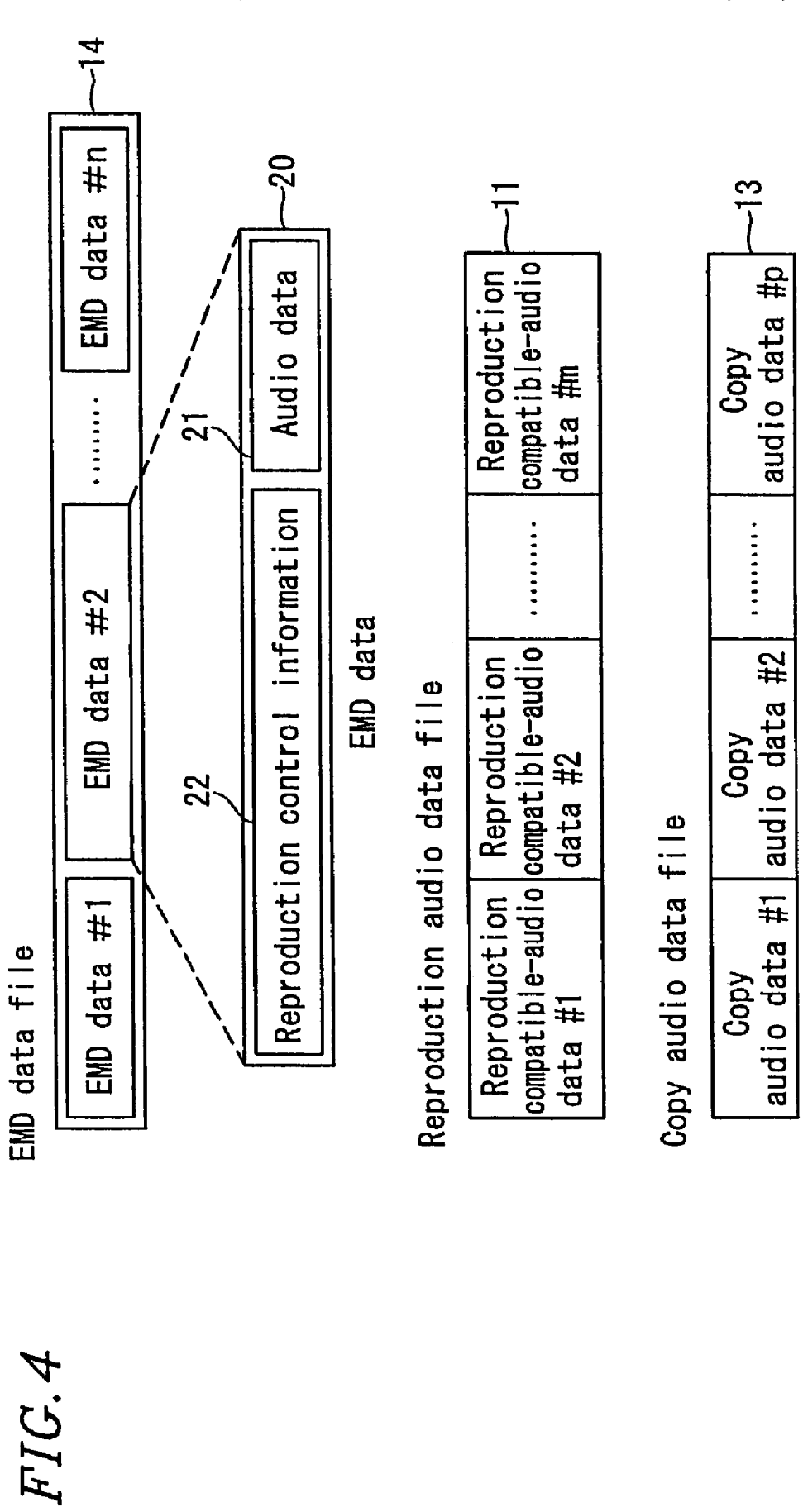
FIG. 4 is a diagram illustrating detailed structures of a reproduction audio data file 11, a copy audio data file 13, and EMD data 14.

FIG. 4 is a diagram illustrating detailed structures of the reproduction audio data file 11, the copy audio data file 13, and the EMD data file 14. The EMD data file 14 is used for recording the EMD data 20 (FIG. 2) distributed by an electronic music distribution system as it is distributed. In FIG. 4, the EMD data 20 recorded in the EMD data file 14 includes EMD data #1–#n. The EMD data #n means the n'th distributed EMD data, where n is an integer greater than 1.

The reproduction audio data file 11 is used for recording, as reproduction-compatible audio data, audio data created by decoding the audio data 21 included in the EMD data 20 using an LPCM method or LPCM audio data recorded in the CD/DVD-Audio 30. In FIG. 4, reproduction-compatible audio data #1–#m are recorded in the reproduction audio data file 11. The reproduction-compatible audio data #m means the m'th recorded music, where m is an integer greater than 1. It is preferable that the reproduction-compatible audio data is encoded by an encoding method, which ensures reproduction compatibility, e.g., an LPCM method.

The copy audio data file 13 is used for recording, as copy audio data, compressed audio data, which contains only elementary portions, i.e., compressed MP3 audio data 21, extracted from the EMD data 20, or audio data created by compressing audio data recorded in the CD/DVD-Audio 30 using an MP3 method. In FIG. 4, copy audio data #1–#p are recorded in the copy audio data file 13. The copy audio data #p means the p'th recorded music, where p is an integer greater than 1. The copy audio data is compressed using a compression encoding method, e.g., an MP3 method, supported by a recording medium to which the copy audio data is copied.

Figure 5:
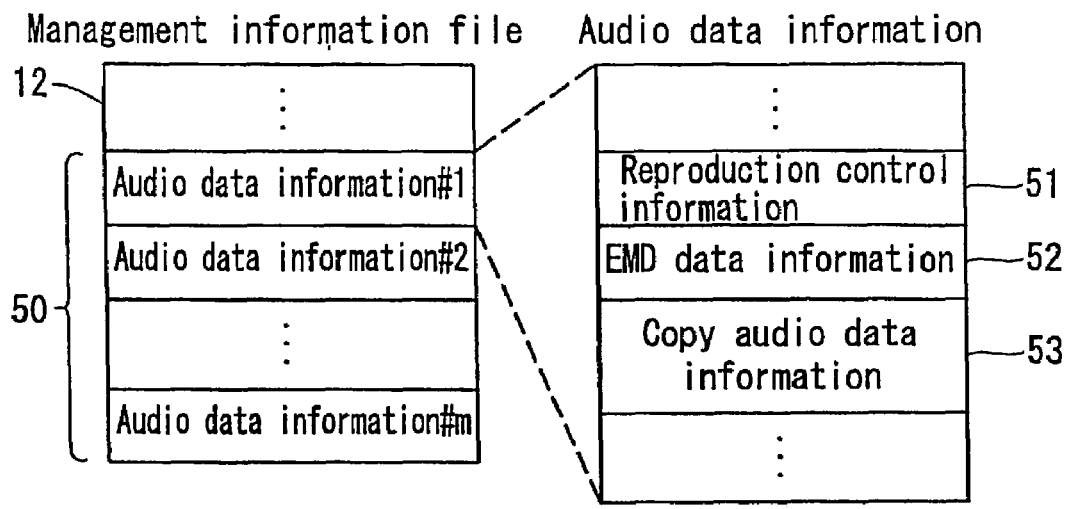
FIG. 5 is a diagram illustrating a detailed structure of a management information file 12.

FIG. 5 is a diagram illustrating a detailed structure of the management information file 12. The management information file 12 includes audio data information 50 for managing information related to reproduction-compatible audio data. A piece of audio data information is provided so as to correspond to a piece of reproduction-compatible audio data. For example, audio data information associated with the reproduction-compatible audio data #m shown in FIG. 4 is recorded as the audio data information #m shown in FIG. 5.

The audio data information includes reproduction control information 51 related to reproduction-compatible audio data, EMD data information 52 related to the EMD data 20, and copy audio data information 53 related to copy audio data. The reproduction control information 51 is, for example, link information which is related to an audio attribute, a recording start address, etc., of audio data.

Figure 6:
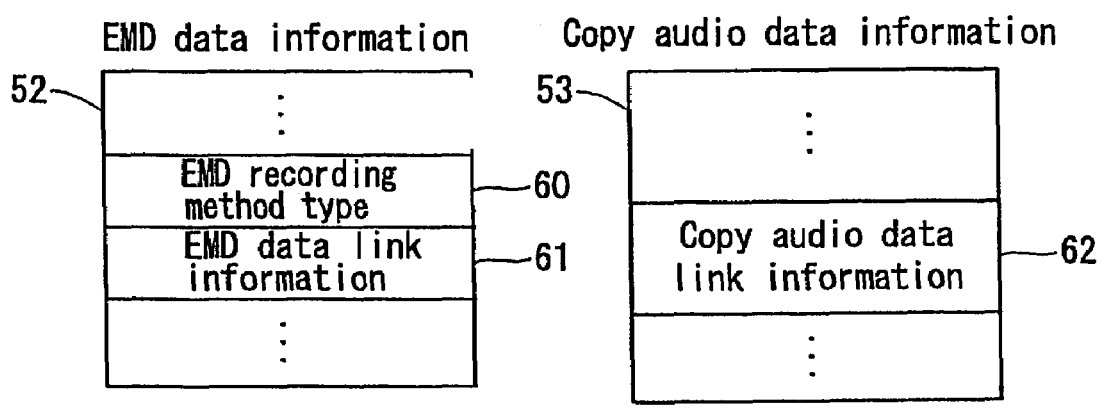
FIG. 6 is a diagram illustrating detailed structures of EMD data information 52 and copy audio data information 53.

FIG. 6 is a diagram illustrating detailed structures of the EMD data information 52 and the copy audio data information 53. The EMD data information 52 includes an EMD recording method type 60, which represents the type of the EMD data 20, and EMD data link information 61, which indicates a recording position of the EMD data 20. For example, the EMD recording method type 60 represents a distribution system's ID number or name which specifies the type of a distribution system for providing EMD data 20. The EMD data link information 61 indicates a recording start address or a recording end address of the compressed audio data 21 included in the EMD data 20.

The copy audio data information 53 includes copy audio data link information 62 which indicates a recording position of copy audio data. The copy audio data link information 62 indicates, for example, a recording start address or a recording end address of the copy audio data.

The reproduction-compatible audio data and the copy audio data, which are managed by the same audio data information 50, are created from compressed audio data 21 in EMD data 20 which is managed by the same audio data information. For example, supposing that the audio data information #m shown in FIG. 5 includes reproduction control information associated with the reproduction-compatible audio data #m, EMD information associated with the EMD data #n, and copy audio data information associated with the copy audio data #p, which are shown in FIG. 4, the reproduction-compatible audio data #m and the copy audio data #p are created from audio data included in the EMD data #n.

Figure 7:
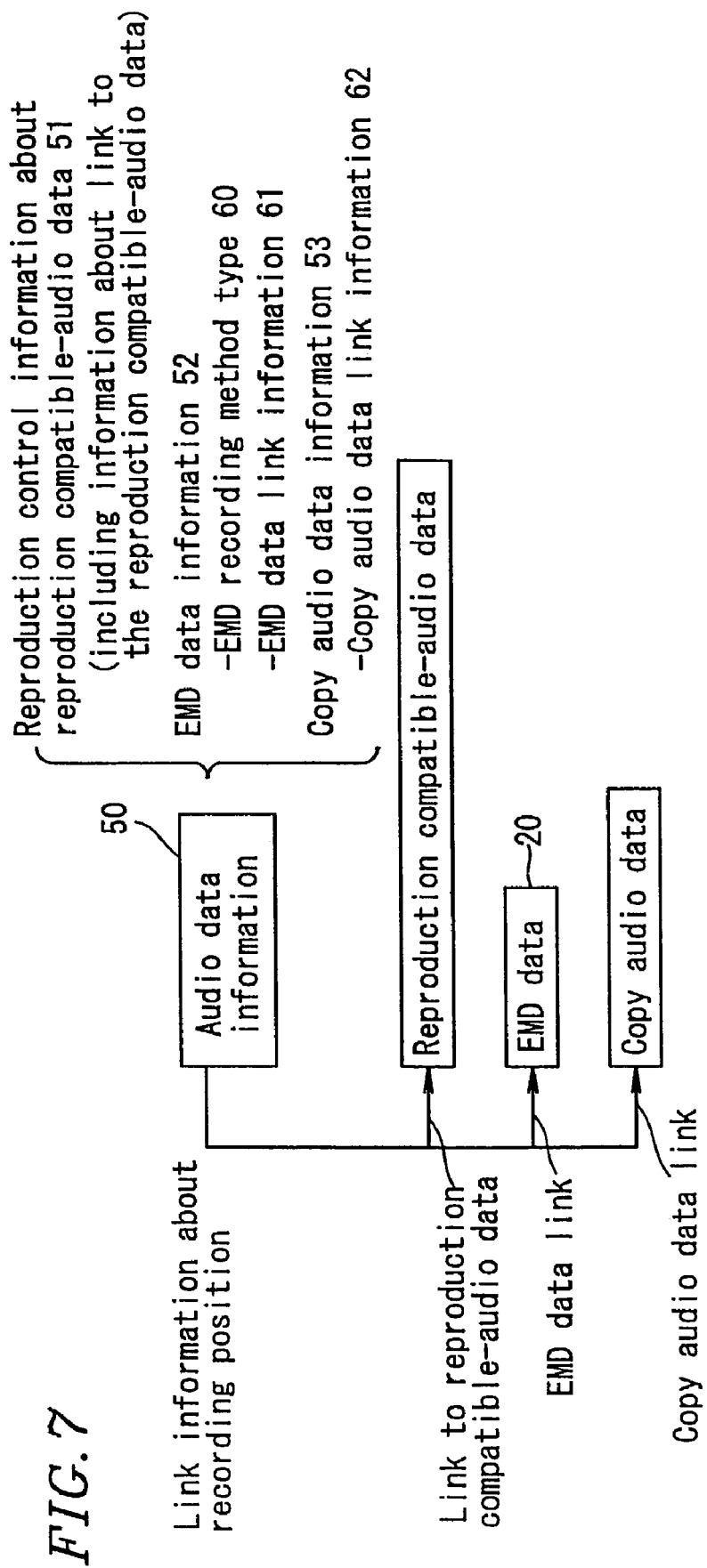
FIG. 7 illustrates link relationships among audio data information 50, reproduction-compatible audio data, EMD data 20, and copy audio data, and also illustrates information included in the audio data information 50.

FIG. 7 illustrates link relationships among the audio data information 50, the reproduction-compatible audio data, the EMD data 20, and the copy audio data, and also illustrates contents of the audio data information 50.

The audio data information 50 has links to the reproduction-compatible audio data, the EMD data 20, and the copy audio data. As explained with reference to FIGS. 5 and 6, the audio data information 50 includes the reproduction control information 51 associated with reproduction-compatible audio data, the EMD data information 52, which includes the EMD recording method type 60 and the EMD data link information 61, and the copy audio data information 53 which includes the copy audio data link information 62.

Figure 8:
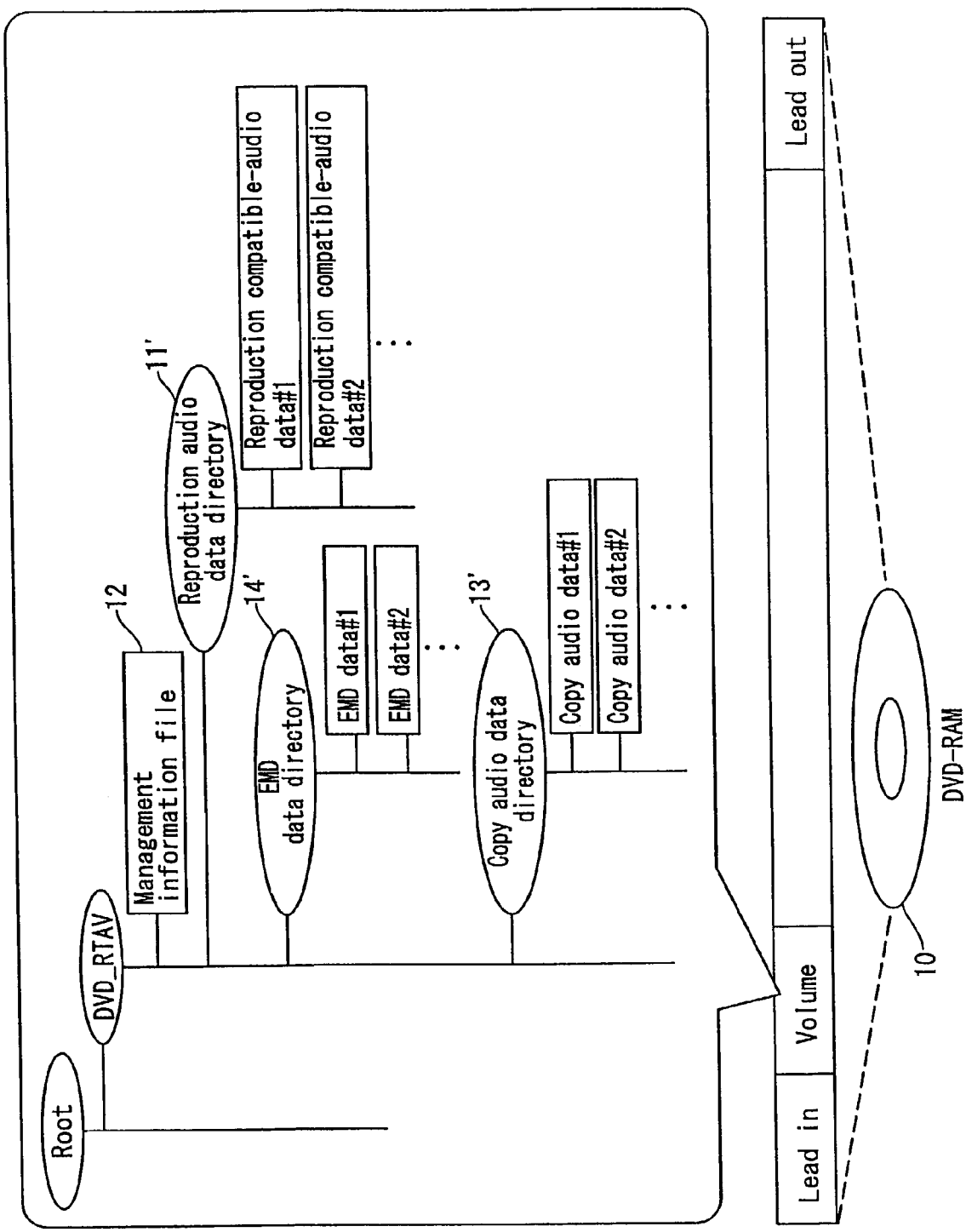
FIG. 8 is another schematic diagram of the information recording medium 10 according to Embodiment 1 of the present invention.

FIG. 8 is another schematic diagram of the information recording medium (DVD-RAM disc) 10 according to Embodiment 1. In the information recording medium 10 of FIG. 8, a reproduction audio data directory 11', a copy audio data directory 13', and an EMD data directory 14' are included in place of the reproduction audio data file 11, the copy audio data file 13, and the EMD data file 14, respectively. Each piece of reproduction-compatible audio data, EMD data, and copy audio data may be recorded as a file under a corresponding directory.

When copying audio data recorded in a CD, a DVD, or the like, only reproduction-compatible audio data may be recorded to the DVD-RAM disc 10, and EMD data and copy audio data may not be recorded. In such a case, the audio data information 50 for managing the reproduction-compatible audio data may not include the EMD data information 52 and the copy audio data information 53.

According to Embodiment 1 of the present invention, reproduction compatibility is ensured by the reproduction compatible-audio data recorded in the reproduction audio data file 11. Moreover, in the case of copying the compressed audio data 21 in the EMD data 20, high-speed copying is ensured by using the copy audio data, even if a copying apparatus which cannot decode the data format for the EMD data 20. Thus, according to Embodiment 1 of the present invention, it is possible to provide the information recording medium 10, which realizes reproduction compatibility and high-speed copying.

2. Structure and operation of an information recording apparatus according to Embodiment 1 of the present invention Next, an information recording apparatus according to Embodiment 1 of the present invention, which records audio data to an information recording medium 96, will be described.

Figure 9:
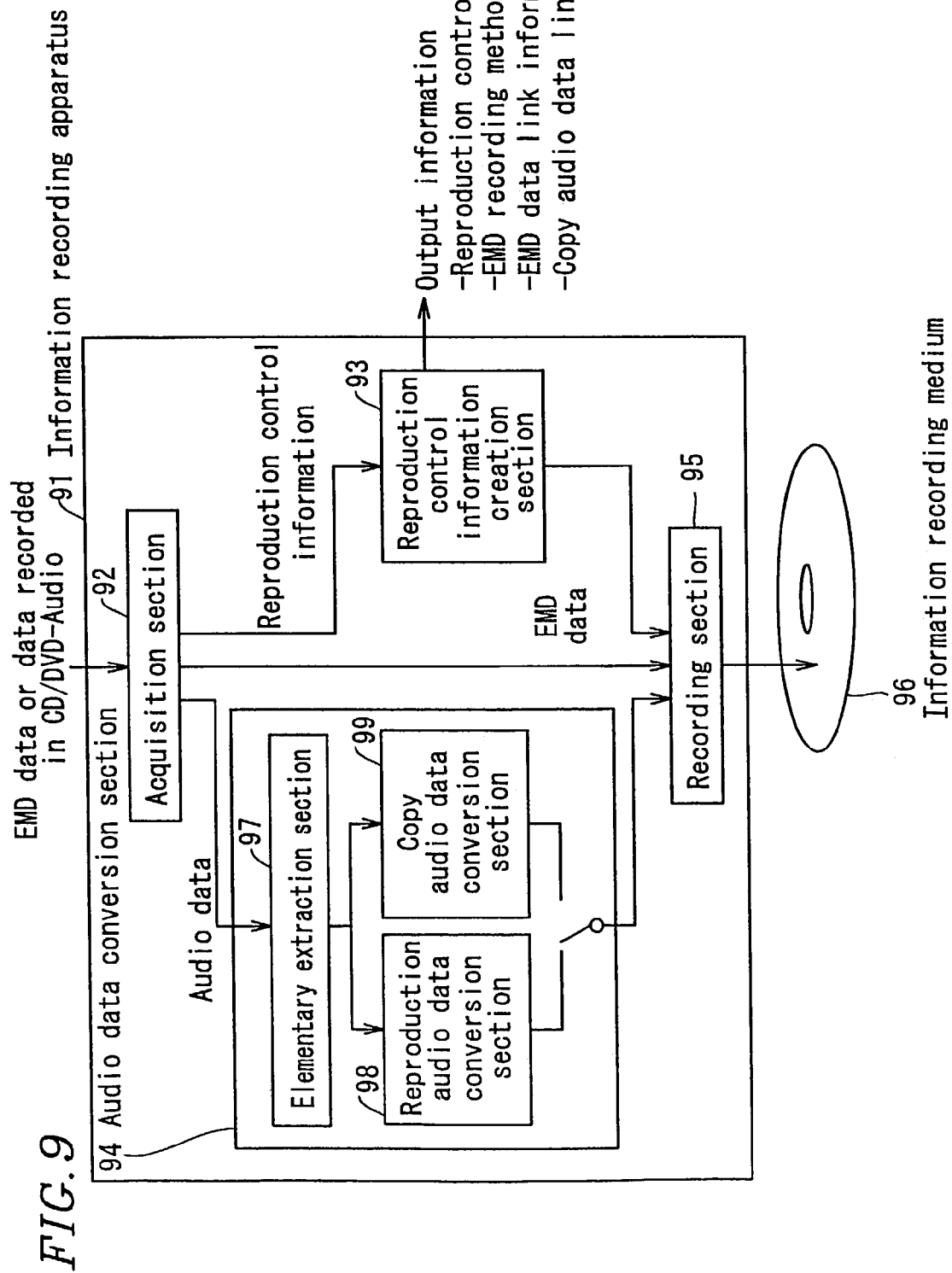
FIG. 9 is a block diagram of an information recording apparatus 91 according to Embodiment 1 of the present invention.

FIG. 9 is a block diagram of an information recording apparatus 91 according to Embodiment 1 of the present invention. The information recording apparatus 91 includes an acquisition section 92, a reproduction control information creation section 93, an audio data conversion section 94, and a recording section 95. The audio data conversion section 94 includes an elementary extraction section 97, are production audio data conversion section 98, and a copy audio data conversion section 99.

Next, a recording operation for recording the EMD data 20, which is distributed by a music distribution system, to the information recording medium 96 will be described. When recording the EMD data 20 (FIG. 2), which includes reproduction control information 22 and compressed audio data 21, using the information recording apparatus 91, the acquisition section 92 acquires the EMD data 20 and outputs the reproduction control information 22, the compressed audio data 21, and the EMD data 20 to the reproduction control information creation section 93, the audio data conversion section 94, and the recording section 95, respectively.

The elementary extraction section 97 extracts only elementary portions from the compressed audio data 21 output to the audio data conversion section 94 and outputs the elementary portions to the reproduction audio data conversion section 98 and the copy audio data conversion section 99. In the reproduction audio data conversion section 98, the compressed audio data 21 from which the elementary portions are extracted is converted into reproduction-compatible audio data conforming to an encoding method, e.g., an LPCM method, which ensures reproduction compatibility. In the copy audio data conversion section 99, the compressed audio data 21 from which only the elementary portions are extracted is converted into copy audio data, which conforms to a compression encoding method, e.g., an MP3 method, and is used for a copying operation.

Lastly, the audio data conversion section 94 outputs the reproduction compatible-audio data and the copy audio data to the recording section 95. Note that when audio data input to the elementary extraction section 97 includes only the elementary portions, the input audio data is output to the reproduction audio data conversion section 98 and the copy audio data conversion section 99 as it is input. In the reproduction audio data conversion section 98 and the copy audio data conversion section 99, if the input audio data including only the elementary portions conforms to an encoding method which is used for conversion, no conversion operations are performed on the input audio data.

The reproduction control information creation section 93 creates reproduction control information 51 associated with the reproduction compatible-audio data, an EMD recording method type 60 which represents the type of a method for recording the EMD data 20 and is based on the reproduction control information 22 in the EMD data 20, EMD datalink information 61 which indicates a recording position of the EMD data 20, and copy audio data link information 62 which indicates a recording position of the copy audio data.

The reproduction control information creation section 93 outputs these data to the recording section 95.

The recording section 95 records the reproduction compatible-audio data output by the audio data conversion section 94, the copy audio data, an output result provided by the reproduction control information creation section 93, and the EMD data 20 output by the acquisition section 92 to the reproduction audio data file 11, the copy audio data file 13, the management information file 12, and the EMD data file 14, respectively, in the information recording medium 96.

Each piece of the reproduction-compatible audio data, the copy audio data, and the EMD data 20 may be recorded as a file under a corresponding one of the reproduction audio data directory 11', the copy audio data directory 13', and the EMD data directory 14', which are shown in FIG. 8.

Next, an operation for recording audio data recorded in a CD or a DVD-Audio to the information recording medium 96 using the information recording apparatus 91 will be described. The acquisition section 92 acquires audio data input thereto. The audio data acquired by the acquisition section 92 is output to the audio data conversion section 94. In this case, the operation of the audio data conversion section 94 is the same as that of the acquisition section 92 in the case where the EMD data 20 is input to the information recording apparatus 91, and therefore the description thereof is omitted.

The reproduction control information creation section 93 creates the reproduction control information 51 associated with the reproduction compatible-audio data and the copy audio data link information 62, which indicates a recording position of the copy audio data, and outputs these data to the recording section 95. The recording section 95 records the reproduction compatible-audio data output by the audio data conversion section 94, the copy audio data, and an output result provided by the reproduction control information creation section 93 to the reproduction audio data file 11, the copy audio data file 13, and the management information file 12, respectively, in the information recording medium 96. In this case, no data is recorded to the EMD data file 14.

Each piece of the reproduction-compatible audio data and the copy audio data may be recorded as a file under a corresponding one of the reproduction audio data directory 11' and the copy audio data directory 13', which are shown in FIG. 8. In such a manner, the data format for the information recording medium 10 described in "1. Structure of an information recording medium according to Embodiment 1 of the present invention" is obtained.

According to Embodiment 1 of the present invention, it is possible to provide the information recording medium 10 to which the reproduction compatible-audio data and the copy audio data are recorded and in which the management information file 12 can be referred to for these data. Therefore, if at least the management information file 12 can be decoded, reproduction compatibility with any reproducing apparatus can be ensured and high-speed copying of the compressed audio data 21 included in the EMD data 20 can be realized using a copying apparatus which cannot decode the EMD data 20.

3. Structure and operation of an information reproducing apparatus according to Embodiment 1 of the present invention Next, an information reproducing apparatus according to Embodiment 1 of the present invention, which reproduces audio data recorded in the information recording medium 10, will be described.

Figure 10A:
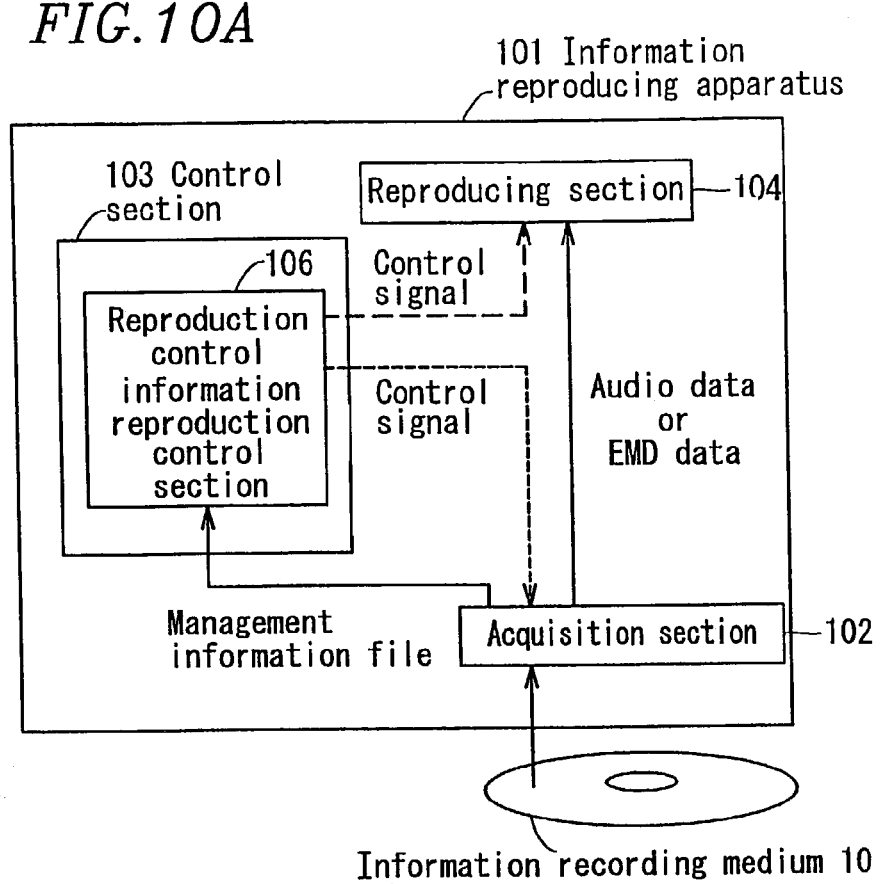
FIG. 10A is a block diagram of an information reproducing apparatus 101 according to Embodiment 1 of the present invention.

FIG. 10A is a block diagram of an information reproducing apparatus 101 according to Embodiment 1 of the present invention. The information reproducing apparatus 101 includes an acquisition section 102, a control section 103, and a reproducing section 104. The control section 103 includes a reproduction control information reproduction control section 106.

The acquisition section 102 acquires a management information file 12 from the information recording medium 10 and outputs the acquired management information file 12 to the control section 103. The data format for the management information file 12 is as shown in FIGS. 5 and 6.

Next, the reproduction control information reproduction control section 106 in the control section 103 decodes the management information file 12 so as to retrieve audio data information 50, which includes reproduction control information 51 associated with audio data to be reproduced, from the management information file 12. The reproduction control information reproduction control section 106 acquires link information, which indicates a recording position of the audio data, from the reproduction control information 51 included in the retrieved audio data information 50. The control section 103 outputs a control signal to the acquisition section 102 such that the acquisition section 102 acquires the audio data from the information recording medium 10 based on the acquired link information and outputs the acquired audio data to the reproducing section 104. The control section 103 also outputs a control signal to the reproducing section 104 such that the reproducing section 104 reproduces the output audio data.

Figure 10B:
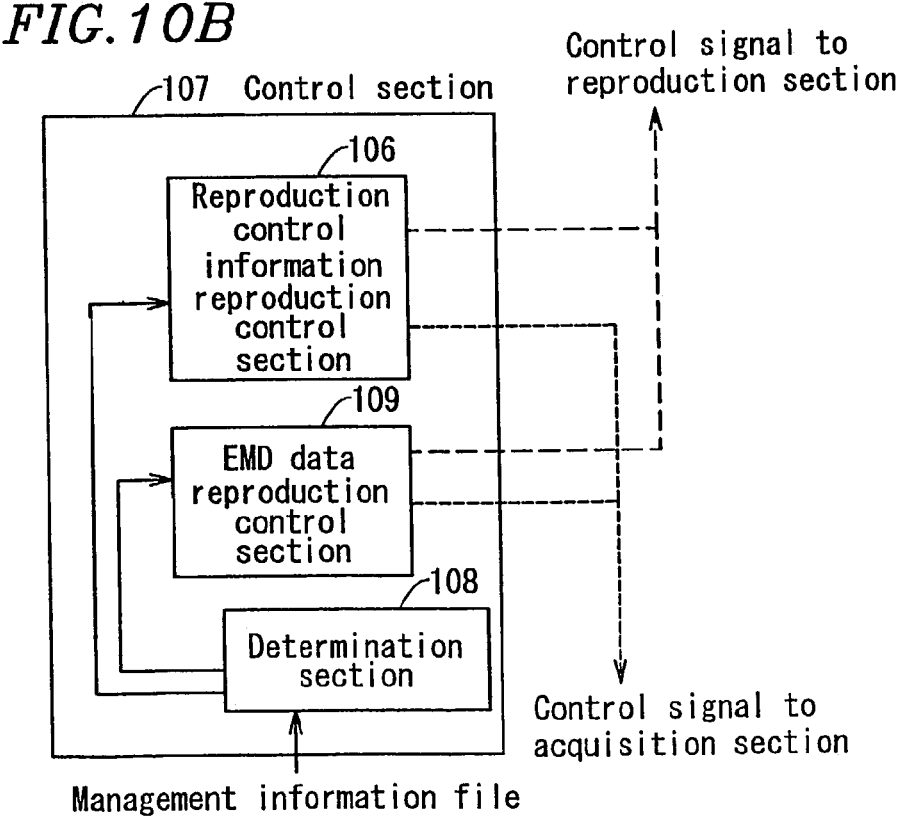
FIG. 10B is a block diagram illustrating part of another information reproducing apparatus according to Embodiment 1 of the present invention.

FIG. 10B is a block diagram illustrating part of another information reproducing apparatus according to Embodiment 1 of the present invention. The information reproducing apparatus shown in FIG. 10B is the same as the information reproducing apparatus 101 shown in FIG. 10A except that a control section 107 shown in FIG. 10B is different from the control section 103 shown in FIG. 10A.

The control section 107 includes a determination section 108, an EMD data reproduction control section 109, and a reproduction control information reproduction control section 106. The determination section 108 decodes the EMD recording method type 60 of the EMD data information 52 included in the audio data information 50 in which reproduction control information 51 associated with audio data to be reproduced is managed, so as to determine whether or not EMD data 20 can be reproduced.

When the determination section 108 determines that the EMD data 20 can be reproduced, the EMD data reproduction control section 109 outputs a control signal to the acquisition section 102 such that the acquisition section 102 acquires the EMD data 20 based on EMD data link information 61 and outputs the acquired EMD data 20 to the reproducing section 104. The control section 107 outputs a control signal to the reproducing section 104 such that the reproducing section 104 reproduces the EMD data 20.

When the determination section 108 determines that the EMD data 20 cannot be reproduced, as in the case described with reference to FIG. 10A, the reproduction control information reproduction control section 106 acquires link information, which indicates a recording position of the audio data, from the reproduction control information 51 included in the audio data information 50. The control section 107 outputs a control signal to the acquisition section 102 such that the acquisition section 102 acquires the audio data from the information recording medium 10 based on the acquired link information and outputs the acquired audio data to the reproducing section 104. The control section 107 outputs a control signal to the reproducing section 104 such that the reproducing section 104 reproduces the output audio data.

According to Embodiment 1 of the present invention, any information reproducing apparatus can reproduce audio data without decoding the data format of the EMD data 20, as long as the information reproducing apparatus can decode at least the management information file 12, there by ensuring reproduction compatibility.

4. Structure and operation of a copying apparatus according to Embodiment 1 of the present invention Next, a copying apparatus according to Embodiment 1, which copies audio data recorded in the information recording medium 10 into another information recording medium, will be described.

Figure 11A:
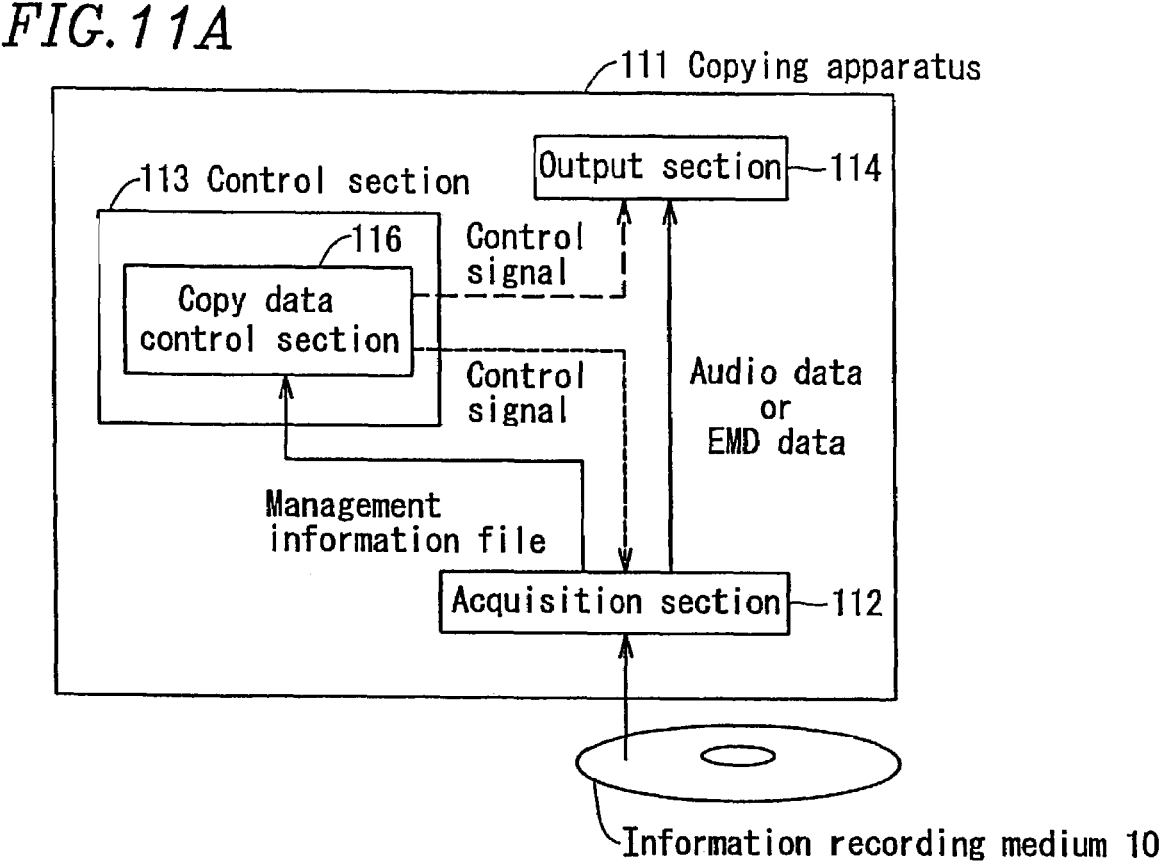
FIG. 11A is a block diagram of a copying apparatus according to Embodiment 1 of the present invention.

FIG. 11A is a block diagram of a copying apparatus 111 according to Embodiment 1 of the present invention. The copying apparatus 111 includes an acquisition section 112, a control section 113, and an output section 114. The control section 113 includes a copy data control section 116. The acquisition section 112 acquires a management information file 12 from the information recording medium 10 and outputs the acquired management information file 12 to the control section 113. In this case, the data format for the management information file 12 is as shown in FIGS. 5 and 6.

The copy data control section 116 in the control section 113 outputs a control signal to the acquisition section 112 such that the acquisition section 112 retrieves audio data information 50, which includes EMD data information 52 associated with EMD data 20 to be copied, from the management information file 12 so as to acquire copy audio data link information 62 included in copy audio data information 53 retained in the audio data information 50. The control section 113 outputs a control signal to the acquisition section 112 such that the acquisition section 112 acquires, based on the acquired copy audio data link information 62, audio data from a file designated by the copy audio data link information 62 and outputs the acquired audio data to the output section 114. The control section 113 outputs a control signal to the output section 114 such that the output section 114 outputs the audio data, which is output by the acquisition section 112, to another information recording medium.

Figure 11B:
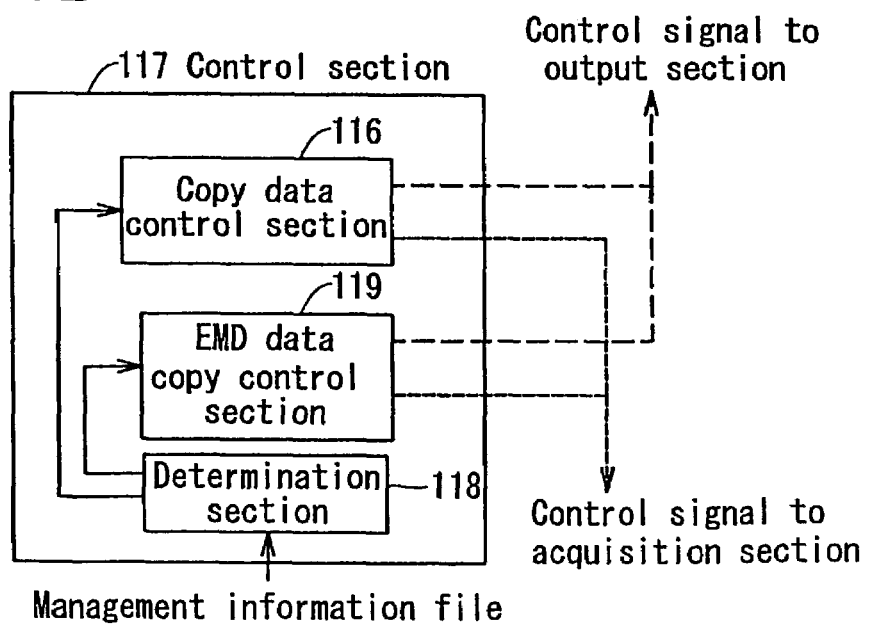
FIG. 11B is a block diagram illustrating part of another copying apparatus according to Embodiment 1 of the present invention.

FIG. 11B is a block diagram illustrating part of another copying apparatus according to Embodiment 1 of the present invention. The copying apparatus shown in FIG. 11B is the same as the copying apparatus 111 shown in FIG. 11A except that a control section 117 shown in FIG. 11B is different from the control section 113 shown in FIG. 11A.

The control section 117 includes a determination section 118, an EMD data copy control section 119, and a copy data control section 116. The determination section 118 decodes the EMD recording method type 60 of EMD data information 52 included in audio data information 50 in which EMD data 20 to be copied is managed, so as to determine whether or not data format for the EMD data 20 can be decoded. When the determination section 118 determines that the data format for the EMD data 20 can be decoded in (or supported by) another information recording medium to which the EMD data 20 is copied, the EMD data copy control section 119 outputs a control signal to the acquisition section 112 such that the acquisition section 112 acquires the EMD data 20 from the information recording medium 10 based on EMD data link information 61 and outputs the EMD data 20 to the output section 114. The control section 117 outputs a control signal to the output section 114 such that the output section 114 outputs the EMD data 20, which is output by the acquisition section 112, to the target recording medium.

When the determination section 118 determines that the data format for the EMD data 20 cannot be decoded in (is not supported by) the target information recording medium to which the EMD data 20 is copied, as in the case described with reference to FIG. 11A, the copy data control section 116 outputs a control signal to the acquisition section 112 such that the acquisition section 112 acquires, based on copy audio data link information 62 included in copy audio data information 53 retained in the audio data information 50, audio data from a file designated by the copy audio data link information 62 and outputs the acquired audio data to the output section 114. The control section 117 outputs a control signal to the output section 114 such that the output section 114 outputs the audio data, which is output by the acquisition section 112, to the target information recording medium.

According to Embodiment 1 of the present invention, where at least the management information file 12 can be decoded, audio data 21 included in the EMD data 20 can be copied into another information recording medium without decoding the data format of the EMD data 20.

(Embodiment 2)

1. Structure of an information recording medium according to Embodiment 2 of the present invention A data format for an information recording medium according to Embodiment 2 of the present invention includes a management information file, a reproduction audio data file, and an EMD data file. Such a data format ensures reproduction compatibility and allows audio data included in EMD data to be copied at high speed.

Figure 12:
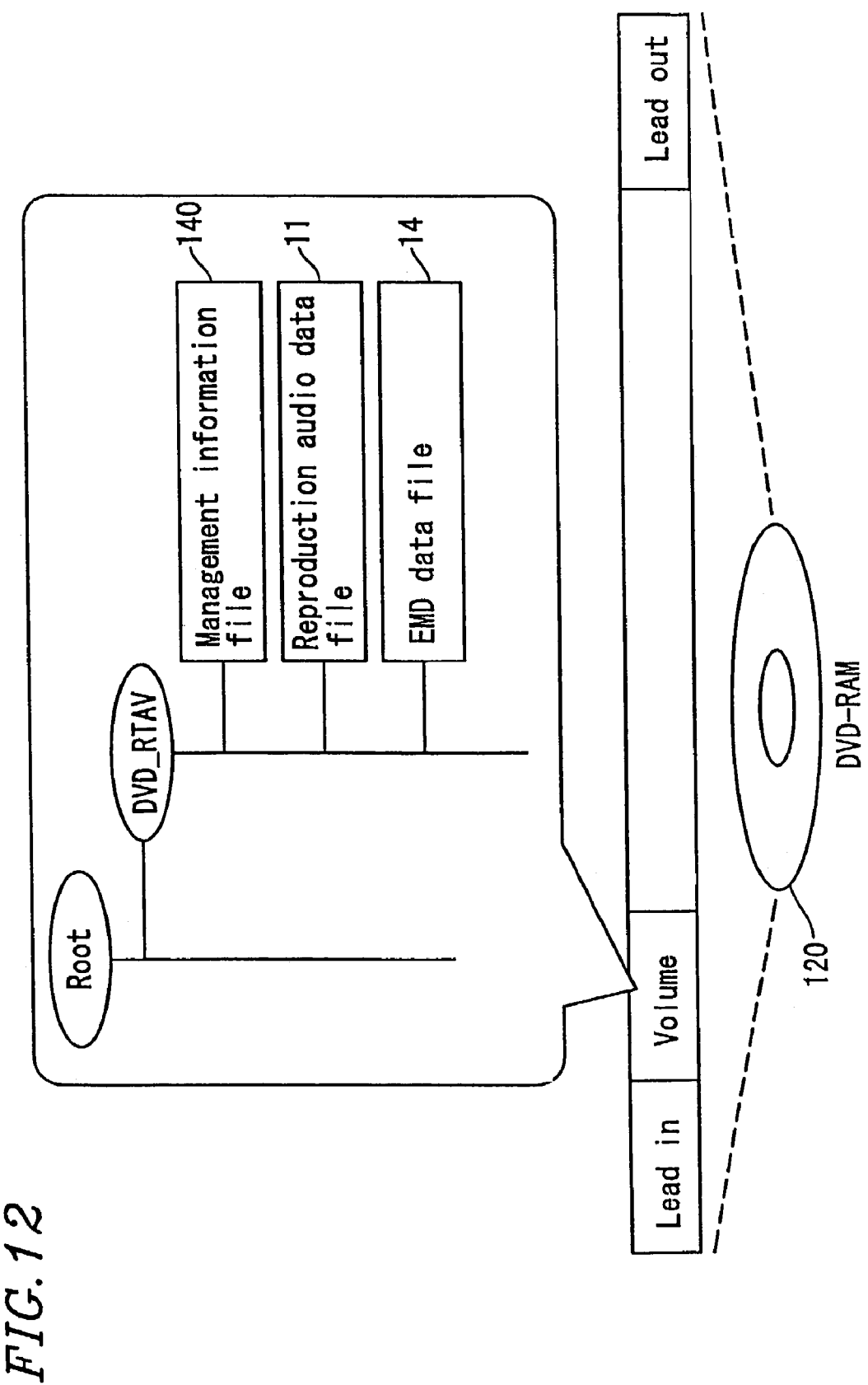
FIG. 12 is a schematic diagram of an information recording medium 120 according to Embodiment 2 of the present invention.

FIG. 12 is a schematic diagram of an information recording medium 120 according to Embodiment 2. For example, the information recording medium 120 is a DVD-RAM disc. The DVD-RAM disc 120 includes a reproduction audio data file 11 to which reproduction-compatible audio data (first audio data) is recorded, a management information file 140 to which reproduction control information mainly related to reproduction of the reproduction-compatible audio data is recorded, and an EMD data file 14 to which distributed EMD data is recorded as it is distributed.

Next, the data recorded to each file will be described in further detail.

Figure 13:
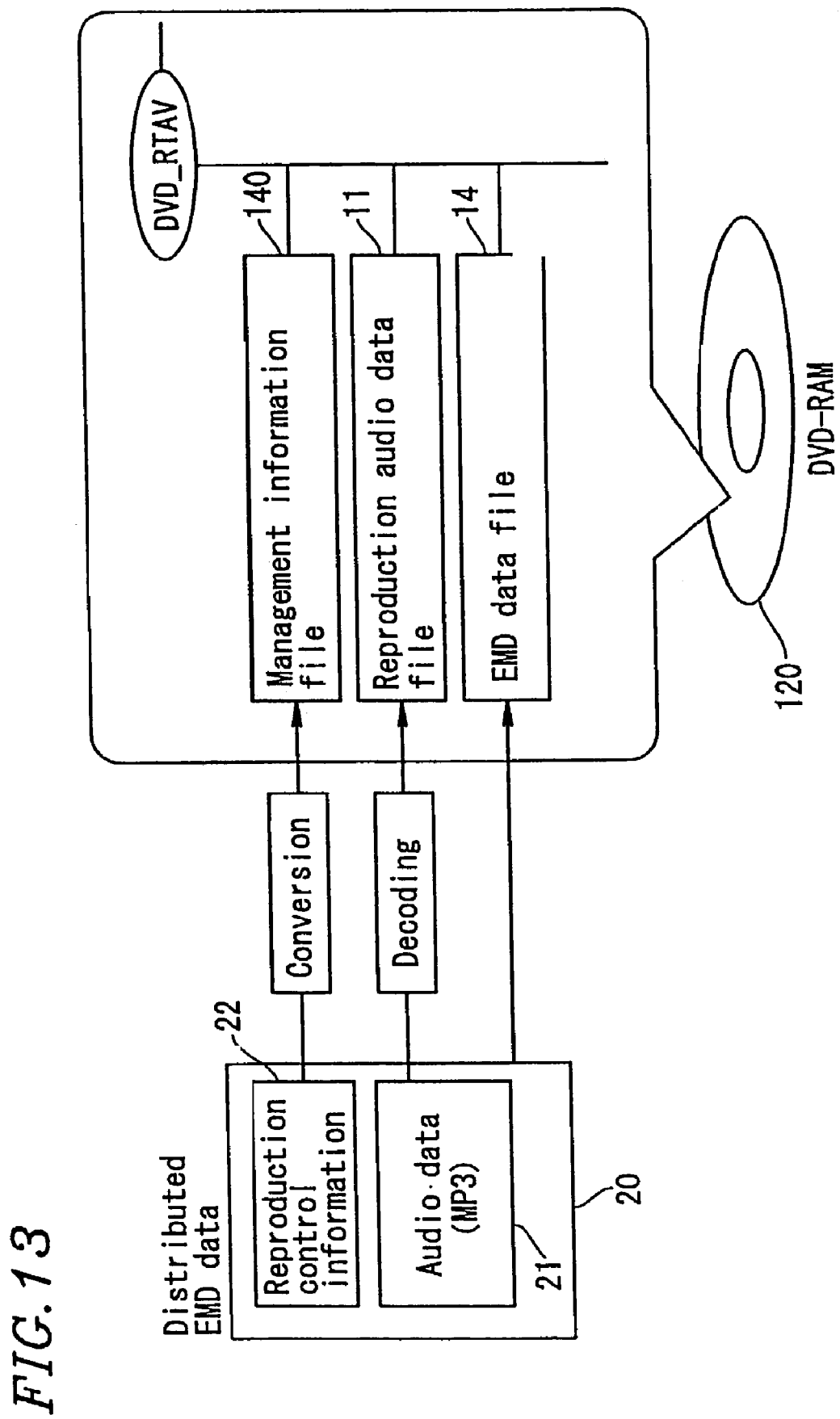
FIG. 13 illustrates how EMD data 20 is recorded to the information recording medium 120 of FIG. 12.

FIG. 13 schematically illustrates how EMD data 20 is recorded to the DVD-RAM disc 120 of FIG. 12. Similar to Embodiment 1, the EMD data 20 includes compressed audio data 21, which is compressed according to an MP3 method, and reproduction control information 22 associated with the compressed audio data 21.

When the EMD data 20 is distributed, the distributed EMD data 20 is recorded to the EMD data file 14 as it is distributed. The compressed MP3 audio data 21 included in the EMD data 20 is decoded so as to create LPCM reproduction-compatible audio data. The LPCM reproduction-compatible audio data is recorded to the reproduction audio data file 11. Information, which is converted from the reproduction control information 22 included in the EMD data 20 so as to be decodable in the DVD-RAM disc 120, and information, which is used for managing the EMD data file 14 and the reproduction audio data file 11, are recorded to the management information file 140. As a result, the distributed EMD data 20 is recorded to the EMD data file 14, and the reproduction-compatible audio data for ensuring reproduction compatibility, i.e., audio data decoded by an LPCM method, is recorded to the reproduction audio data file 11.

Figure 14:
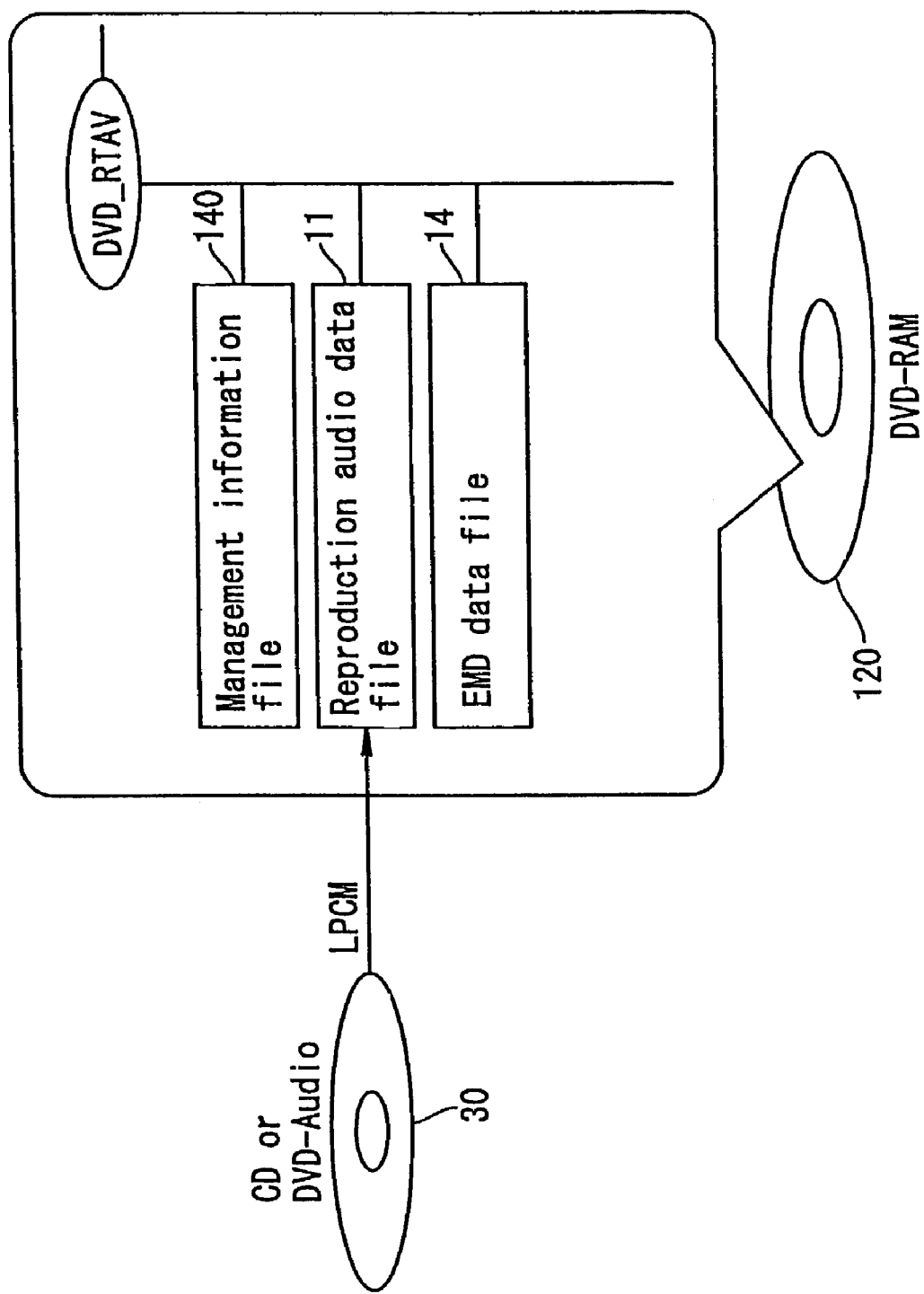
FIG. 14 illustrates how audio data recorded in a CD or DVD-Audio 30 is recorded to the information recording medium 120 of FIG. 12.

FIG. 14 schematically illustrates how audio data recorded in a CD or DVD-Audio 30 is recorded to the DVD-RAM disc 120 of FIG. 12. In Embodiment 2, the audio data recorded in the CD or DVD-Audio 30 is LPCM audio data. The LPCM audio data output from the CD or DVD-Audio 30 is recorded to the reproduction audio data file 11 as it is output as the LPCM audio data. Information for managing the reproduction audio data file 11 is recorded to the management information file 140. No information may be recorded to the EMD data file 14. As a result, the reproduction-compatible audio data for ensuring reproduction compatibility, i.e., the LPCM audio data, is recorded to the reproduction audio data file 11.

The structures of the reproduction audio data file 11 and the EMD data file 14 according to Embodiment 2 of the present invention are the same as those of corresponding elements shown in FIG. 4, and therefore the description thereof is omitted. As described above, the reproduction compatible-audio data is created by copying audio data recorded in the CD or DVD-Audio 30, or the like, or created by decoding the compressed audio data 21 recorded in the distributed EMD data 20. It is preferable that the reproduction compatible-audio data is encoded by an encoding method, which ensures reproduction compatibility, e.g., an LPCM method.

Figure 15:
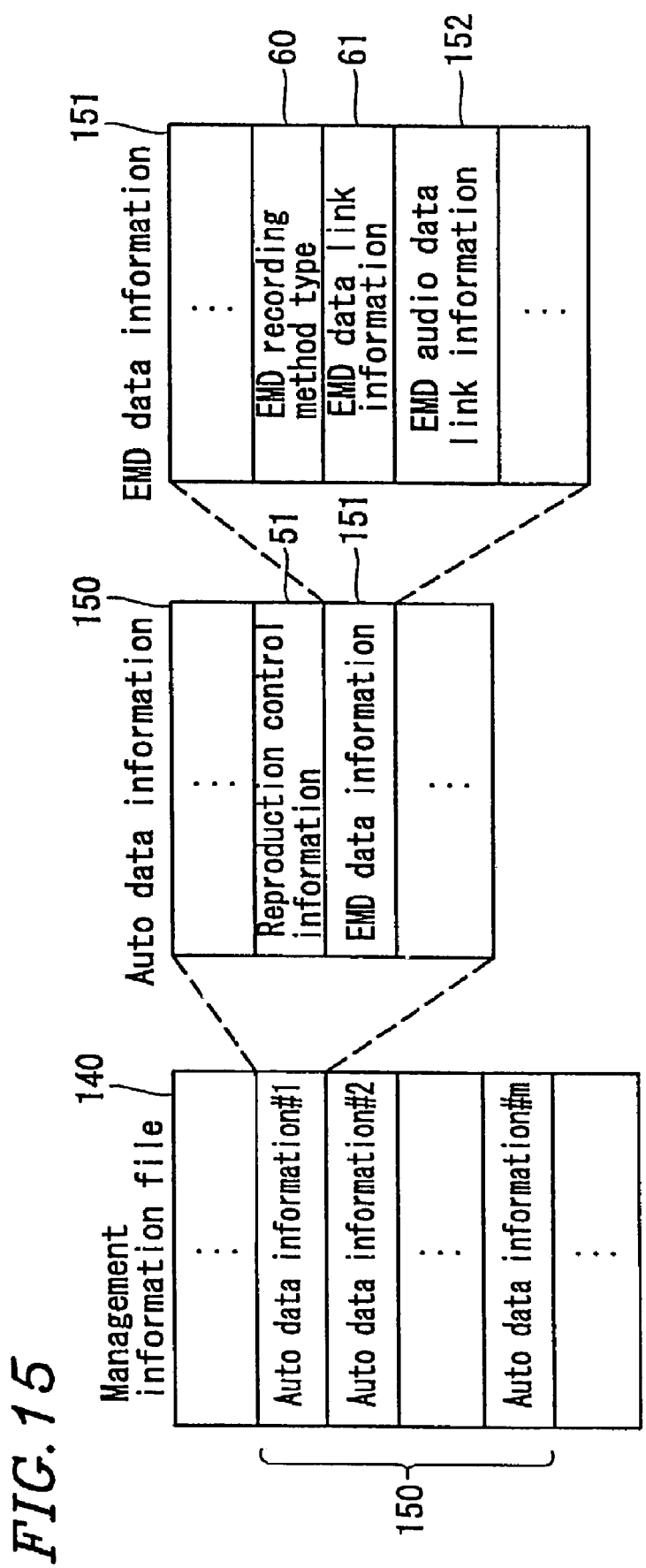
FIG. 15 is a diagram illustrating a detailed structure of a management information file 140.

FIG. 15 is a diagram illustrating a detailed structure of the management information file 140. The management information file 140 includes audio data information 150 for managing information related to reproduction-compatible audio data. A piece of audio data information is provided so as to correspond to a piece of reproduction-compatible audio data.

The audio data information 150 includes reproduction control information 51, which is related to reproduction-compatible audio data, and EMD data information 151. The EMD data information 151 includes an EMD recording method type 60, EMD data link information 61, and EMD audio data link information 152.

The reproduction control information 51, the EMD recording method type 60, and the EMD data link information 61 are the same as those described in Embodiment 1, and therefore the description thereof is omitted. The EMD data link information 152 includes information which represents a recording start position of the compressed audio data 21 in the EMD data 20, which is indicated by the EMD data link information 61.

Figure 16:
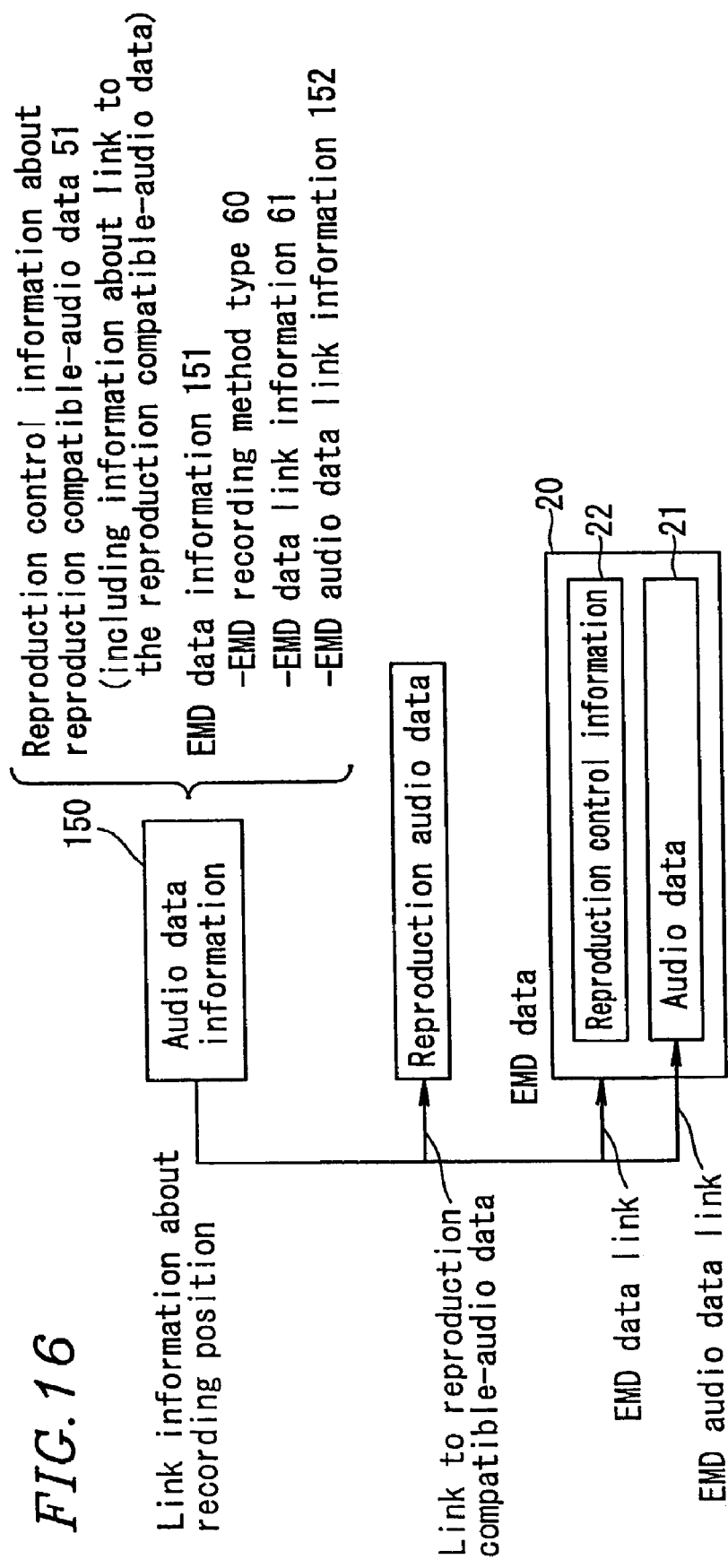
FIG. 16 illustrates link relationships among audio data information 150, reproduction-compatible audio data, and EMD data 20, and also illustrates audio data information 150.

FIG. 16 illustrates link relationships among the audio data information 150, the reproduction compatible-audio data, and the EMD data 20, and also illustrates information included in the audio data information 150.

As described above, when copying audio data, i.e., LPCM audio data, from a CD, a DVD, or the like, to a DVD-RAM disc, only reproduction compatible-audio data may be recorded to the DVD-RAM disc and EMD data may not be recorded. In such a case, the audio data information 150 may not include the EMD data information 151. Alternatively, when copying audio data, i.e., LPCM audio data, from a CD, a DVD, or the like, to a DVD-RAM disc, the reproduction compatible-audio data may be recorded to the DVD-RAM disc. Moreover, in addition to the LPCM audio data recorded to the DVD-RAM disc as it is output from the CD, DVD, or the like, MP3 audio data, which is created by compressing the LPCM audio data according to an MP3 method, may be recorded as EMD data to the DVD-RAM disc.

In general, the EMD recording method type 60 represents a distribution system's ID number or name which specifies the type of a distribution system for providing EMD data. In the above-described case, an ID or name, which provides an indication of compressed audio data created by being copied from a CD or a DVD, is recorded as the EMD recording method type 60. Moreover, information, which designates a recording start position of the compressed audio data, is recorded as the EMD datalink information 61 and information, which indicates the recording start position of the compressed audio data, is recorded as the EMD audio data link information 152.

Figure 17:
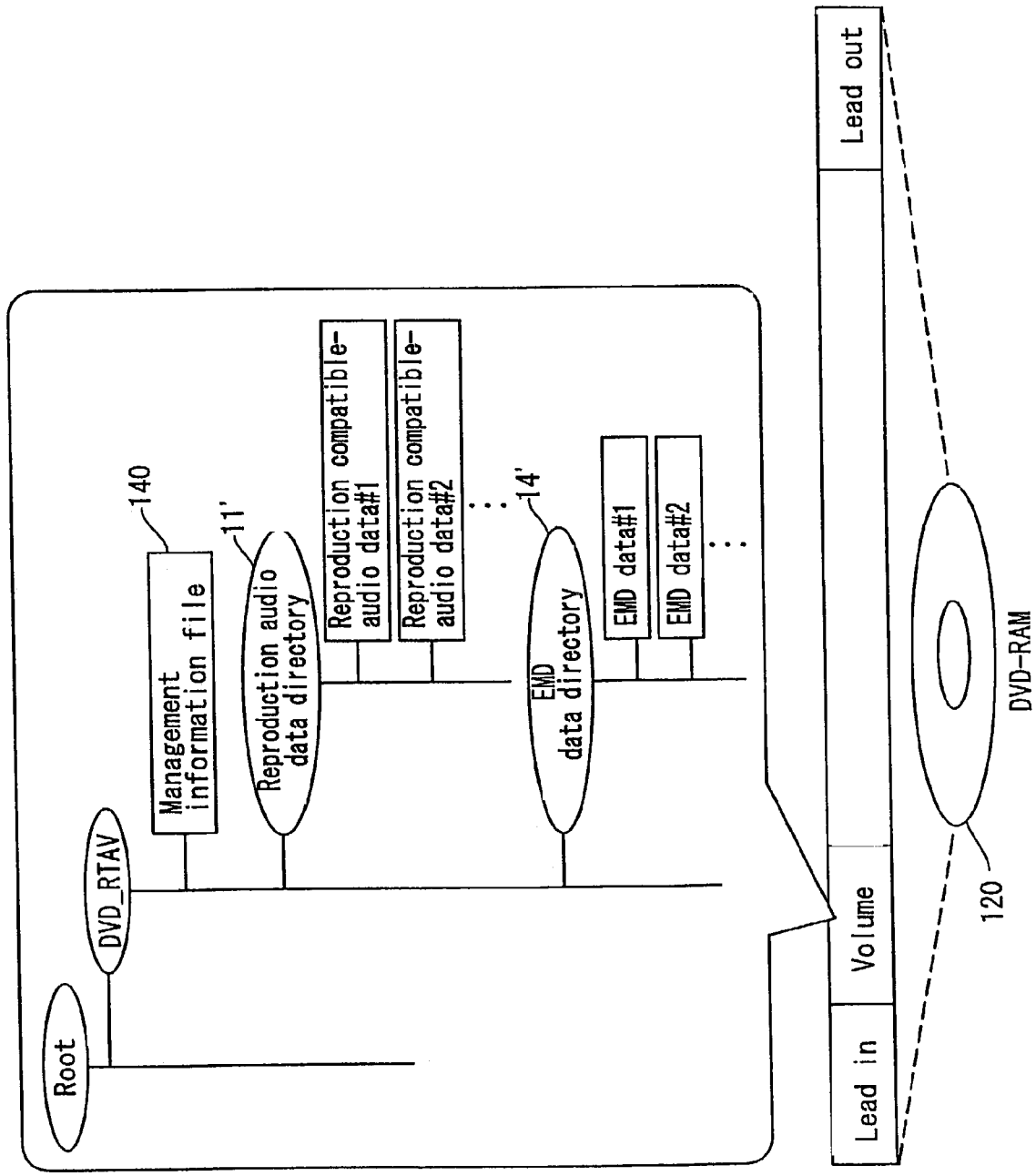
FIG. 17 is another schematic diagram of the information recording medium 120 according to Embodiment 2 of the present invention.

FIG. 17 is another schematic diagram of the information recording medium (DVD-RAM disc) 120 according to Embodiment 2. In the information recording medium 120 of FIG. 17, a reproduction audio data directory 11' and an EMD data directory 14' are included in place of the reproduction audio data file 11 and the EMD data file 14, respectively. Each piece of reproduction-compatible audio data and EMD data may be recorded as a file under a corresponding directory.

According to Embodiment 2 of the present invention, reproduction compatibility is ensured by reproducing the reproduction compatible-audio data and EMD audio data link information is used for copying audio data included in the EMD data 20. Therefore, it is possible to provide an information recording medium which can be copied by even a copying apparatus which cannot decode the data format for the EMD data 20.

2. Structure and operation of an information recording apparatus according to Embodiment 2 of the present invention Next, an information recording apparatus according to Embodiment 2 of the present invention, which records audio data to an information recording medium 186, will be described.

Figure 18:
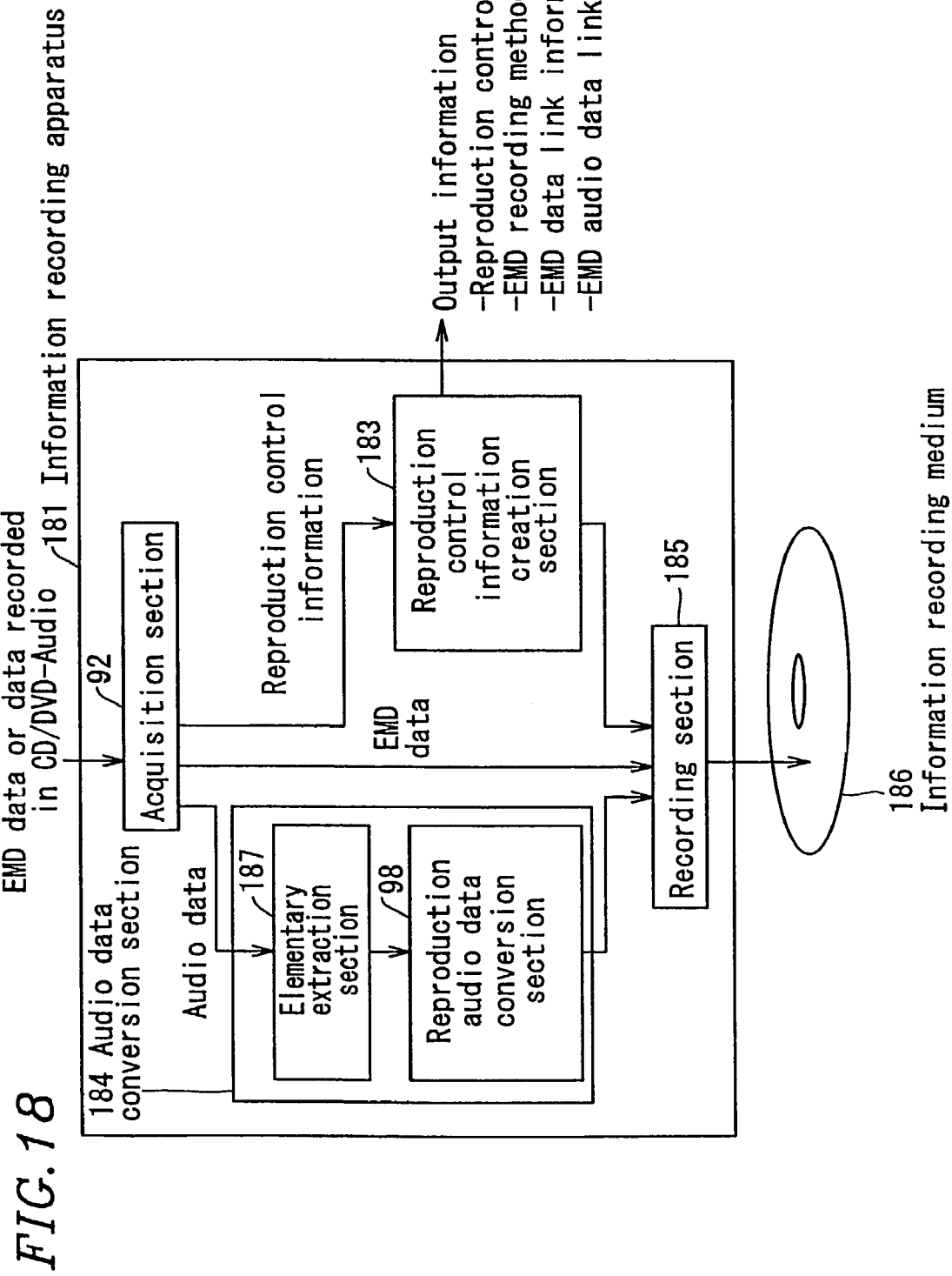
FIG. 18 is a block diagram of an information recording apparatus 181 according to Embodiment 2 of the present invention.

FIG. 18 is a block diagram of an information recording apparatus 181 according to Embodiment 2. The information recording apparatus 181 includes an acquisition section 92, a reproduction control information creation section 183, an audio data conversion section 184, and a recording section 185. The audio data conversion section 184 includes an elementary extraction section 187, and a reproduction audio data conversion section 98.

Next, a recording operation for recording the EMD data 20 distributed by a music distribution system to the information recording medium 186 will be described. In the case of recording the EMD data 20 (FIG. 2), which includes reproduction control information 22 and compressed audio data 21, using the information recording apparatus 181, as in a similar manner to Embodiment 1, the acquisition section 92 acquires the EMD data 20 and outputs the compressed audio data 21 the reproduction control information 22, and the EMD data 20 to the audio data conversion section 184, the reproduction control information creation section 183, and the recording section 185, respectively.

The elementary extraction section 187 extracts only elementary portions from the compressed audio data 21 output to the audio data conversion section 184 and outputs the elementary portions to the reproduction audio data conversion section 98. Similar to Embodiment 1, in the reproduction audio data conversion section 98, the compressed audio data 21 from which the elementary portions are extracted, is converted into audio data encoded by an encoding method (e.g., an LPCM method), which ensures reproduction compatibility, as reproduction compatible-audio data. Thereafter, the audio data conversion section 184 outputs the reproduction compatible-audio data to the recording section 185. Note that when the audio data input to the elementary extraction section 187 includes only elementary portions, the input audio data is output to the reproduction audio data conversion section 98 as it is input thereto. In the reproduction audio data conversion section 98, if the input audio data including only the elementary portions conforms to an encoding method which is used for conversion, no conversion operations are performed on the input audio data.

The reproduction control information creation section 183 creates reproduction control information 51 associated with the reproduction compatible-audio data, the EMD recording method type 60 which represents the type of a method for recording the EMD data 20 and is based on the reproduction control information 22 included in the EMD data 20, EMD data link information 61 which indicates a recording position of the EMD data 20, and EMD audio data link information 152 which indicates a recording start position of the compressed audio data 21 included in the EMD data 20. The reproduction control information creation section 183 outputs these data to the recording section 185.

The recording section 185 records reproduction compatible-audio data output by the audio data conversion section 184, an output result provided by the reproduction control information creation section 183, and the EMD data 20 output by the acquisition section 92 to the reproduction audio data file 11, the management information file 140, and the EMD data file 14, respectively, in the information recording medium 186.

Each piece of the reproduction-compatible audio data and the EMD data 20 may be recorded as a file under the reproduction audio data directory 11' (FIG. 17) and the EMD data directory 14' (FIG. 17), respectively.

Next, an operation for recording audio data recorded in a CD or a DVD-Audio to the information recording medium 186 using the information recording apparatus 181 will be described. The acquisition section 92 acquires audio data input thereto. The audio data acquired by the acquisition section 92 is output to the audio data conversion section 184. The operation of the audio data conversion section 184 is the same as that of the audio data conversion section 184 in the case where the EMD data 20 is input to the information recording apparatus 181, and therefore the description thereof is omitted.

The reproduction control information creation section 183 creates the reproduction control information 51 associated with the reproduction compatible-audio data and outputs the reproduction control information 51 to the recording section 185. The recording section 185 records the reproduction compatible-audio data output by the audio data conversion section 184 and an output result provided by the reproduction control information creation section 183 the reproduction audio data file 11 and the management information file 140, respectively, in the information recording medium 186. Note that each piece of the reproduction compatible-audio data may be recorded as a file under the reproduction audio data directory 11'. In such a manner, the data format for the information recording medium 120 described in "1. Structure of an information recording medium according to Embodiment 2 of the present invention" is obtained.

According to Embodiment 2 of the present invention, it is possible to provide the information recording medium 120 to which the reproduction compatible-audio data and the EMD data 20 are recorded and in which the management information file 140 can be referred for these data. Moreover, in the information recording medium 120, if at least the management information file 140 can be decoded, reproduction compatibility with any reproducing apparatus can be ensured by reproducing the reproduction-compatible audio data, and the EMD audio data link information is used for copying the compressed audio data 21 included in the EMD data 20 without decoding the data format for the EMD data 20.

3. Structure and operation of an information reproducing apparatus according to Embodiment 2 of the present invention Next, an information reproducing apparatus according to Embodiment 2 of the present invention, which reproduces audio data recorded in the information recording medium 120, will be described.

Figure 19A:
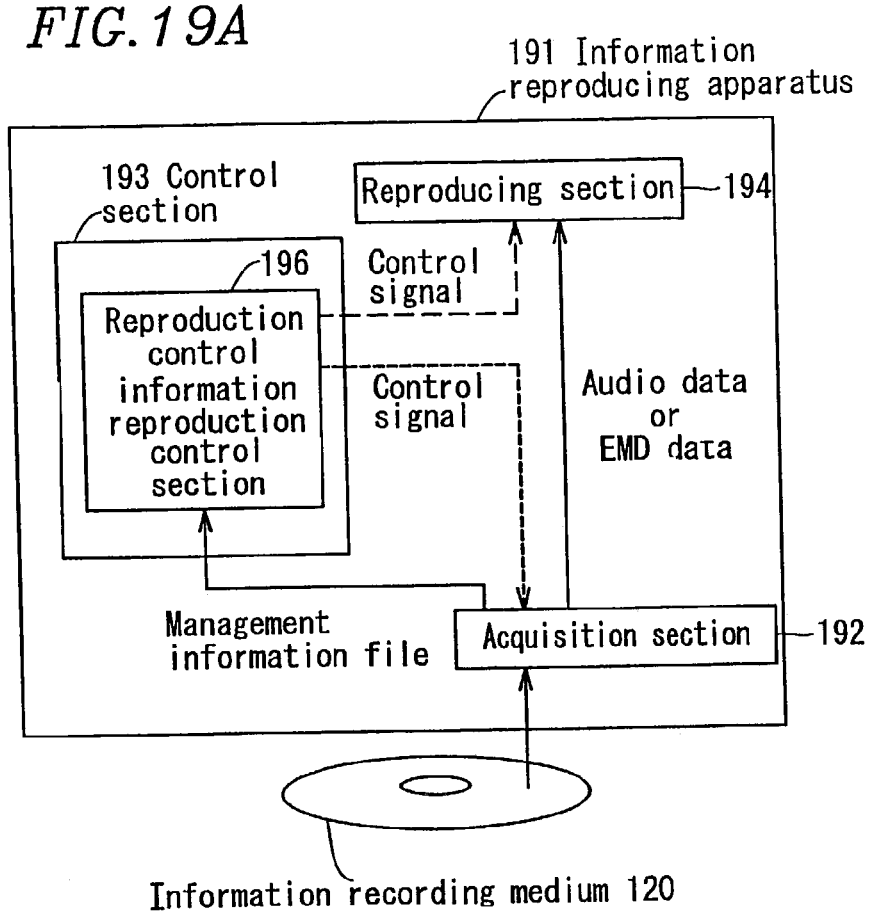
FIG. 19A is a block diagram of an information reproducing apparatus 191 according to Embodiment 2 of the present invention.

FIG. 19A is a block diagram of an information reproducing apparatus 191 according to Embodiment 2 of the present invention. The information reproducing apparatus 191 includes an acquisition section 192, a control section 193, and a reproducing section 194. The control section 193 includes a reproduction control information reproduction control section 196.

The acquisition section 192 acquires a management information file 140 from the information recording medium 120 and outputs the management information file 140 to the control section 193. The data format for the management information file 140 is as shown in FIG. 15.

Next, the reproduction control information reproduction control section 196 in the control section 193 decodes the management information file 140 so as to retrieve audio data information 50, which includes reproduction control information 51 associated with audio data to be reproduced, from the management information file 140. The reproduction control information reproduction control section 196 acquires link information, which indicates a recording position of the audio data, from the reproduction control information 51 in the retrieved audio data information 50. The control section 193 outputs a control signal to the acquisition section 192 such that the acquisition section 192 acquires the audio data from the information recording medium 120 based on the link information and outputs the acquired audio data to the reproducing section 194. The control section 193 outputs a control signal to the reproducing section 194 such that the reproducing section 194 reproduces the output audio data.

Figure 19B:
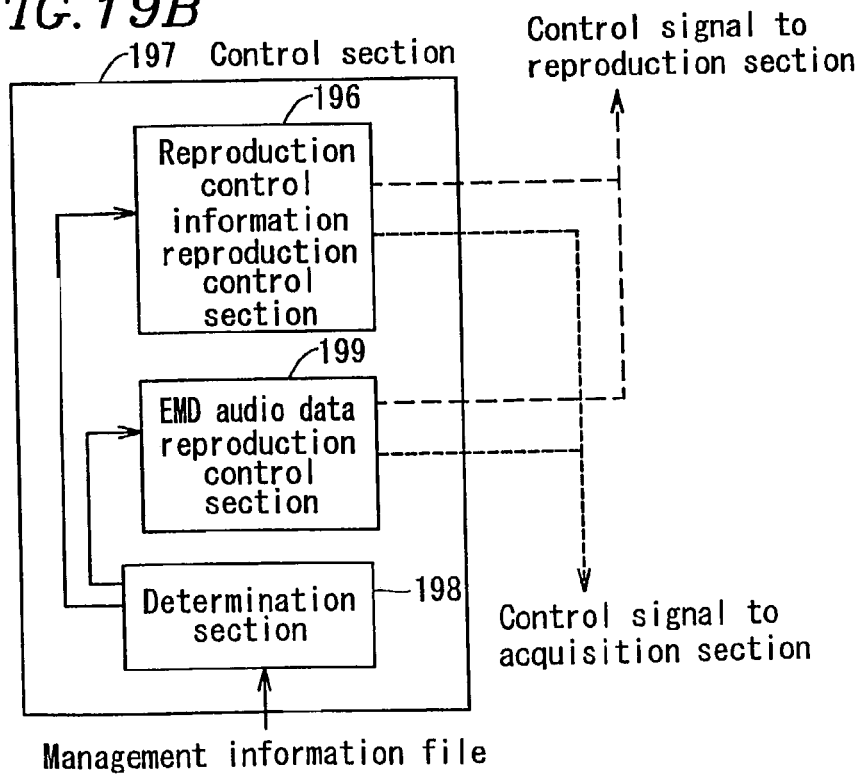
FIG. 19B is a block diagram illustrating part of another information reproducing apparatus according to Embodiment 2 of the present invention.

FIG. 19B is a block diagram illustrating part of another information reproducing apparatus according to Embodiment 2 of the present invention. The information reproducing apparatus shown in FIG. 19B is the same as the information reproducing apparatus 191 shown in FIG. 19A except that a control section 197 shown in FIG. 19B is different from the control section 193 shown in FIG. 19A.

The control section 197 includes a determination section 198, an EMD audio data reproduction control section 199, and a reproduction control information reproduction control section 196. The determination section 198 decodes the EMD recording method type 60 of the EMD data information 151 included in the audio data information 50 in which reproduction control information 51 associated with audio data to be reproduced is managed, so as to determine whether or not compressed audio data 21 included in the EMD data 20 can be reproduced. As a result, when the determination section 198 determines that the compressed audio data 21 can be reproduced, the EMD data reproduction control section 199 outputs a control signal to the acquisition section 192 such that the acquisition section 192 acquires the compressed audio data 21 included in the EMD data 20 based on EMD data link information 152 and outputs the acquired compressed audio data 21 to the reproducing section 194. The control section 197 outputs a control signal to the reproducing section 194 such that the reproducing section 194 reproduces the acquired compressed audio data 21.

When the determination section 198 determines that the compressed audio data 21 cannot be reproduced, as in the case described with reference to FIG. 19A, the reproduction control information reproduction control section 196 outputs a control signal to the acquisition section 192 such that the acquisition section 192 acquires link information, which indicates a recording position of audio data, from the reproduction control information 51 included in the audio data information 50, and acquires the audio data from the information recording medium 120 based on the link information, so as to output the acquired audio data to the reproducing section 194. The control section 197 outputs a control signal to the reproducing section 194 such that the reproducing section 194 reproduces the acquired audio data.

Figure 19C:
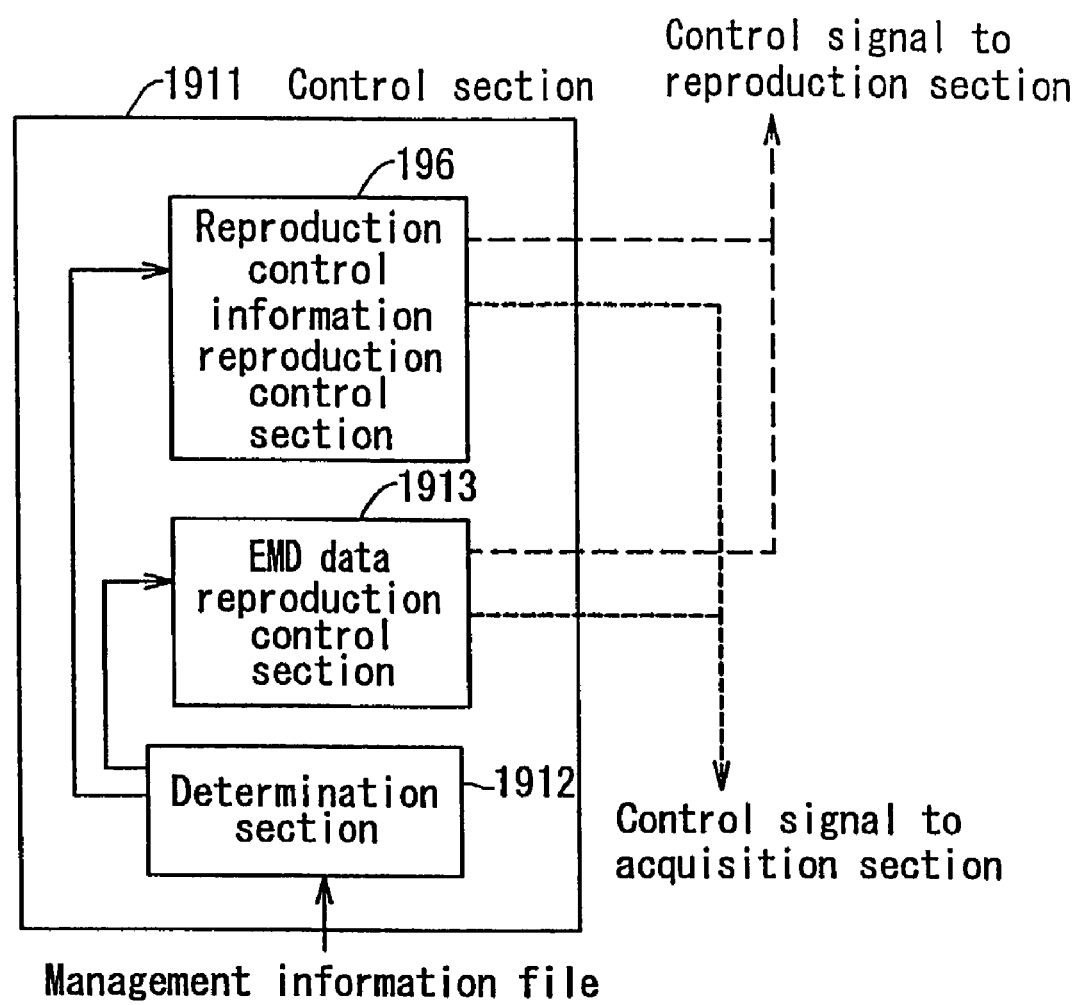
FIG. 19C is a block diagram illustrating part of still another information reproducing apparatus according to Embodiment 2 of the present invention.

FIG. 19C is a block diagram illustrating part of still another information reproducing apparatus according to Embodiment 2 of the present invention. The information recording apparatus illustrated in FIG. 19C is the same as the information recording apparatus 191 except that a control section 1911 illustrated in FIG. 19C is different from the control section 197 illustrated in FIG. 19B. The control section 1911 includes a determination section 1912, an EMD data reproduction control section 1913, and a reproduction control information reproduction control section 196. The determination section 1912 decodes the EMD recording method type 60 of the EMD data information 151 included in the audio data information 50 in which reproduction control information 51 associated with audio data to be reproduced is managed, so as to determine whether or not the EMD data 20 can be reproduced. As a result, when the determination section 1912 determines that the EMD data 20 can be reproduced, the EMD data reproduction control section 1913 outputs a control signal to the acquisition section 192 such that the acquisition section 192 acquires the EMD data 20 based on EMD data link information 61 and outputs the acquired EMD data 20 to the reproducing section 194. The control section 1911 outputs a control signal to the reproducing section 194 such that the reproducing section 194 reproduces the output EMD data 20.

When the determination section 1912 determines that the EMD data 20 cannot be reproduced, as in the case described with reference to FIG. 19B, the reproduction control information reproduction control section 196 outputs a control signal to the acquisition section 192 such that the acquisition section 192 acquires link information, which indicates a recording position of audio data, from the reproduction control information 51 included in the audio data information 50 and acquires the audio data from the information recording medium 120 based on the link information, so as to output the acquired audio data to the reproducing section 194. The control section 1911 outputs a control signal to the reproducing section 194 such that the reproducing section 194 reproduces the acquired audio data.

According to Embodiment 2 of the present invention, any information reproducing apparatus can reproduce audio data without decoding the data format for the EMD data 20, as long as the information reproducing apparatus can decode at least the management information file 140, thereby ensuring reproduction compatibility.

4. Structure and operation of a copying apparatus according to Embodiment 2 of the present invention Next, a copying apparatus according to Embodiment 2 of the present invention, which copies audio data recorded in the information recording medium 120 into another information recording medium, will be described.

Figure 20A:
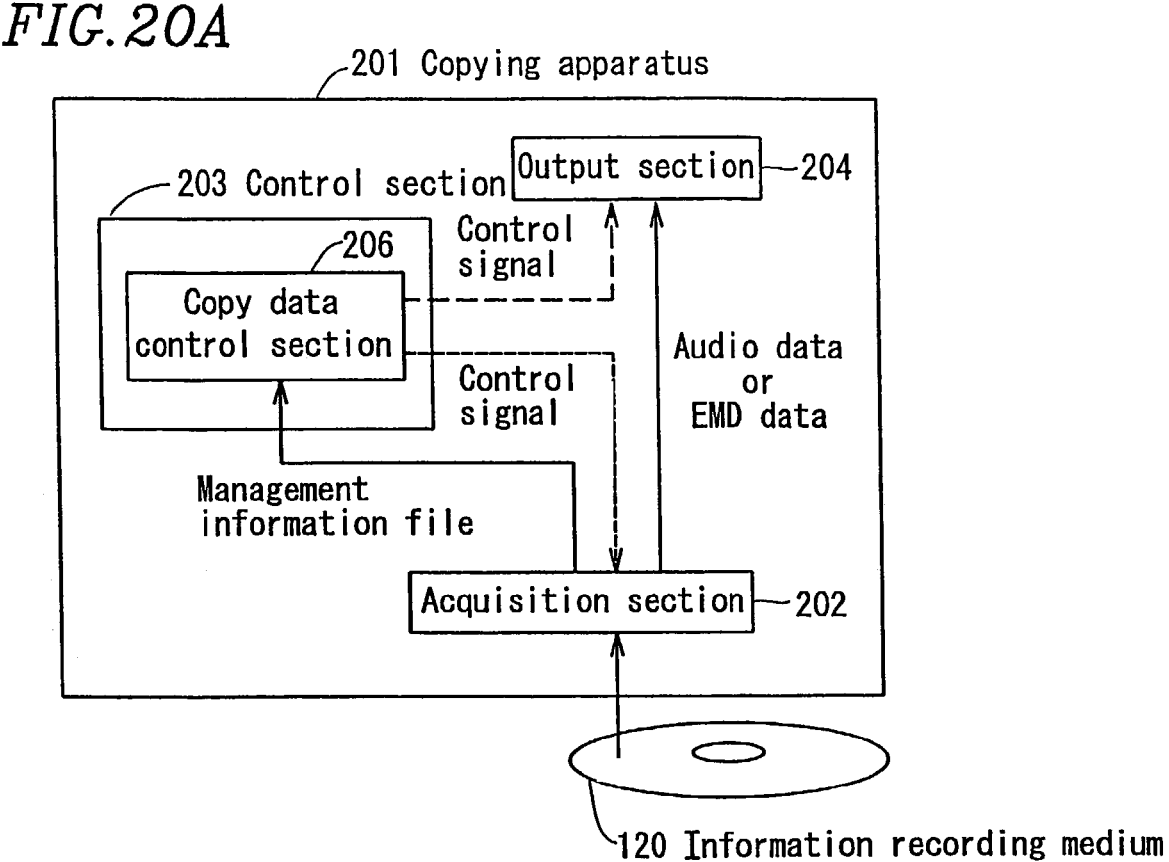
FIG. 20A illustrates a copying apparatus 201 according to Embodiment 2 of the present invention.

FIG. 20A is a block diagram of a copying apparatus 201 according to Embodiment 2 of the present invention. The copying apparatus 201 includes an acquisition section 202, a control section 203, and an output section 204. The control section 203 includes a copy data control section 206. The acquisition section 202 acquires a management information file 50 from the information recording medium 120 and outputs the acquired management information file 50 to the control section 203. In this case, the data format for the management information file 50 is as shown in FIG. 15.

The copy data control section 206 in the control section 203 outputs a control signal to the acquisition section 202 such that the acquisition section 202 retrieves EMD data information 151 included in the audio data information 150 in which the EMD data 20 to be reproduced is managed, from the management information file 50 and acquires EMD audio data link information 152 retained in the EMD data information 151. The control section 203 outputs a control signal to the acquisition section 202 such that the acquisition section 202 acquires compressed audio data 21 included in the EMD data 20, which is recorded in the information recording medium 120, based on the acquired EMD audio data link information 152 and outputs the acquired compressed audio data 21 to the output section 204. The control section 203 outputs a control signal to the output section 204 such that the output section 204 outputs the compressed audio data 21.

Figure 20B:
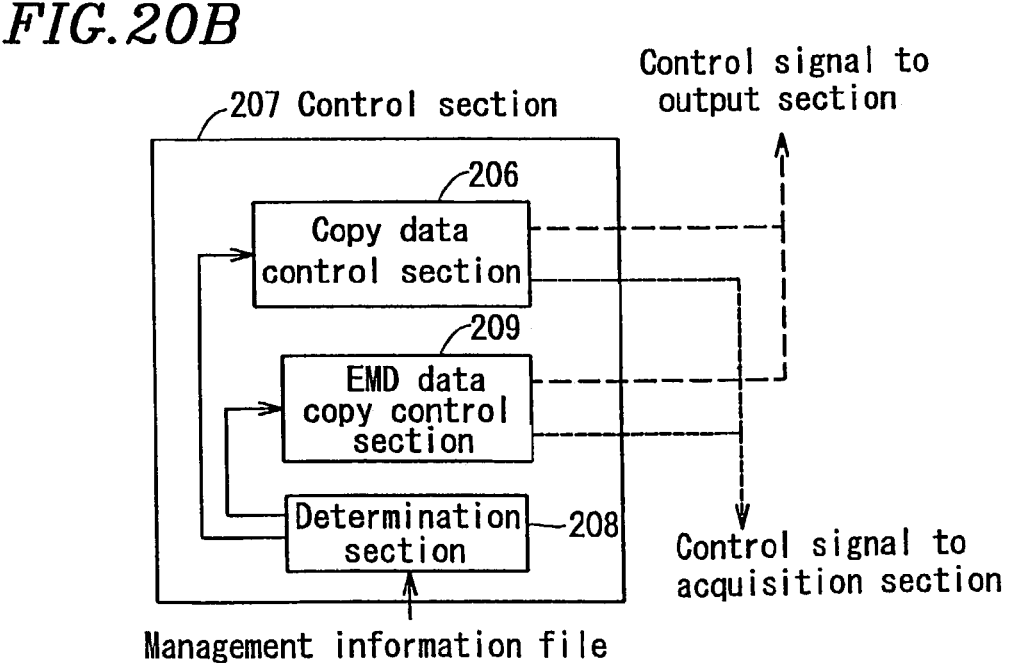
FIG. 20B is a block diagram illustrating part of another copying apparatus according to Embodiment 2 of the present invention.

FIG. 20B is a block diagram illustrating part of another copying apparatus according to Embodiment 2 of the present invention. The copying apparatus shown in FIG. 20B is the same as the copying apparatus 201 shown in FIG. 20A except that a control section 207 shown in FIG. 20B is different from the control section 203 shown in FIG. 20A.

The control section 207 includes a determination section 208, an EMD data copy control section 209, and a copy data control section 206. The determination section 208 decodes the EMD recording method type 60 of the EMD data information 151 included in the audio data information 50 for managing EMD data 20 to be copied, so as to determine whether or not the data format for the EMD data 20 to be copied can be decoded. As a result, when the determination section 208 determines that the data format for the EMD data 20 can be decoded, the EMD data copy control section 209 outputs a control signal to the acquisition section 202 such that the acquisition section 202 acquires the EMD data 20 from the information recording medium 120 based on the EMD data link information 61 and outputs the acquired EMD data 20 to the output section 204. The control section 207 outputs a control signal to the output section 204 such that the output section 204 outputs the compressed audio data 21 included in the EMD data 20.

When the determination section 208 determines that the data format for the EMD data 20 cannot be decoded, as in the case described with reference to FIG. 20A, the copy data control section 206 outputs a control signal to the acquisition section 202 such that the acquisition section 202 retrieves the EMD data information 151 included in the audio data information 150 in which the EMD data 20 to be copied is managed, from the management information file 50 so as to acquire EMD audio data link information 152 retained in the EMD data information 151. The control section 207 outputs a control signal to the acquisition section 202 such that the acquisition section 202 acquires compressed audio data 21 included in the EMD data 20, which is recorded in the information recording medium 120, based on the acquired EMD audio data link information 152, and outputs the acquired compressed audio data 21 to the output section 204. The control section 207 outputs a control signal to the output section 204 such that the output section 204 outputs the compressed audio data 21.

According to Embodiment 2 of the present invention, any copying apparatus can copy the EMD data 20 from one recording medium to another recording medium, without decoding the data format for the EMD data 20, as long as the copying apparatus can decode at least the management information file 140.

(Embodiment 3)

1. Structure of an information recording medium according to Embodiment 3 of the present invention A data format for an information recording medium according to Embodiment 3 of the present invention includes a management information file, a reproduction audio data file, and a copy audio data file. Such a data format ensures reproduction compatibility and allows audio data included in EMD data to be copied at high speed.

Figure 21:
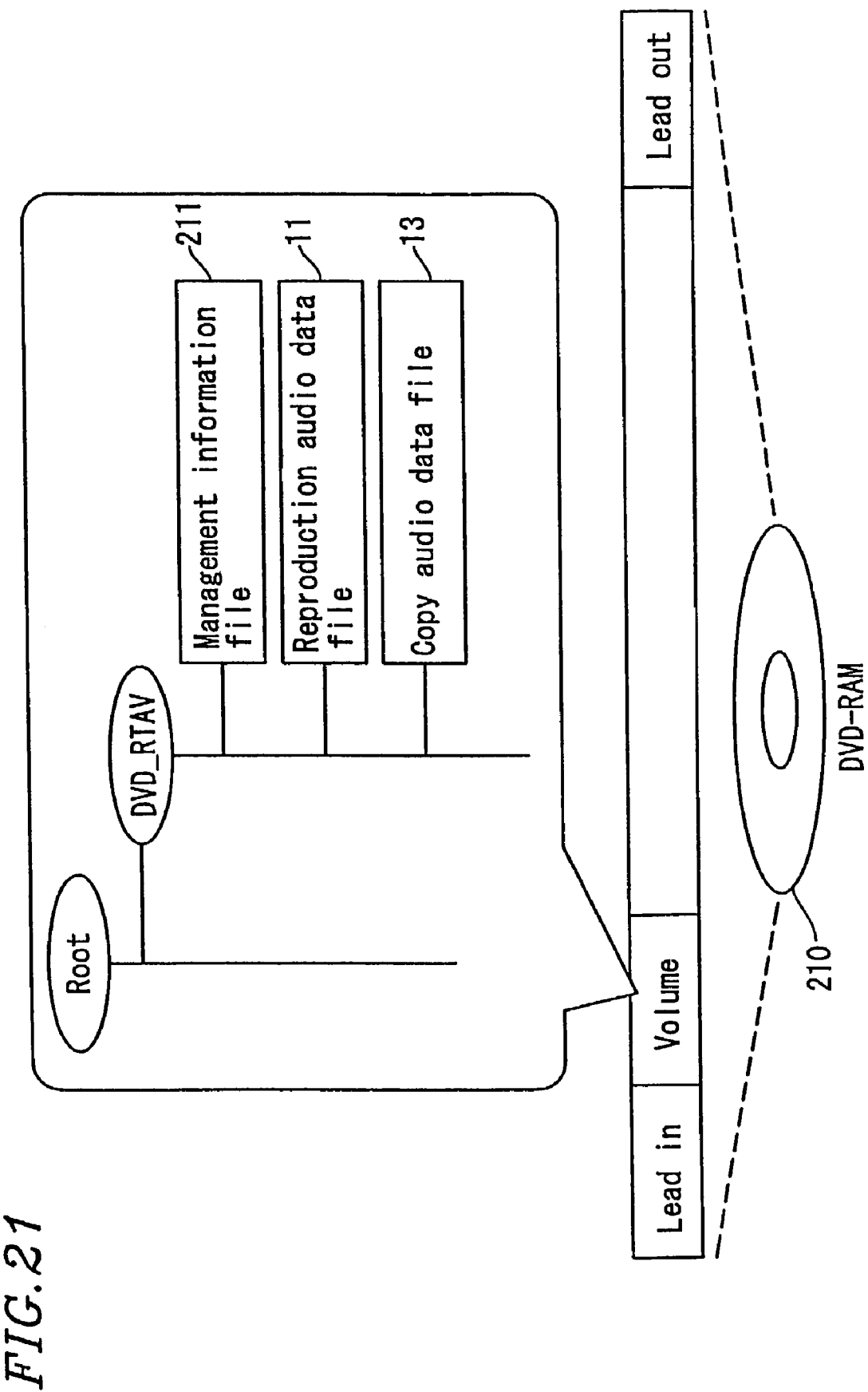
FIG. 21 is a schematic diagram of an information recording medium 210 according to Embodiment 3 of the present invention.

FIG. 21 is a schematic diagram of an information recording medium 210 according to Embodiment 3. For example, the information recording medium 210 is a DVD-RAM disc. The DVD-RAM disc 210 includes a reproduction audio data file 11 to which reproduction-compatible audio data (first audio data) is recorded, a copy audio data file 13 to which copy audio data (second data) is recorded, and a management information file 211 to which reproduction control information mainly related to reproduction of the reproduction-compatible audio data is recorded.

Next, the data recorded to each file will be described in further detail.

Figure 22:
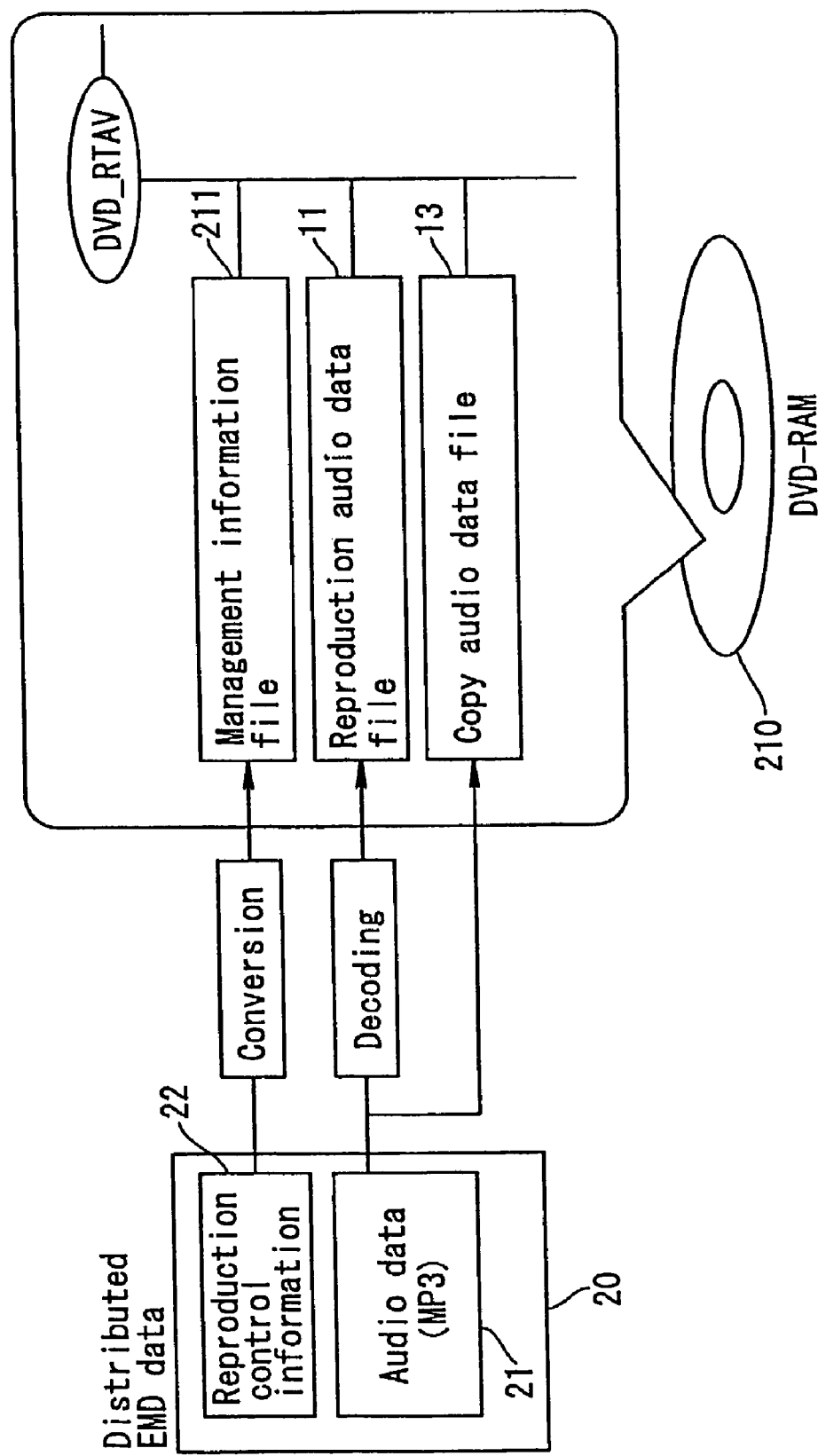
FIG. 22 illustrates how EMD data 20 is recorded to the information recording medium 210 of FIG. 21.

FIG. 22 schematically illustrates how the EMD data 20 is recorded to the DVD-RAM disc 210 shown in FIG. 21. Similar to Embodiments 1 and 2, the EMD data 20 includes compressed audio data 21 which is compressed according to an MP3 method, and reproduction control information 22 associated with the compressed audio data 21.

When the EMD data 20 is distributed, the compressed audio data 21, which is created by being compressed according to an MP3 method and is included in the distributed EMD data 20, is decoded so as to create LPCM reproduction compatible-audio data. The created LPCM reproduction compatible-audio data is recorded to the reproduction audio data file 11. The MP3 compressed audio data 21 included in the EMD data 20 is recorded to the copy audio data file 13 as it is distributed. Lastly, information, which is converted from reproduction control information 22 included in the EMD data 20 so as to be decodable in the DVD-RAM disc 210, and information, which is used for managing the reproduction audio data file 11 and the copy audio data file 13, are recorded to the management information file 211. As a result, reproduction-compatible audio data which ensures reproduction compatibility, i.e., audio data decoded according to an LPCM method, is recorded to the reproduction audio data file 11, and compressed audio data used for realizing high-speed copying, i.e., the compressed audio data 21 included in the EMD data 20, is recorded to the copy audio data file 13.

Figure 23:
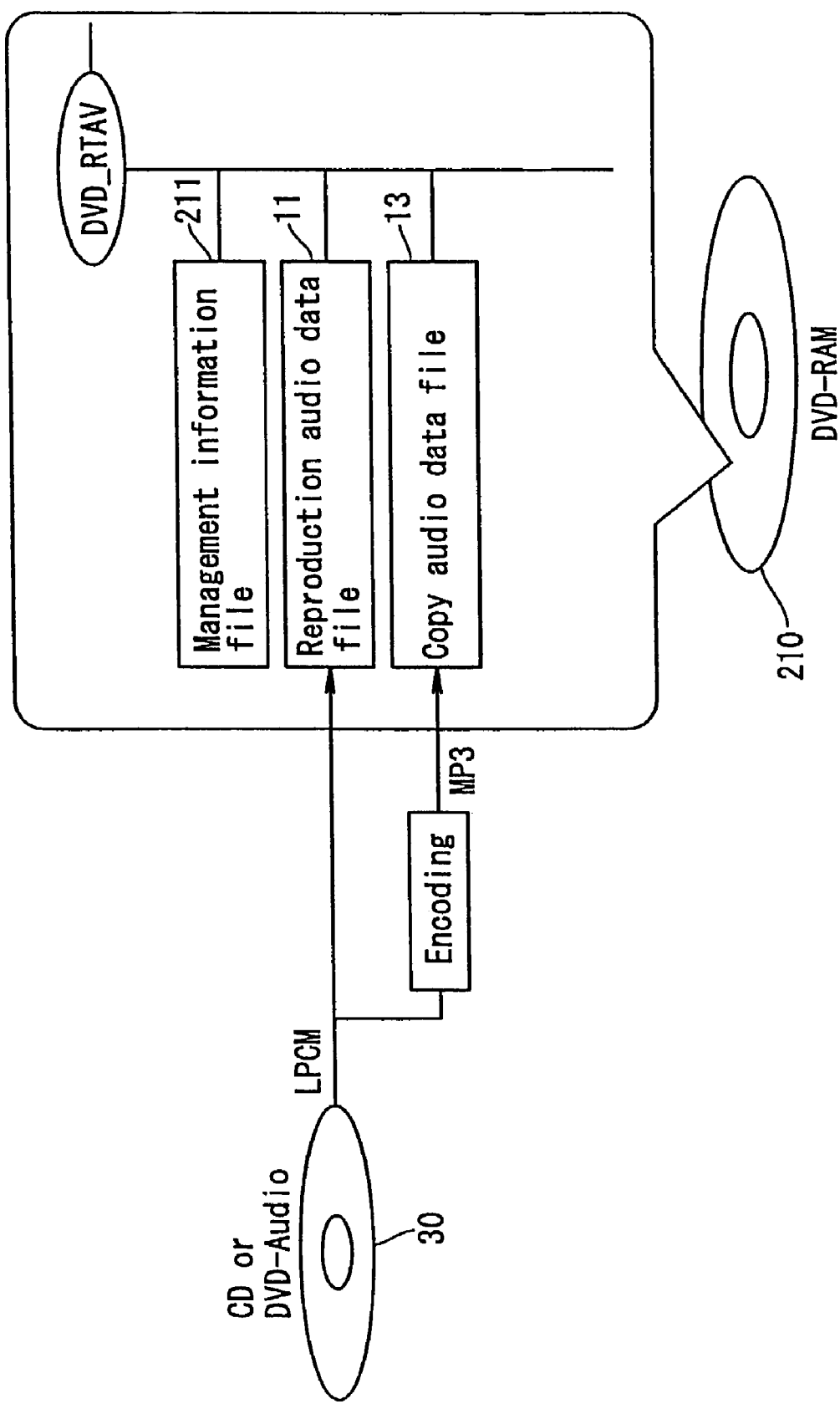
FIG. 23 illustrates how audio data recorded in a CD or DVD-Audio 30 is recorded to the information recording medium 210 of FIG. 21.

FIG. 23 schematically illustrates how audio data in a CD or DVD-Audio 30 is recorded to the DVD-RAM disc 210 of FIG. 21. Similar to Embodiments 1 and 2 of the present invention, the audio data recorded in the CD or DVD-Audio 30 is LPCM audio data. The LPCM audio data output from the CD or DVD Audio 30 is recorded to the reproduction audio data file 11 as it is output as the LPCM data. The output LPCM audio data is also compressed by an MP3 compression encoding method or the like and is recorded to the copy audio data file 13. Lastly, information for managing the reproduction audio data file 11 and the copy audio data file 13 is recorded to the management information file 211. As a result, reproduction-compatible audio data for ensuring reproduction compatibility, i.e., the LPCM audio data, is recorded to the reproduction audio data file 11, and compressed audio data used for realizing high-speed copying, i.e., the MP3 compressed audio data, is recorded to the copy audio data file 13.

The structures of the reproduction audio data file 11 and the copy audio data file 13 according to Embodiment 3 of the present invention are the same as those of the corresponding elements shown in FIG. 4, and therefore the description thereof is omitted. As described above, the reproduction compatible-audio data is created by copying audio data recorded in the CD or DVD-Audio 30, or the like, or is created by decoding the compressed audio data 21 included in the distributed EMD data 20. It is preferable that the reproduction compatible-audio data is encoded by an encoding method, which ensures reproduction compatibility, e.g., an LPCM method.

As described above, compressed audio data created by extracting elementary portions of the compressed audio data 21 included in the EMD data 20 or by copying audio data recorded in a CD, a DVD, or the like, is recorded as copy audio data.

Figure 24:
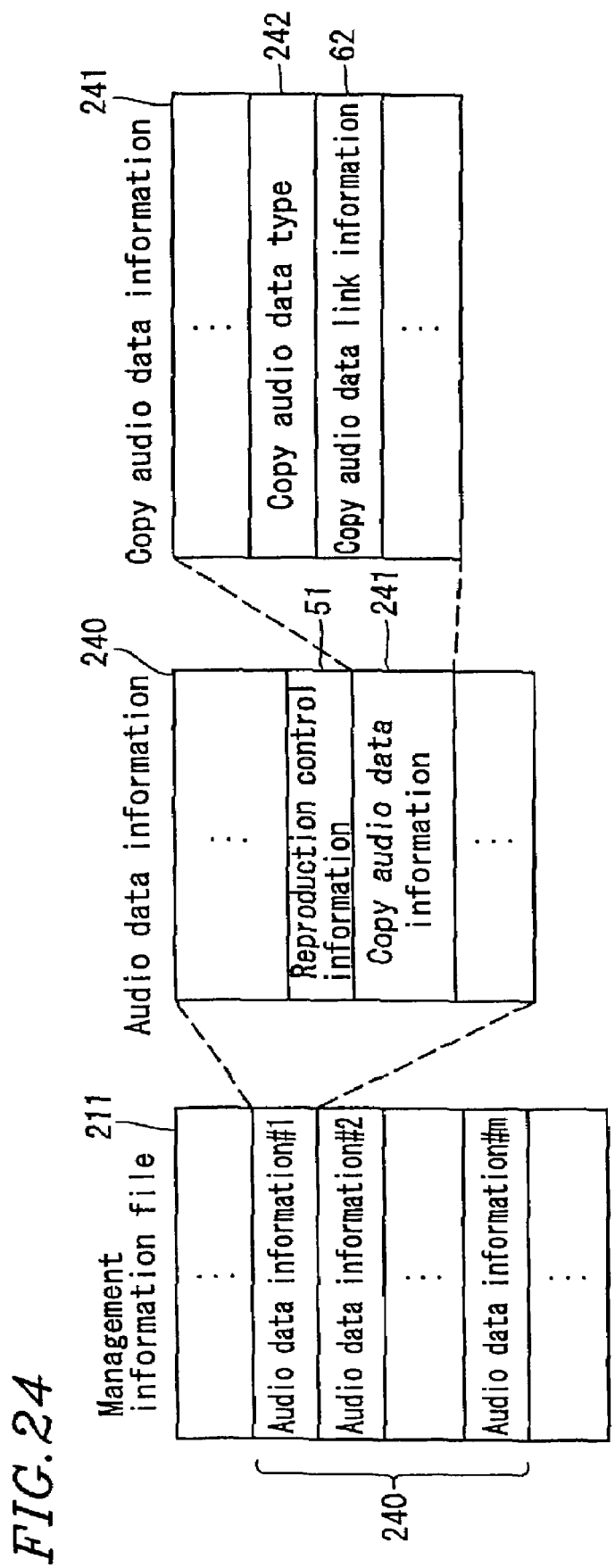
FIG. 24 is a diagram illustrating a detailed structure of a management information file 211.

FIG. 24 is a diagram illustrating a detailed structure of the management information file 211. The management information file 211 includes audio data information 240 in which information related to reproduction compatible-audio data is managed. A piece of audio data information 240 is provided so as to correspond to a piece of reproduction-compatible audio data.

The audio data information 240 includes reproduction control information 51 associated with the reproduction compatible-audio data, and copy audio data information 241. The copy audio data information 241 includes a copy audio data type 242 and copy audio data link information 62. Note that the copy audio data type 242 means information for specifying an encoding method, e.g., an MP3 encoding method or the like, used for encoding copy audio data designated by the copy audio data link information 62.

Figure 25:
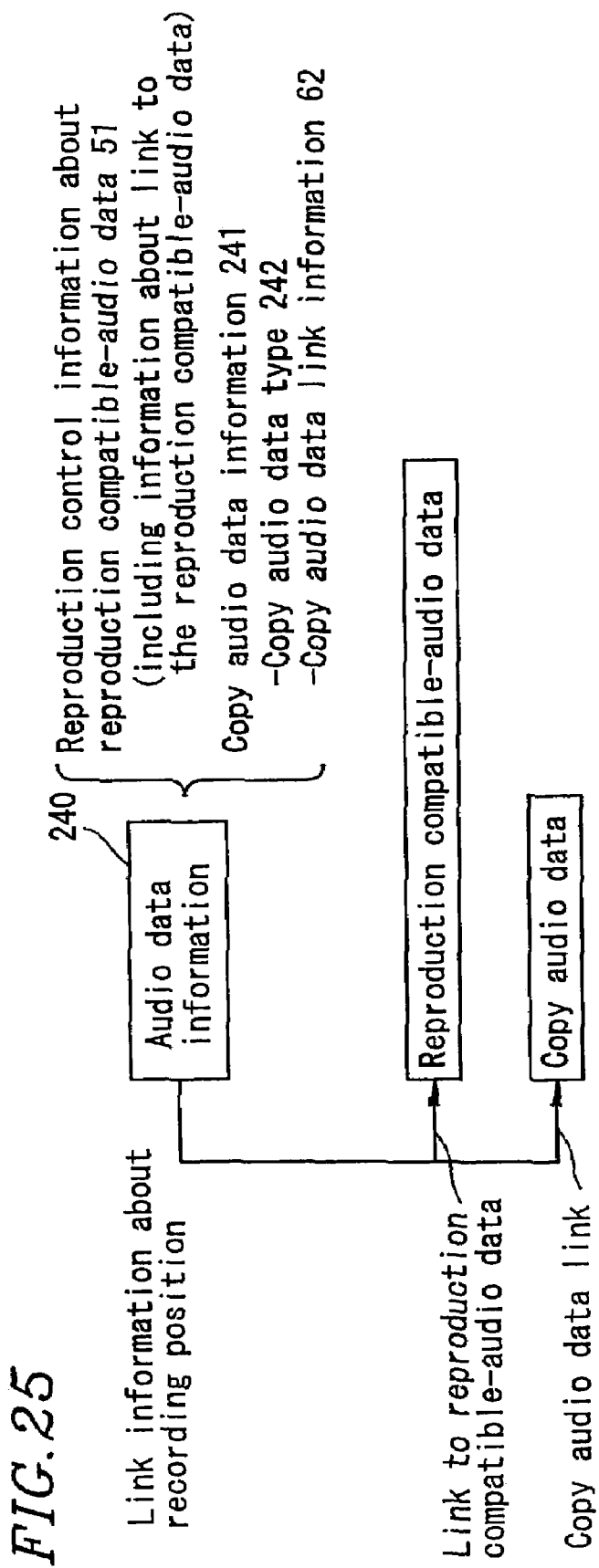
FIG. 25 illustrates link relationships among audio data information 240, reproduction-compatible audio data, and copy audio data, and also illustrates information included in the audio data information 240.

FIG. 25 illustrates link relationships among the audio data information 240, reproduction compatible-audio data, and copy audio data, and also illustrates information included in the audio data information 240. Specifically, FIG. 25 schematically illustrates a relationship between FIGS. 21 and 24.

Figure 26:
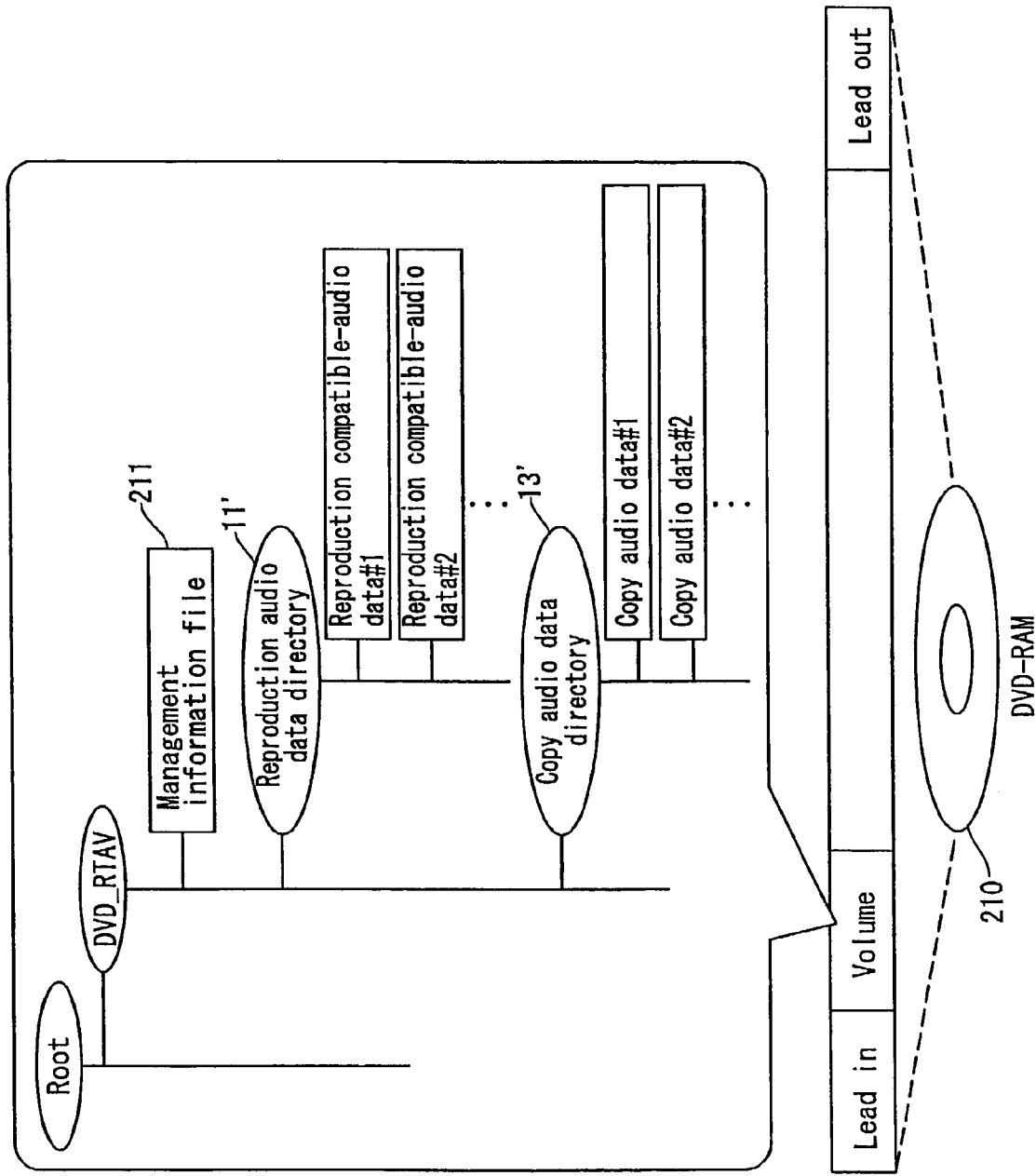
FIG. 26 is another schematic diagram of the information recording medium 210 according to Embodiment 3 of the present invention.

FIG. 26 is another schematic diagram of the information recording medium 210 according to Embodiment 3. In the information recording medium 210 of FIG. 26, a reproduction audio data directory 11' and a copy audio data directory 13' are included in place of the reproduction audio data file 11 and the copy audio data file 13, respectively. Each piece of reproduction-compatible audio data and copy audio data may be recorded as a file under a corresponding directory.

According to Embodiment 3 of the present invention, it is possible to provide an information recording medium in which reproduction compatibility is ensured by reproducing the reproduction compatible-audio data when at least management information file can be decoded, and copy audio data is used such that the compressed audio data 21 included in the EMD data 20 is copied by even a copying apparatus, which cannot decode the data format for the EMD data 20.

When recording any audio data to the DVD-RAM disc 210, only the reproduction compatible-audio data may be recorded to the DVD-RAM disc 210 without recording copy audio data thereto. In such a case, the audio data to be recorded may not be encoded by an encoding method which ensures reproduction compatibility. The audio data information 240 may not include the copy audio data information 241.

Thus, it is possible to provide an information recording medium in which additional audio data can be recorded to the DVD-RAM disc 210 by the amount of the copy audio data which is not recorded thereto, thereby realizing long-time recording, and which allows a user to choose whether to ensure reproduction compatibility or realize long-time recording.

2. Structure and operation of an information recording apparatus according to Embodiment 3 of the present invention Next, an information recording apparatus according to Embodiment 3 of the present invention, which records audio data to an information recording medium 276, will be described.

Figure 27:
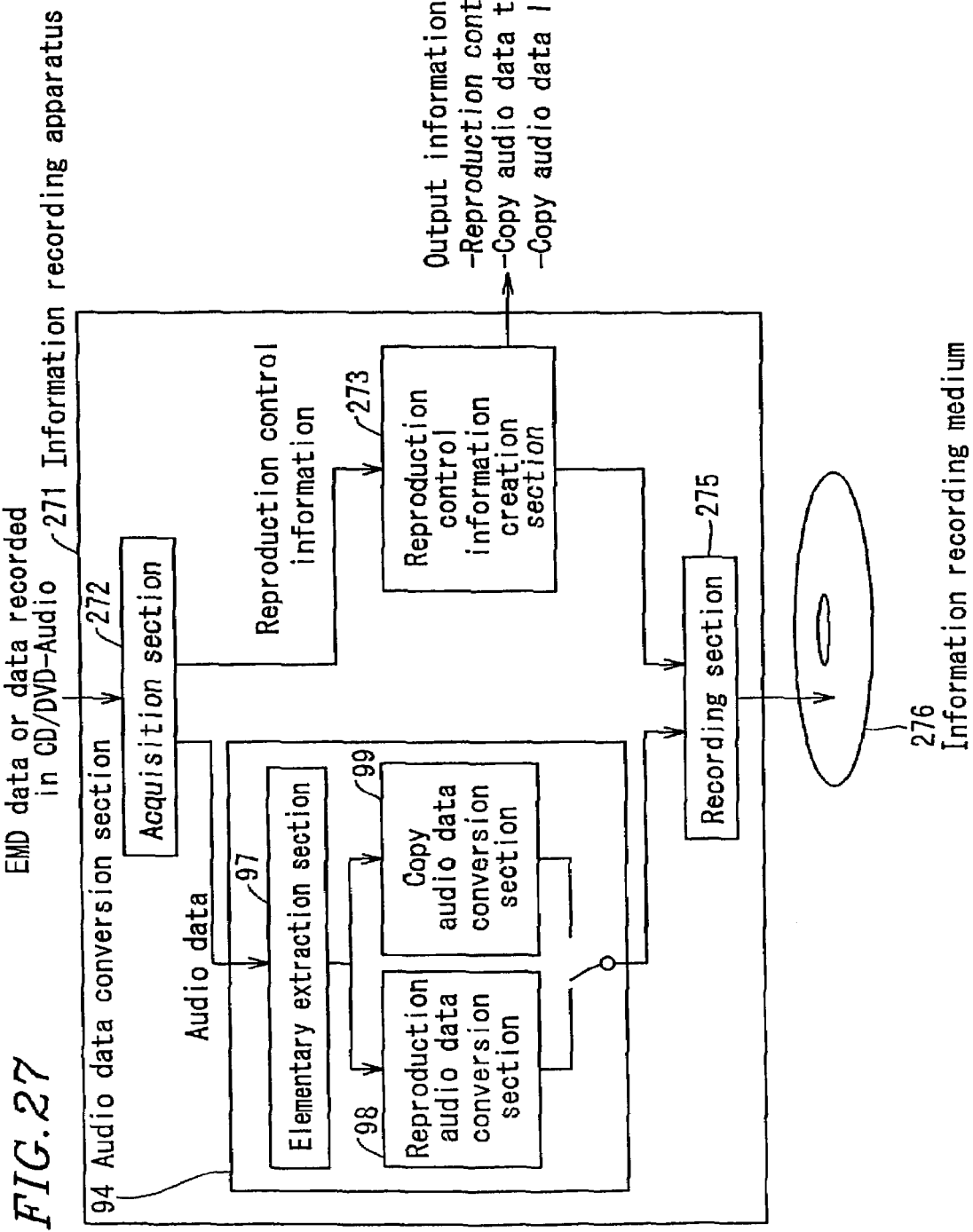
FIG. 27 is a block diagram of an information recording apparatus 271 according to Embodiment 3 of the present invention.

FIG. 27 is a block diagram of an information recording apparatus 271 according to Embodiment 3. The information recording apparatus 271 includes an acquisition section 272, a reproduction control information creation section 273, an audio data conversion section 94, and a recording section 275. The audio data conversion section 94 includes an elementary extraction section 97, a reproduction audio data conversion section 98, and a copy audio data conversion section 99.

Next, a recording operation for recording the EMD data 20, which is distributed by an electric music distribution system, to the information recording medium 276 will be described. Similar to Embodiment 1, when recording EMD data 20, which includes reproduction control information 22 and compressed audio data 21, using the information recording apparatus 271, the acquisition section 92 acquires the EMD data 20 and outputs the reproduction control information 22 and the compressed audio data 21 to the reproduction control information creation section 273 and the audio data conversion section 94, respectively.

The elementary extraction section 97 extracts only elementary portions from the compressed audio data 21 output to the audio data conversion section 94 and outputs the elementary portions to the reproduction audio data conversion section 98 and the copy audio data conversion section 99. In the reproduction audio data conversion section 98, the compressed audio data 21 from which the elementary portions are extracted is converted into reproduction-compatible audio data conforming to an encoding method, e.g., an LPCM method, which ensures reproduction compatibility. In the copy audio data conversion section 99, the compressed audio data 21 from which only the elementary portions are extracted is converted into copy audio data, which conforms to a compression encoding method, e.g., an MP3 method, and is used for a copying operation.

Lastly, the audio data conversion section 94 outputs the reproduction compatible-audio data and the copy audio data to the recording section 275. Note that when audio data input to the elementary extraction section 97 includes only the elementary portions, the input audio data is output to the reproduction audio data conversion section 98 and the copy audio data conversion section 99 as it is input. In the reproduction audio data conversion section 98 and the copy audio data conversion section 99, if the input audio data including only the elementary portions conforms to an encoding method which is used for conversion, no conversion operations are performed on the input audio data.

The reproduction control information creation section 273 creates reproduction control information 51 associated with the reproduction compatible-audio data, a copy audio data type 242, which indicates the type of a method used for encoding copy audio data, and copy audio data link information 62, which indicates a recording position of the copy audio data. The reproduction control information creation section 273 outputs these data to the recording section 275.

The recording section 275 records the reproduction compatible-audio data output by the audio data conversion section 94, the copy audio data, and an output result provided by the reproduction control information creation section 273 to the reproduction audio data file 11, the copy audio data file 13, and the management information file 211, respectively, in the information recording medium 276.

The recording section 275 may record each piece of the reproduction-compatible audio data and the copy audio data as a file under the reproduction audio data directory 11' and the copy audio data directory 13', respectively.

Next, an operation for recording audio data recorded in a CD or a DVD-Audio to the information recording medium 276 using the information recording apparatus 271 will be described. The acquisition section 272 acquires audio data input thereto. The audio data acquired by the acquisition section 272 is output to the audio data conversion section 94.

In this case, the operation of the audio data conversion section 94 is the same as that of the acquisition section 94 in the case where the EMD data 20 is input to the information recording apparatus 271, and therefore the description thereof is omitted. In such a manner, the data format for the information recording medium 210 described in "1. Structure of an information recording medium according to Embodiment 3 of the present invention" is obtained.

According to Embodiment 3 of the present invention, it is possible to provide the information recording medium 210 to which the reproduction compatible-audio data and the copy audio data are recorded and in which the management information file 211 can be referred to for these data.

As described above, the audio data conversion section 94 may be configured such that it is possible to choose whether both or either one of the reproduction compatible-audio data and the copy audio data are output. When the audio data conversion section 94 outputs only either one of these audio data, the reproduction control information creation section 273 outputs to the recording section 275 only the reproduction control information associated with the audio data out put by the audio data conversion section 94. In this case, the recording section 275 records the audio data, which is output by the audio data conversion section 94, and the reproduction control information, which is output by the reproduction control information creation section 273, to a corresponding audio data file and the management information file 211, respectively.

As a result, in the case where the audio data conversion section 94 outputs only one of the reproduction compatible-audio data and the copy audio data to the recording section 275, additional audio data for music can be recorded to an information recording medium as compared with a case where both of these audio data are recorded, thereby realizing long-time recording. Moreover, it is possible for a user to choose whether to ensure reproduction compatibility or realize long-time recording, when recording audio data to the information recording medium.

3. Structure and operation of an information reproducing apparatus according to Embodiment 3 of the present invention Next, an information reproducing apparatus according Embodiment 3 of the present invention, which reproduces audio data recorded in the information recording medium 210, will be described.

Figure 28A:
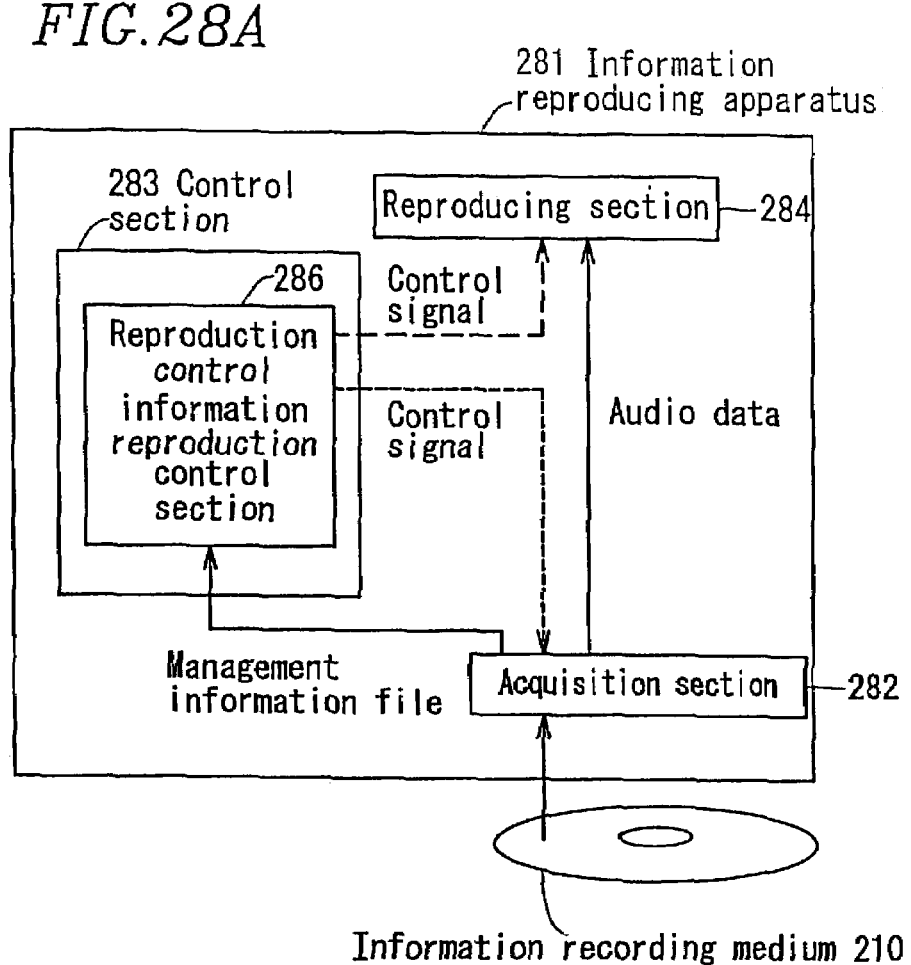
FIG. 28A is a block diagram of an information reproducing apparatus 281 according to Embodiment 3 of the present invention.

FIG. 28A is a block diagram of an information reproducing apparatus 281 according to Embodiment 3 of the present invention. The information reproducing apparatus 281 includes an acquisition section 282, a control section 283, and a reproducing section 284. The control section 283 includes a reproduction control information reproduction control section 286.

The acquisition section 282 acquires a management information file 211 from the information recording medium 210 and outputs the acquired management information file 211 to the control section 283. The data format for the management information file 211 is as shown in FIG. 24.

Next, the reproduction control information reproduction control section 286 in the control section 283 decodes the management information file 211 so as to retrieve audio data information 240 in which reproduction control information 51 associated with audio data to be reproduced is recorded, from the management information file 211. The reproduction control information reproduction control section 286 acquires link information, which indicates a recording position of audio data, from the reproduction control information 51 included in the retrieved audio data information 240. The control section 283 outputs a control signal to the acquisition section 282 such that the acquisition section 282 acquires audio data from the information recording medium 210 based on the link information and outputs the acquired audio data to the reproducing section 284. The control section 283 outputs a control signal to the reproducing section 284 such that the reproducing section 284 reproduces the output audio data.

Figure 28B:
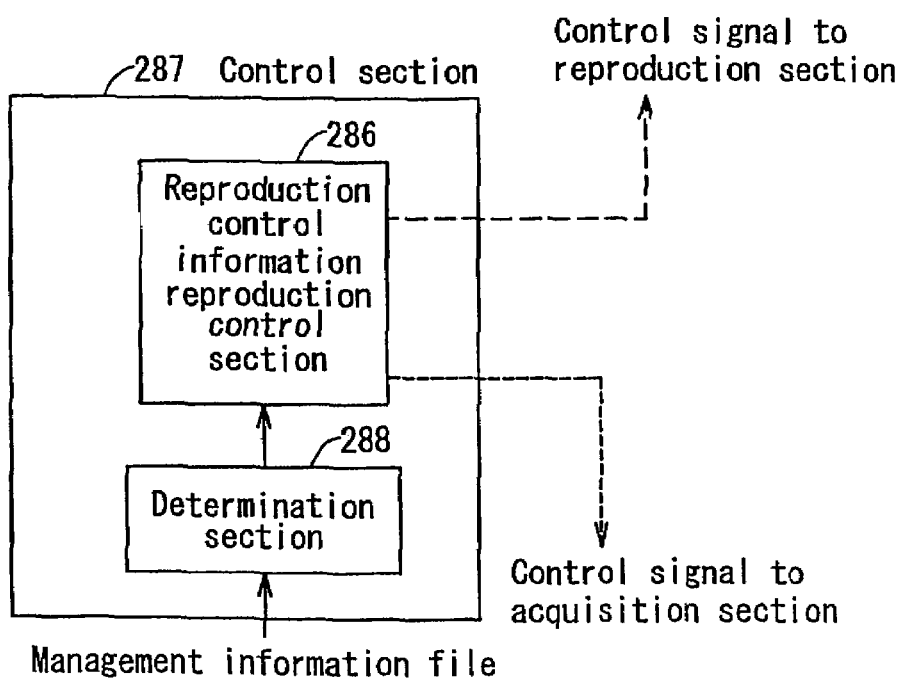
FIG. 28B is a block diagram illustrating part of another information reproducing apparatus according to Embodiment 3 of the present invention.

FIG. 28B is a block diagram illustrating part of another information reproducing apparatus according to Embodiment 3 of the present invention. The information reproducing apparatus shown in FIG. 28B is the same as the information reproducing apparatus 281 shown in FIG. 28A except that a control section 287 shown in FIG. 28B is different from the control section 283 shown in FIG. 28A.

The control section 287 includes a determination section 288 and a reproduction control information reproduction control section 286. The determination section 288 determines, based on the reproduction control information 51 associated with audio data to be reproduced, whether or not the audio data managed by the audio data information 240 can be reproduced. As a result, when the determination section 288 determines that the audio data can be reproduced, as in the case described with reference to FIG. 28A, the reproduction control information reproduction control section 286 outputs control signals such that the acquisition section 282 acquires audio data based on the audio data information 240 and the reproducing section 284 reproduces the acquired audio data.

According to Embodiment 3 of the present invention, if the management information file 211 can be decoded, it is possible to reproduce audio data recorded in the information recording medium 210.

4. Structure and operation of a copying apparatus according to Embodiment 3 of the present invention Next, a copying apparatus according to Embodiment 3 of the present invention, which copies audio data recorded in the information recording medium 210 into another information recording medium, will be described.

Figure 29A:
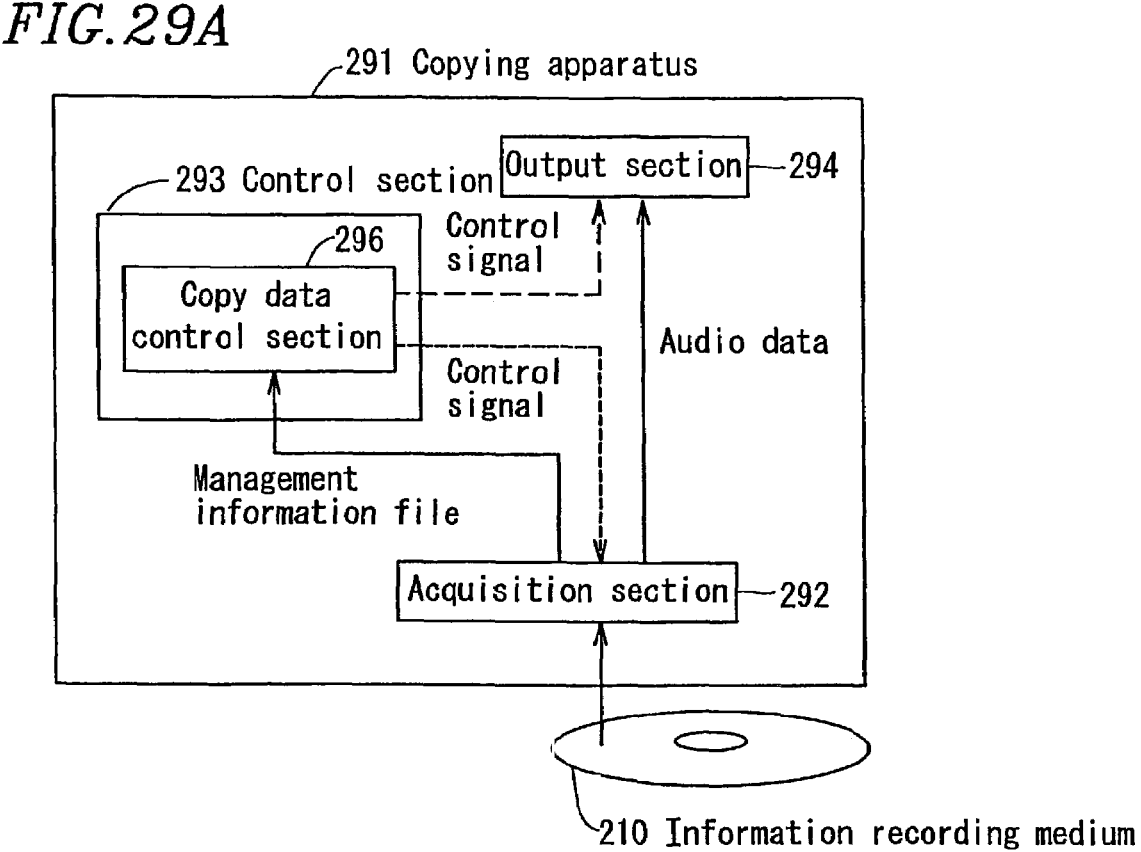
FIG. 29A is a block diagram of a copying apparatus 291 according to Embodiment 3 of the present invention.

FIG. 29A is a block diagram of a copying apparatus 291 according to Embodiment 3 of the present invention. The copying apparatus 291 includes an acquisition section 292, a control section 293, and an output section 294. The control section 293 includes a copy data control section 296. The acquisition section 292 acquires a management information file 211 from the information recording medium 210 and outputs the acquired management information file 211 to the control section 293. In this case, the data format of the management information file 211 is as shown in FIG. 24.

The copy data control section 296 in the control section 293 decodes the management information file 211 so as to retrieve audio data information 240 in which reproduction control information 51 associated with audio data to be copied is recorded. The control section 296 outputs a control signal to the acquisition section 292 such that the acquisition section 292 acquires, based on copy audio data link information 62 included in the retrieved audio data information 240, audio data from a file designated by the copy audio data link information 62 and outputs the acquired audio data to the output section 294.

The control section 293 outputs a control signal to the output section 294 such that the output section 294 outputs the audio data to another information recording medium.

Figure 29B:
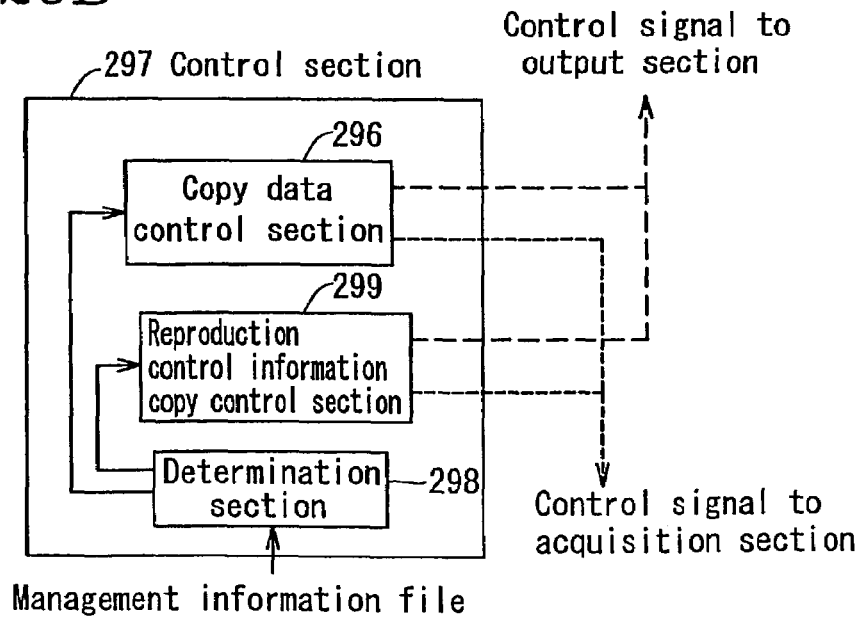
FIG. 29B is a block diagram illustrating part of another copying apparatus according to Embodiment 3 of the present invention.

FIG. 29B is a block diagram illustrating part of another copying apparatus according to Embodiment 3 of the present invention. The copying apparatus shown in FIG. 29B is the same as the copying apparatus 291 shown in FIG. 29A except that a control section 297 shown in FIG. 29B is different from the control section 293 shown in FIG. 29A.

The control section 297 includes a determination section 298, are production control in formation copy control section 299 and a copy data control section 296. The determination section 298 determines, based on audio data information 240 associated with audio data to be copied, whether or not copy audio data is recorded in the information recording medium 210. As a result, when the determination section 298 determines that the copy audio data is recorded, as in the case described with reference to FIG. 29A, the copy data control section 296 outputs a control signal to the acquisition section 292 such that the acquisition section 292 acquires audio data based on copy audio data link information 62 and outputs the acquired audio data to the output section 294. When the determination section 298 determines that no copy audio data is recorded, the reproduction control information copy control section 299 outputs a control signal to the acquisition section 292 such that the acquisition section 292 acquires reproduction compatible-audio data recorded in the reproduction audio data file 11 based on the reproduction control in formation 51 included in the audio data information 240, and outputs the acquired reproduction compatible-audio data to the output section 294.

According to Embodiment 3 of the present invention, if at least the management information file 211 can be decoded, it is possible to copy audio data recorded in the information recording medium 210.

(Embodiment 4)

1. Structure of an information recording medium according to Embodiment 4 of the present invention A data format for an information recording medium according to Embodiment 4 of the present invention includes a management information file and an audio data file. Such a data format realizes long-time recording and allows audio data included in EMD data to be copied at high speed.

Figure 30:
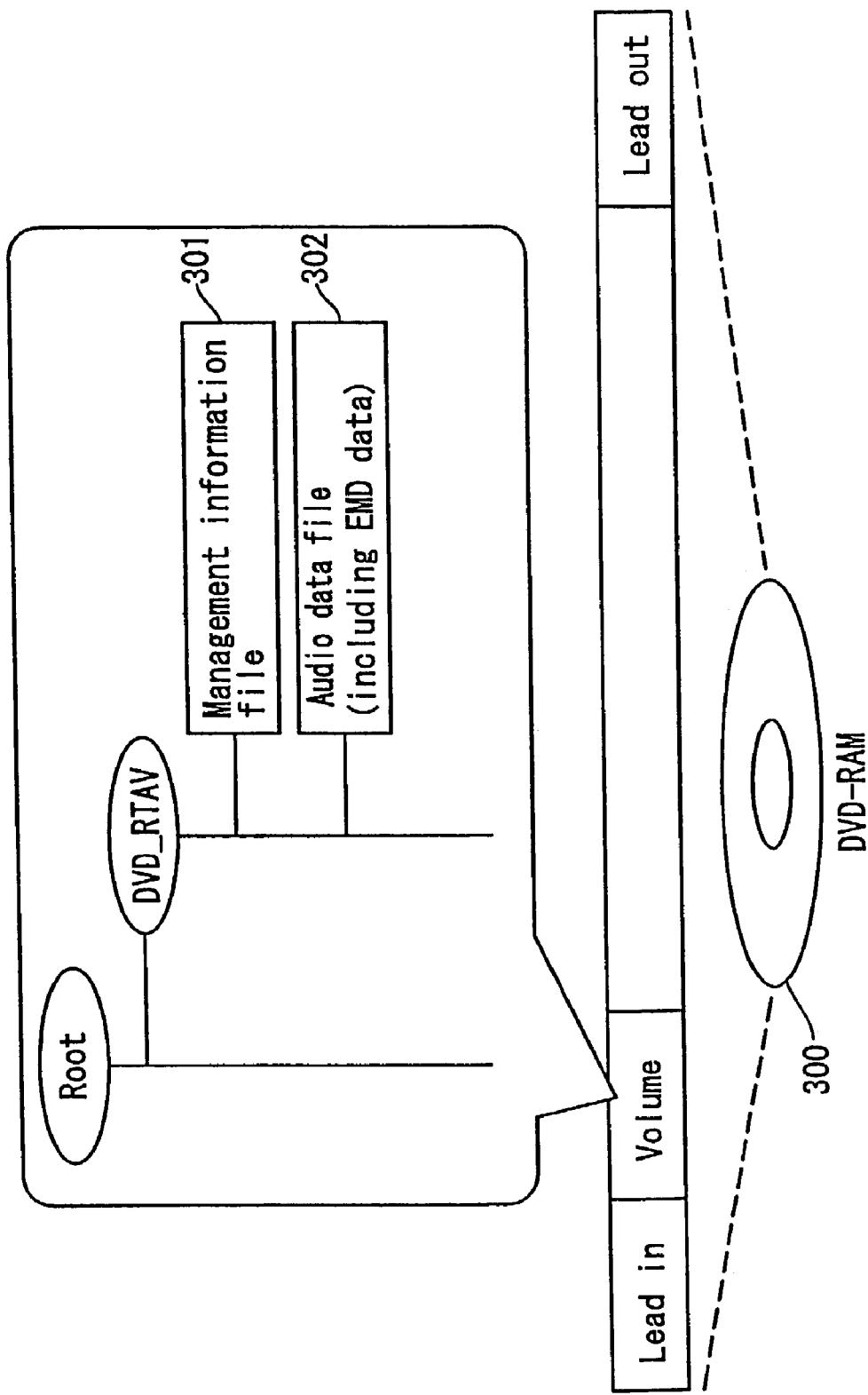
FIG. 30 is a schematic diagram of an information recording medium 300 according to Embodiment 4 of the present invention.

FIG. 30 is a schematic diagram of an information recording medium 300 according to Embodiment 4. For example, the information recording medium 300 is a DVD-RAM disc. The DVD-RAM disc 300 includes an audio data file 302 to which reproduction-compatible audio data (first audio data) and the EMD data 20 are recorded, and a management information file 301 to which reproduction control information associated with audio data included in the audio data file 302 is mainly recorded.

Next, the data recorded to each file will be described in further detail.

Figure 31:
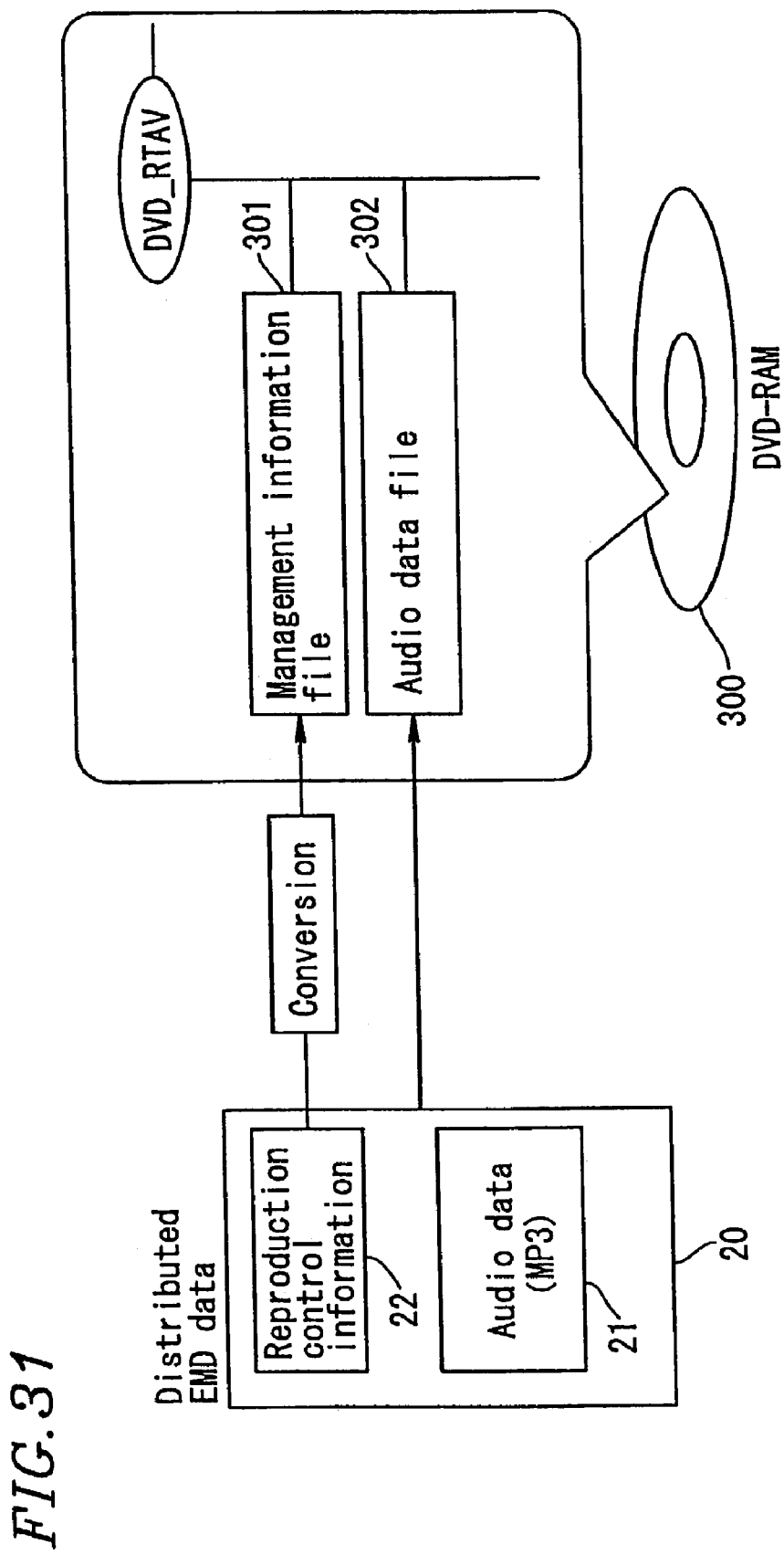
FIG. 31 illustrates how EMD data 20 is recorded to the information recording medium 300 of FIG. 30.

FIG. 31 schematically illustrates how the EMD data 20 is recorded to the DVD-RAM disc 300 shown in FIG. 30. In Embodiment 4, the EMD data 20 includes compressed audio data 21, which is compressed according to an MP3 method, and reproduction control information 22 associated with the compressed audio data 21.

When the EMD data 20 is distributed, the distributed EMD data 20 is recorded to the audio data file 302 as it is distributed. Information, which is converted from the reproduction control information 22 included in the EMD data 20 so as to be decodable in the DVD-RAM disc 300, and information, which is used for managing the audio data file 302, are recorded to the management information file 301 As a result, only the distributed EMD data 20 is recorded to the DVD-RAM disc 300, and therefore it is possible to realize long-time recording.

Figure 32:
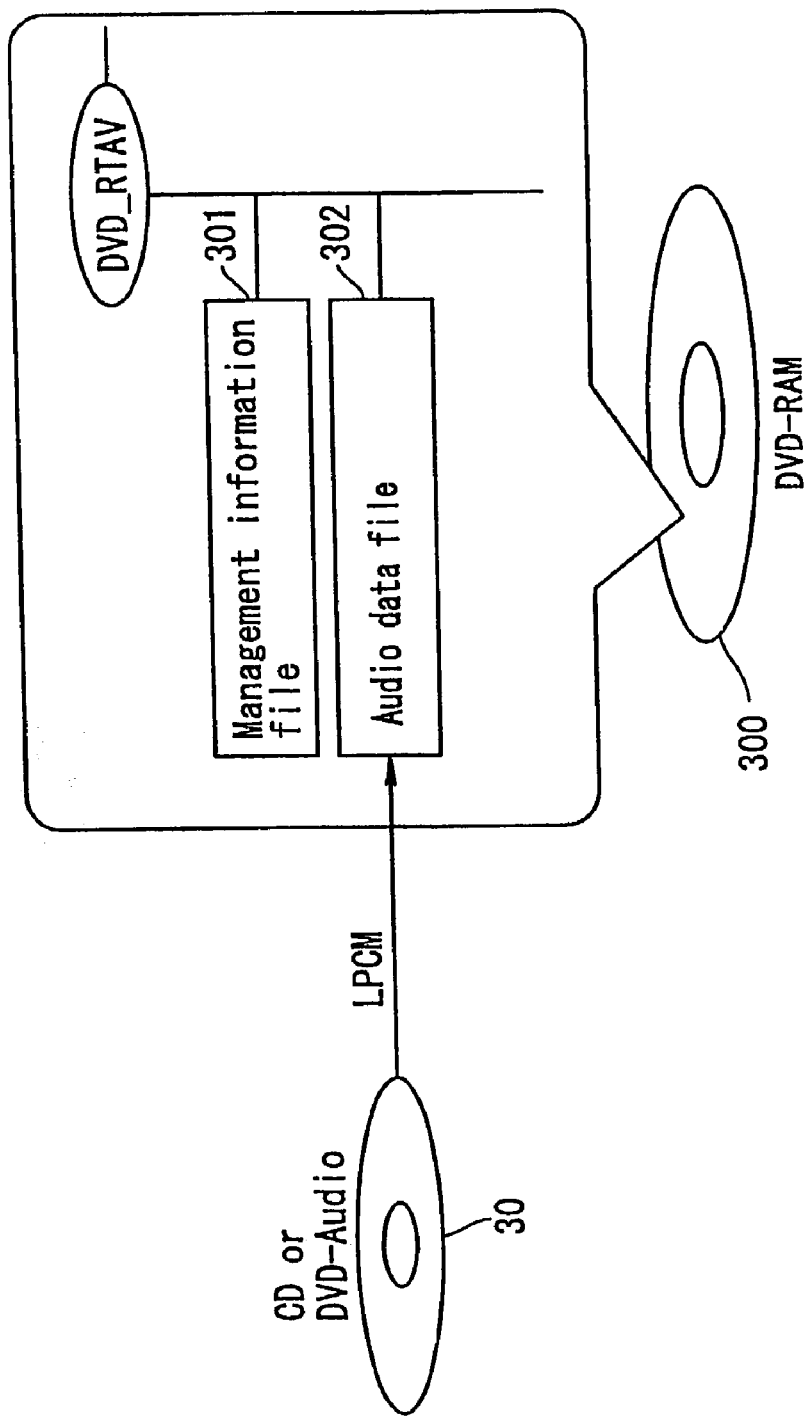
FIG. 32 illustrates how audio data recorded in a CD or DVD-Audio 30 is recorded to the information recording medium 300 of FIG. 30.

FIG. 32 schematically illustrates how audio data in a CD or DVD-Audio 30 is recorded to the DVD-RAM disc 300 of FIG. 30. LPCM audio data output by the CD or DVD Audio 30 is recorded to the reproduction audio data file 302 as it is output as the LPCM audio data. The information, which manages the audio data file 302, is recorded to the management information file 301. As a result, only the LPCM audio data is recorded to the DVD-RAM disc 300, and therefore long-time recording can be realized.

Figure 33:
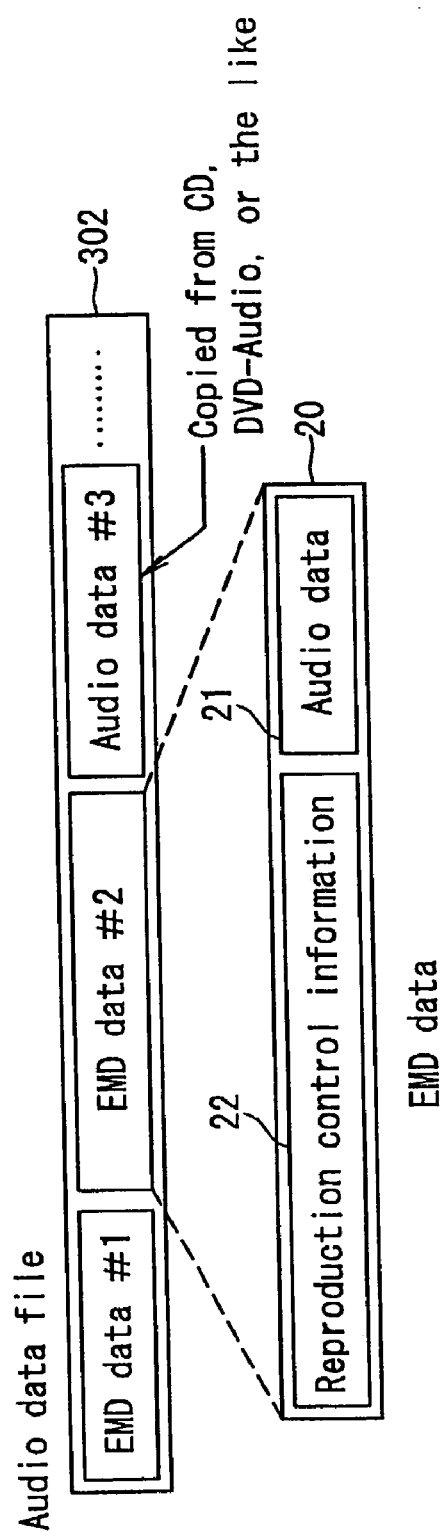
FIG. 33 is a diagram illustrating a detailed structure of an audio data file 302.

FIG. 33 is a diagram illustrating a detailed structure of the audio data file 302. The audio data file 302 includes the distributed EMD data 20 and audio data created by copying audio data recorded in a CD, a DVD, or the like.

Figure 34:
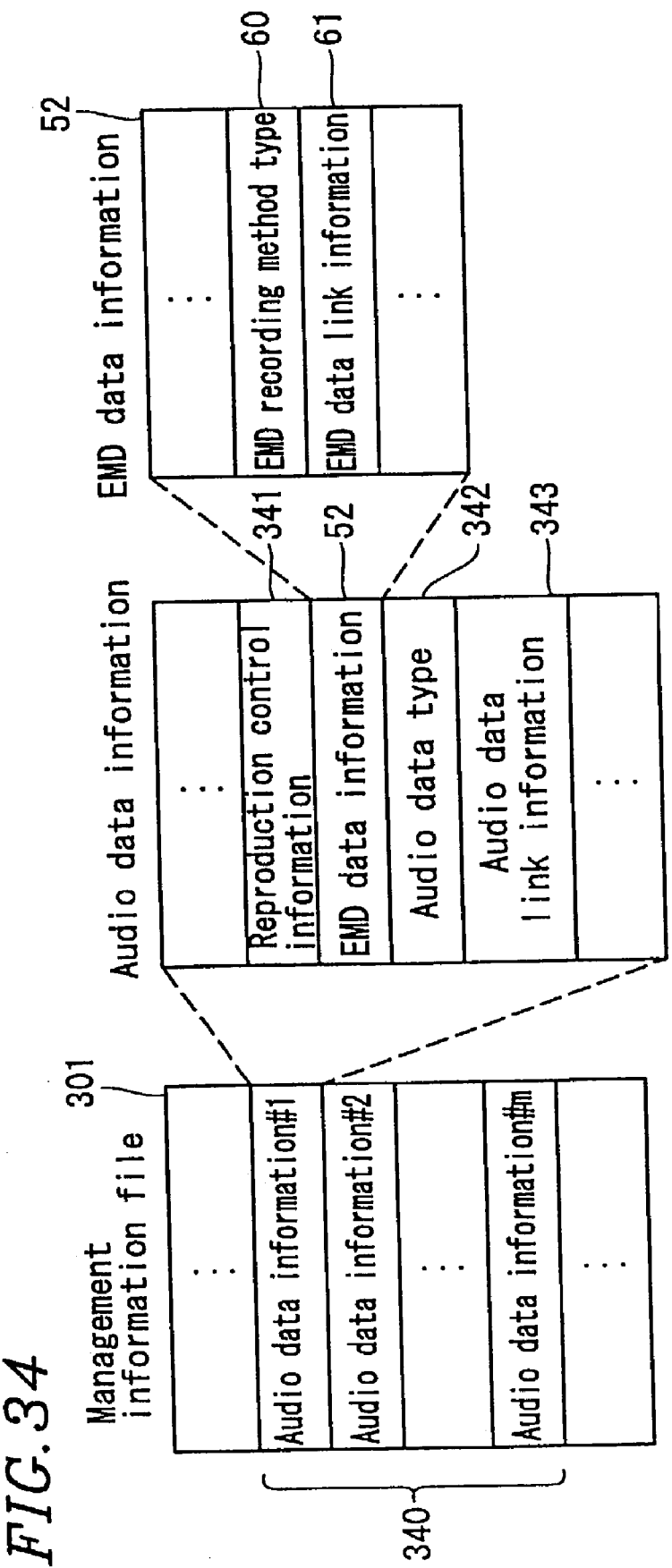
FIG. 34 is a diagram illustrating a detailed structure of a management information file 301.

FIG. 34 is a diagram illustrating a detailed structure of the management information file 301. In the management information file 301, a piece of audio data information 340 is provided so as to correspond to a piece of audio data included in the audio data file 302. The audio data information 340 includes reproduction control information 341 associated with audio data included in the audio data file 302, an audio data type 342, and audio data link information 343. The audio data link information 343 indicates a recording position of audio data managed by the audio data information 340, e.g., a recording start address or a recording end address of the audio data.

For example, when the audio data information 340 manages the EMD data 20, the audio data link information 343 indicates a recording position of compressed audio data 21 included in the EMD data 20. When the audio data information 340 manages audio data created by copying audio data recorded in a CD, a DVD, or the like, the audio data link information 343 indicates a recording position of the created audio data. The audio data type 342 specifies a method for encoding audio data (e.g., MP3) indicated by the audio data link information 343.

Note that when the audio data information 340 manages the EMD data 20, the audio data information 340 may include EMD data information 52 which includes the EMD recording method type 60 and EMD data link information 61.

Figure 35:
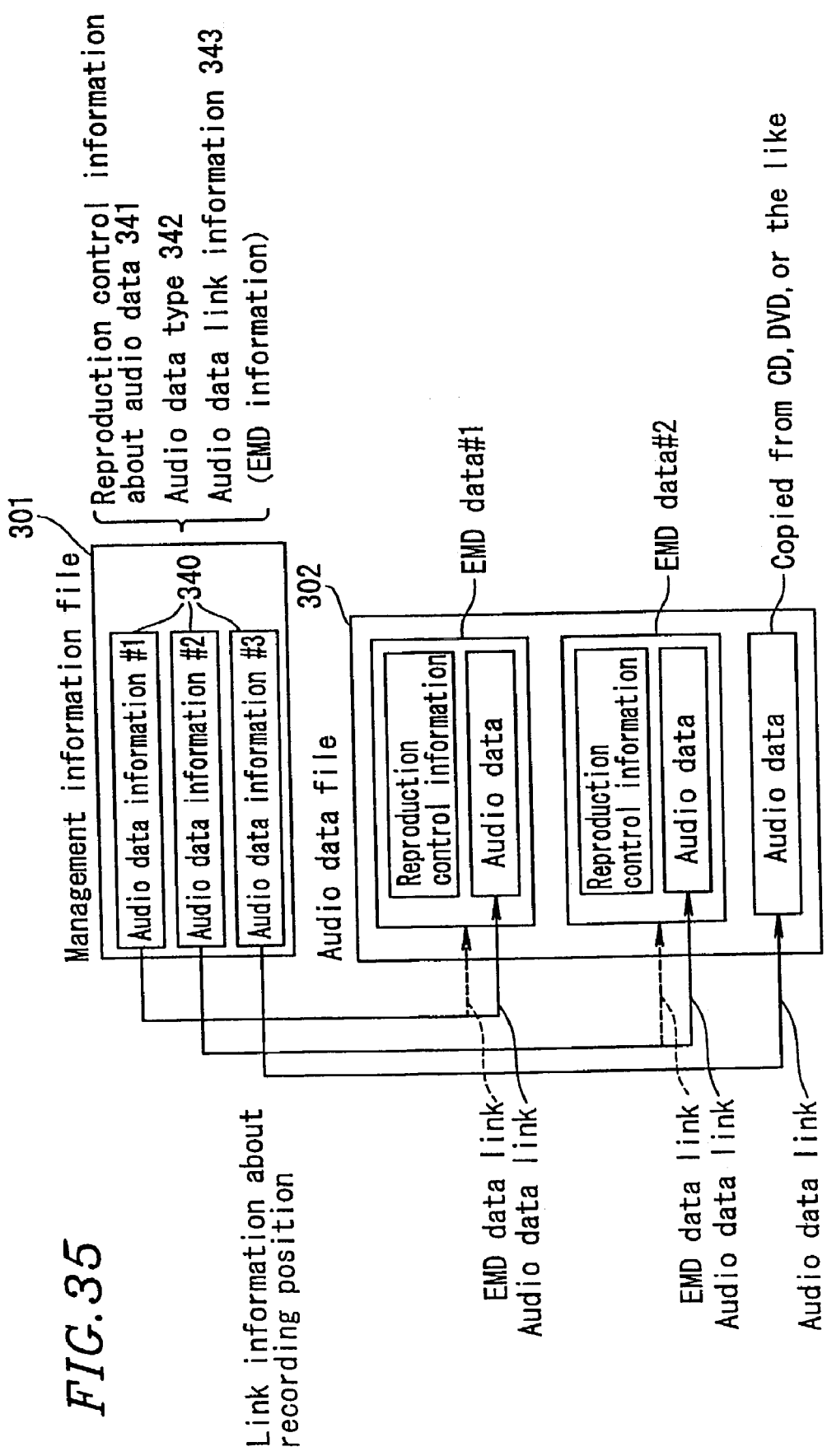
FIG. 35 illustrates a link relationship between audio data information 340 and audio data, and also illustrates information included in the audio data information 340.

FIG. 35 illustrates a link relationship between the audio data information 340 and audio data, and information included in the audio data information 340. Specifically, FIG. 35 schematically illustrates a relationship between FIGS. 30 and 34.

Figure 36:
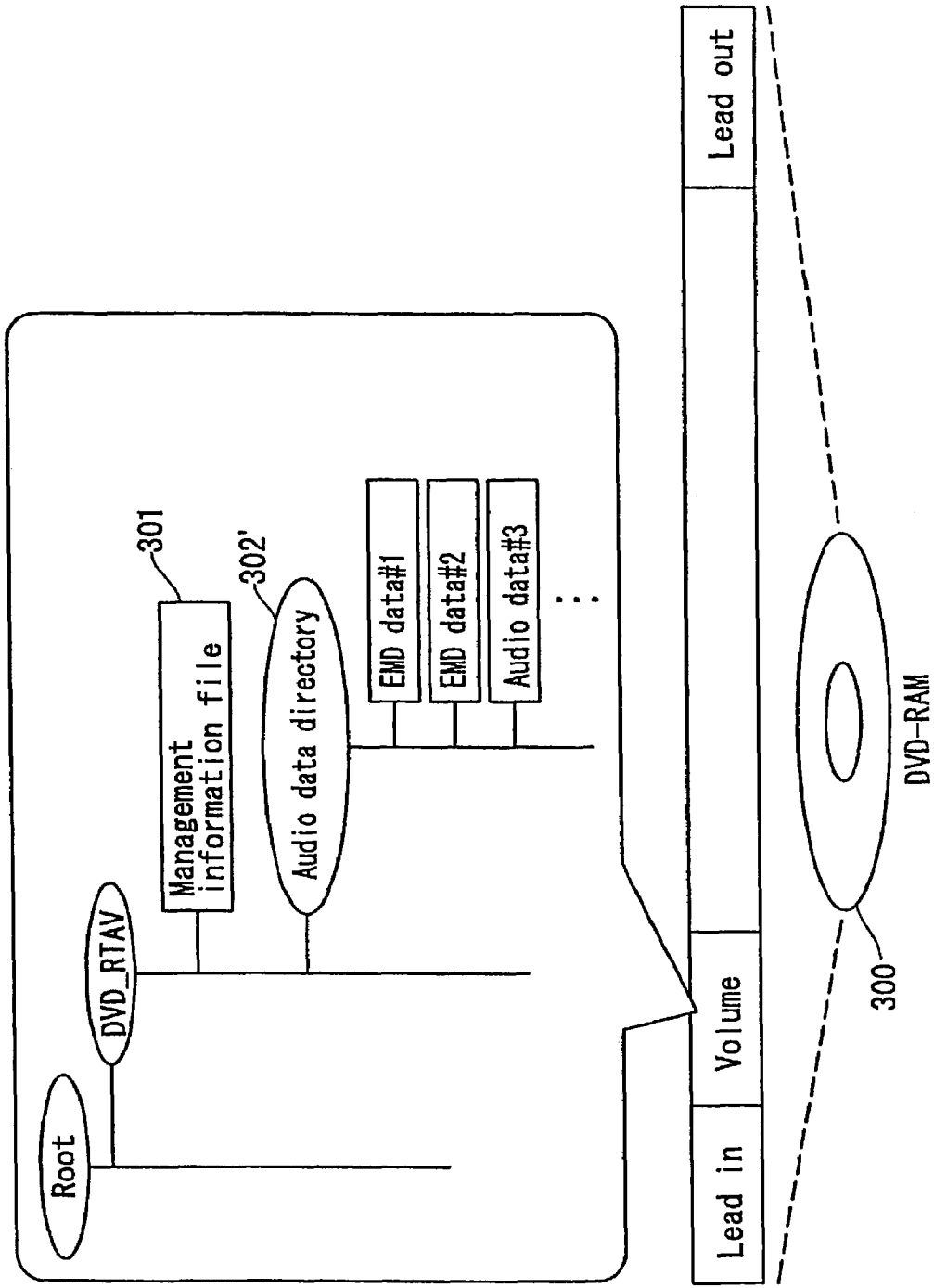
FIG. 36 is another schematic diagram of the information recording medium 300 according to Embodiment 4 of the present invention.

FIG. 36 is another schematic diagram of the information recording medium 300 according to Embodiment 4. In the information recording medium 300 of FIG. 36, an audio data directory 302' is included in place of the audio data file 302. Each piece of the EMD data 20 and audio data maybe recorded as a file under the audio data directory 302'.

According to Embodiment 4 of the present invention, two pieces of audio data are not recorded for the same piece of music, thereby realizing long-time recording. Moreover, it is possible to provide an information recording medium in which the compressed audio data 21 included in the EMD data 20 can be reproduced or copied based on the audio link information 343 by decoding at least the management information file 302, without decoding the data format of the EMD data 20.

2. Structure and operation of an information recording apparatus according to Embodiment 4 of the present invention Next, an information recording apparatus according to Embodiment 4 of the present invention, which records audio data to an information recording medium 375, will be described.

Figure 37:
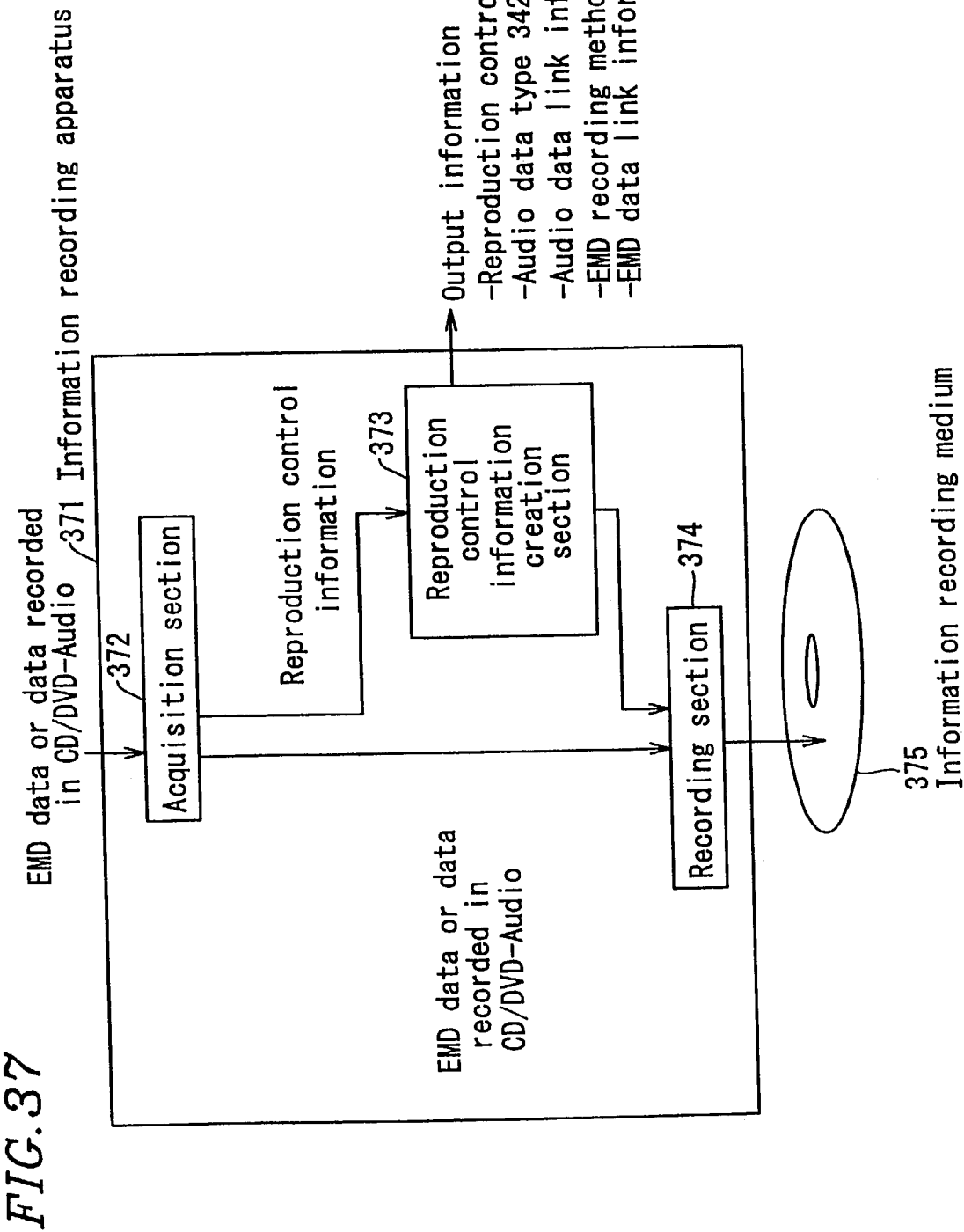
FIG. 37 is a block diagram of an information recording apparatus 371 according to Embodiment 4 of the present invention.

FIG. 37 is a block diagram of an information recording apparatus 371 according to Embodiment 4. The information recording apparatus 371 includes an acquisition section 372, a reproduction control information creation section 373, and a recording section 374.

Next, a recording operation for recording the EMD data 20, which is distributed by a music distribution system, to the information recording medium 375 will be described. When recording the EMD data 20, which includes reproduction control information 22 and compressed audio data 21, using the information recording apparatus 371, the acquisition section 372 acquires the EMD data 20 and outputs the reproduction control information 22 and the EMD data 20 to the reproduction control information creation section 373 and the recording section 374, respectively.

The reproduction control information creation section 373 creates, based on the reproduction control information 22 output by the acquisition section 372, an audio data type 342 related to the compressed audio data 21 included in the EMD data 20, an EMD recording method type 60, audio data link information 343, which indicates a recording position of the compressed audio data 21 included in the EMD data 20, EMD data link information 61, which represents a recording position of the EMD data 20, and reproduction control information 341 associated with audio data. The reproduction control information creation section 373 outputs these data to the recording section 374.

The recoding section 374 records the EMD data 20 output by the acquisition section 372 and an output result provided by the reproduction control information creation section 373 to the audio data file 302 and the management information file 301, respectively, in the information recording medium 375. Note that the recording section 374 may record each piece of EMD data 20 as a file under the audio data directory 302'.

Next, a recording operation for recording audio data recorded in a CD or DVD-Audio to the information recording medium 375 using the information recording apparatus 371 will be described. The acquisition section 372 acquires audio data input thereto and outputs the acquired audio data to the recording section 374.

The reproduction control information creation section 373 creates an audio data type 342 associated with the audio data output from the acquisition section 372 to the recording section 374, audio data link information 343, and reproduction control information 341 associated with the audio data. The reproduction control information creation section 373 outputs these data to the recording section 374. The recoding section 374 records the audio data output by the acquisition section 372 and an output result provided by the reproduction control information creation section 373 to the audio data file 302 and the management information file 301, respectively, in the information recording medium 375. Note that the recording section 374 may record each piece of audio data as a file under the audio data directory 302'.

According to Embodiment 4 of the present invention, it is possible to provide an information recording medium from/to which the compressed audio data 21 included in the EMD data 20 is reproduced/copied by decoding at least the management information file 301, without decoding the data format of the EMD data 20. Moreover, only a piece of audio data is recorded for a piece of music, and therefore a larger amount of music can be recorded, thereby realizing long-time recording.

3. Structure and operation of an information reproducing apparatus according to Embodiment 4 of the present invention Next, an information reproducing apparatus according to Embodiment 4 of the present invention, which reproduces audio data recorded in the information recording medium 300, will be described.

Figure 38A:
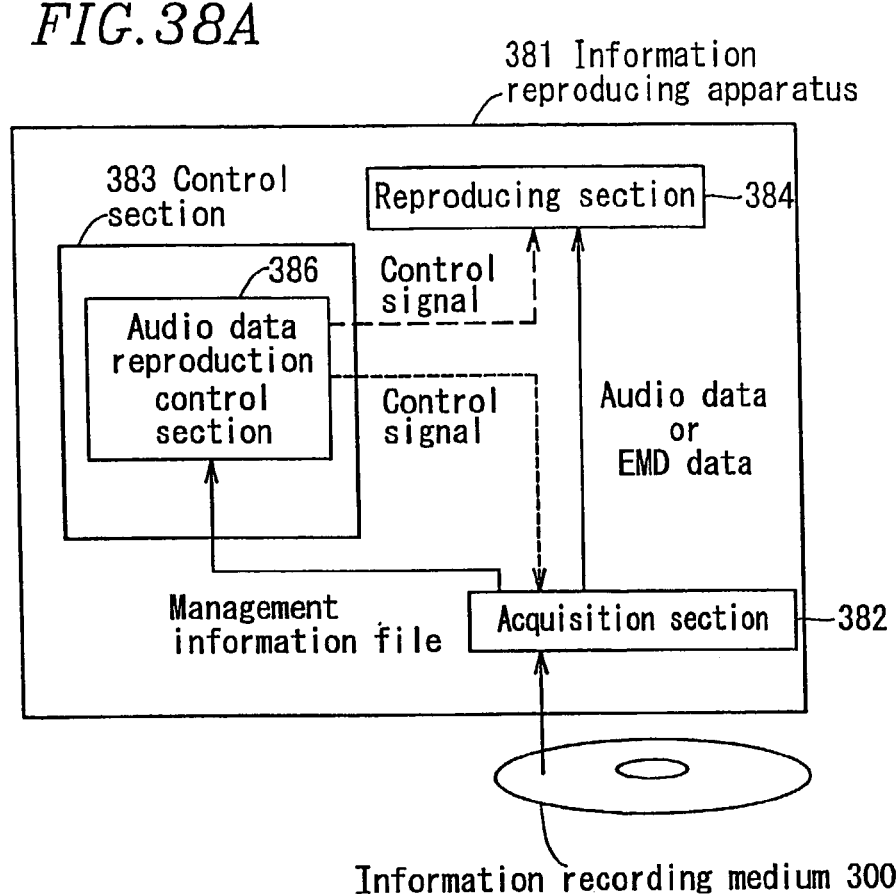
FIG. 38A is a block diagram of an information reproducing apparatus 381 according to Embodiment 4 of the present invention.

FIG. 38A is a block diagram of an information reproducing apparatus 381 according to Embodiment 4 of the present invention. The information reproducing apparatus 381 includes an acquisition section 382, a control section 383, and a reproducing section 384. The control section 383 includes an audio data reproduction control section 386.

The acquisition section 382 acquires a management information file 301 from the information recording medium 300 and outputs the acquired management information file 301 to the control section 383. In this case, the data format of the management information file 301 is as shown in FIG. 34.

Figure 38B:
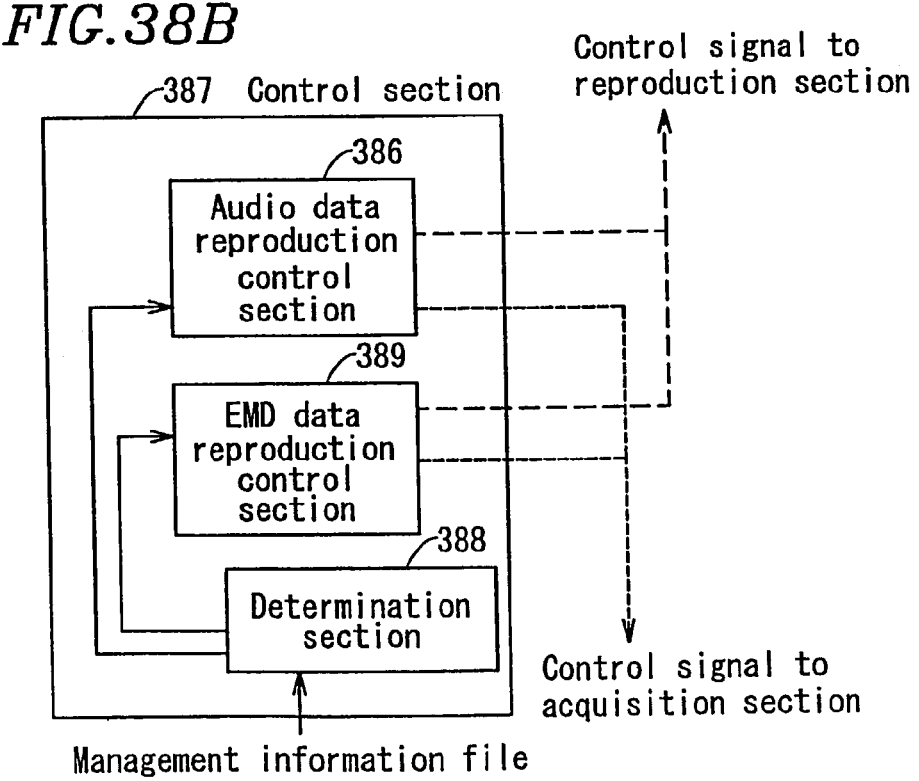
FIG. 38B is a block diagram illustrating part of another information reproducing apparatus according to Embodiment 4 of the present invention.

The audio data reproduction control section 386 in the control section 383 decodes the management information file 301 so as to retrieve audio data information 340, which manages reproduction control information 341 associated with audio data to be reproduced, from the management information file 301. The control section 383 determines whether or not the audio data can be reproduced based on the audio data type 342 related to the retrieved audio data information 340. When the control section 383 determines that the audio data can be reproduced, the control section 383 outputs a control signal to the acquisition section 382 such that the acquisition section 382 acquires audio data from the information recording medium 300 based on the audio data link information 343 and outputs the acquired audio data to the reproducing section 384. The control section 383 outputs a control signal to the reproducing section 384 such that the reproducing section 384 reproduces the output audio data. FIG. 38B is a block diagram illustrating part of another information reproducing apparatus according to Embodiment 4. The information reproducing apparatus shown in FIG. 38B is the same as the information reproducing apparatus 381 shown in FIG. 38A except that a control section 387 shown in FIG. 38B is different from the control section 383 shown in FIG. 38A.

The control section 387 includes a determination section 388, an EMD data reproduction control section 389, and an audio data reproduction control section 386. The determination section 388 decodes audio data information 340 in which reproduction control information 341 associated with audio data to be reproduced is managed. As a result of the decoding, when it is determined that the EMD data 20 is recorded in the information recording medium 300, the determination section 388 decodes the EMD recording method type 60 so as to determine whether or not the EMD data 20 can be reproduced. When the determination section 388 determines that the EMD data 20 can be reproduced, the EMD data reproduction control section 389 outputs control signals such that the acquisition section 382 acquires the EMD data 20 based on the EMD data link information 61 and the reproducing section 384 reproduces the EMD data 20.

When the determination section 388 determines that the EMD data 20 is not recorded in the information recording medium 300 or cannot be reproduced, as in the case described with reference to FIG. 38A, the audio data reproduction control section 386 determines, based on the audio data type 342 related to the audio data information 340, whether or not the audio data can be reproduced. When the audio data reproduction control section 386 determines that the audio data can be reproduced, the control section 387 outputs control signals such that the acquisition section 382 acquires audio data from the information recording medium 300 based on the audio data link information 343 and the reproducing section 384 reproduces the acquired audio data.

According to Embodiment 4 of the present invention, if at least the management information file 301 can be decoded, the compressed audio data 21 included in the EMD data 20 can be reproduced without decoding the data format of the EMD data 20.

4. Structure and operation of a copying apparatus according to Embodiment 4 of the present invention Next, a copying apparatus according to Embodiment 4 of the present invention, which copies audio data recorded in the information recording medium 300 into another information recording medium, will be described.

Figure 39A:
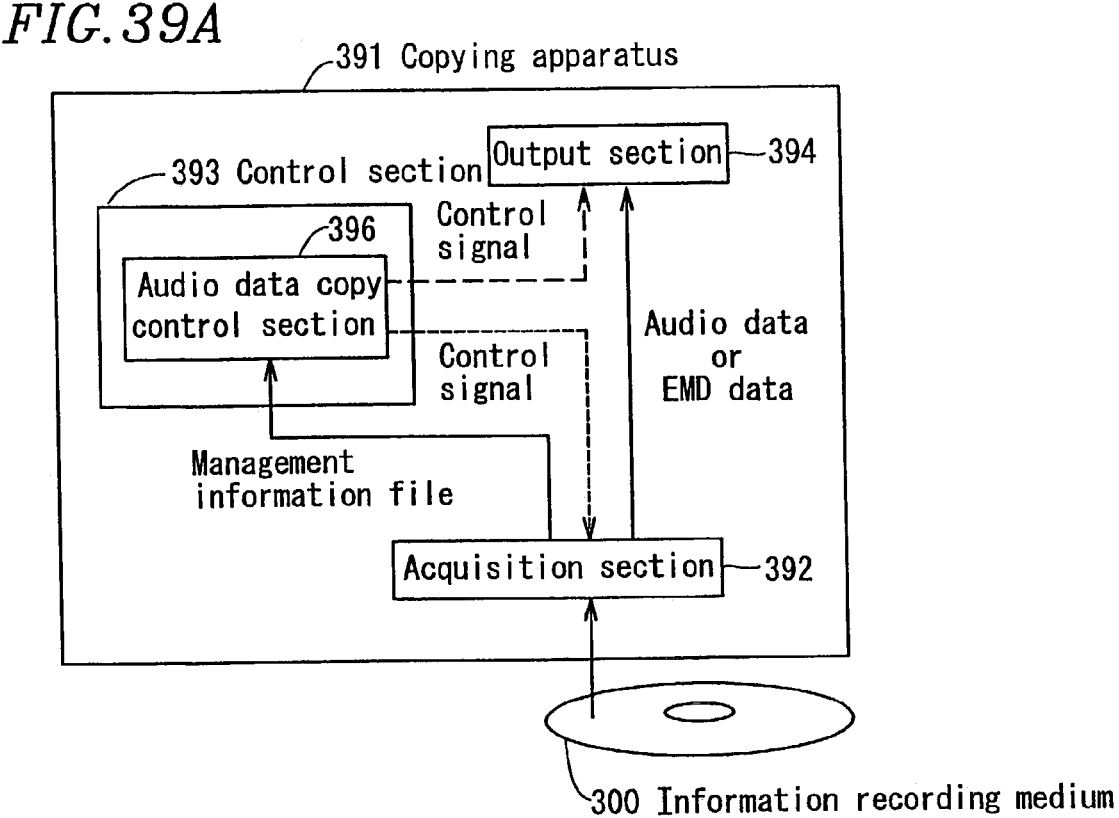
FIG. 39A is a block diagram of a copying apparatus according to Embodiment 4 of the present invention.

FIG. 39A is a block diagram of a copying apparatus 391 according to Embodiment 4 of the present invention. The copying apparatus 391 includes an acquisition section 392, a control section 393, and an output section 394. The control section 393 includes an audio data copy control section 396. The acquisition section 392 acquires a management information file 301 from the information recording medium 300 and outputs the management information file 301 to the control section 393. In this case, the data format of the management information file 301 is as shown in FIG. 34.

The audio data copy control section 396 in the control section 393 decodes the management information file 301 so as to retrieve audio data information 340 in which reproduction control information 341 associated with audio data to be copied is recorded, from the management information file 301. The control section 393 outputs control signals such that the acquisition section 392 acquires audio data from the information recording medium 300 based on audio data link information 343 included in the retrieved audio data information 340 and the output section 394 outputs the acquired audio data to another information recording medium.

Figure 39B:
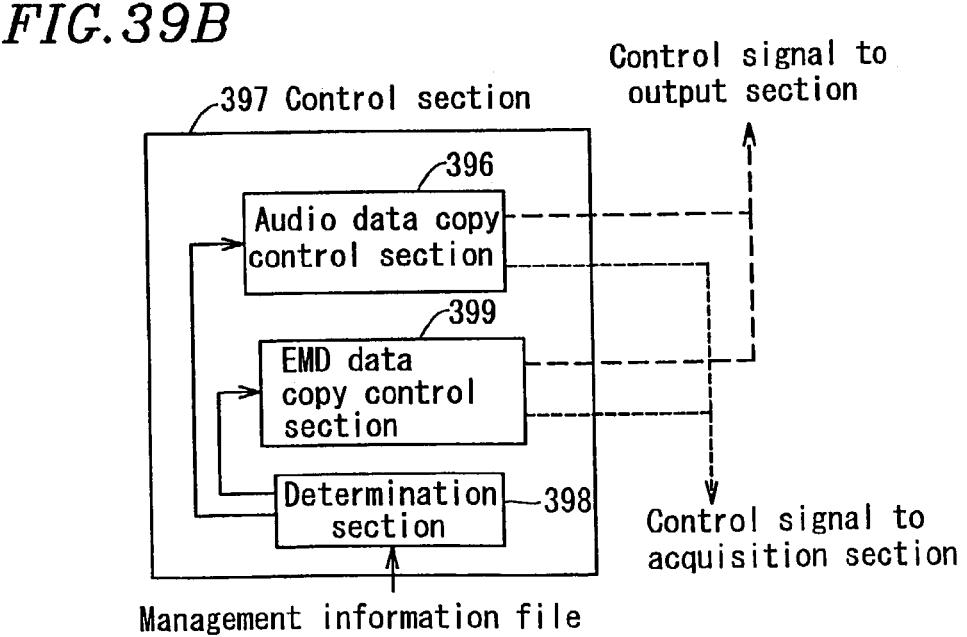
FIG. 39B is a block diagram illustrating part of another copying apparatus according to Embodiment 4 of the present invention.

FIG. 39B is a block diagram illustrating part of another copying apparatus according to Embodiment 4. The copying apparatus shown in FIG. 39B is the same as the copying apparatus 391 shown in FIG. 39A except that a control section 397 shown in FIG. 39B is different from the control section 393 shown in FIG. 39A.

The control section 397 includes a determination section 398, an EMD data copy control section 399 and an audio data copy control section 396. The determination section 398 decodes audio data information 340 in which reproduction control information 341 associated with audio data to be copied is recorded. When the determine section 398 determines that the EMD data 20 is recorded in the information recording medium 300, the determination section 398 decodes the EMD recording method type 60 so as to determine whether or not the EMD data 20 can be decoded. As a result, when the determination section 398 determines that the EMD data 20 can be decoded, the EMD data copy control section 399 outputs control signals such that the acquisition section 392 acquires the EMD data 20 based on EMD data link information 61 and the output section 394 outputs compressed audio data 21 included in the EMD data 20 to another information recording medium.

When the determination section 398 determines that the EMD data 20 is not recorded in the information recording medium 300 or the EMD data 20 cannot be decoded, as in the case described with reference to FIG. 39A, the audio data copy control section 396 outputs control signals such that the acquisition section 392 acquires audio data from the information recording medium 300 based on audio data link information 343 included in the audio data information 340, and the output section 394 outputs the acquired audio data to another information recording medium.

According to Embodiment 4 of the present invention, if at least the management information file 301 can be decoded, it is possible to copy the compressed audio data 21 included in the EMD data 20, which is recorded in the information recording medium 300, without decoding the data format of the EMD data 20.

(Embodiment 5)

Figure 40:
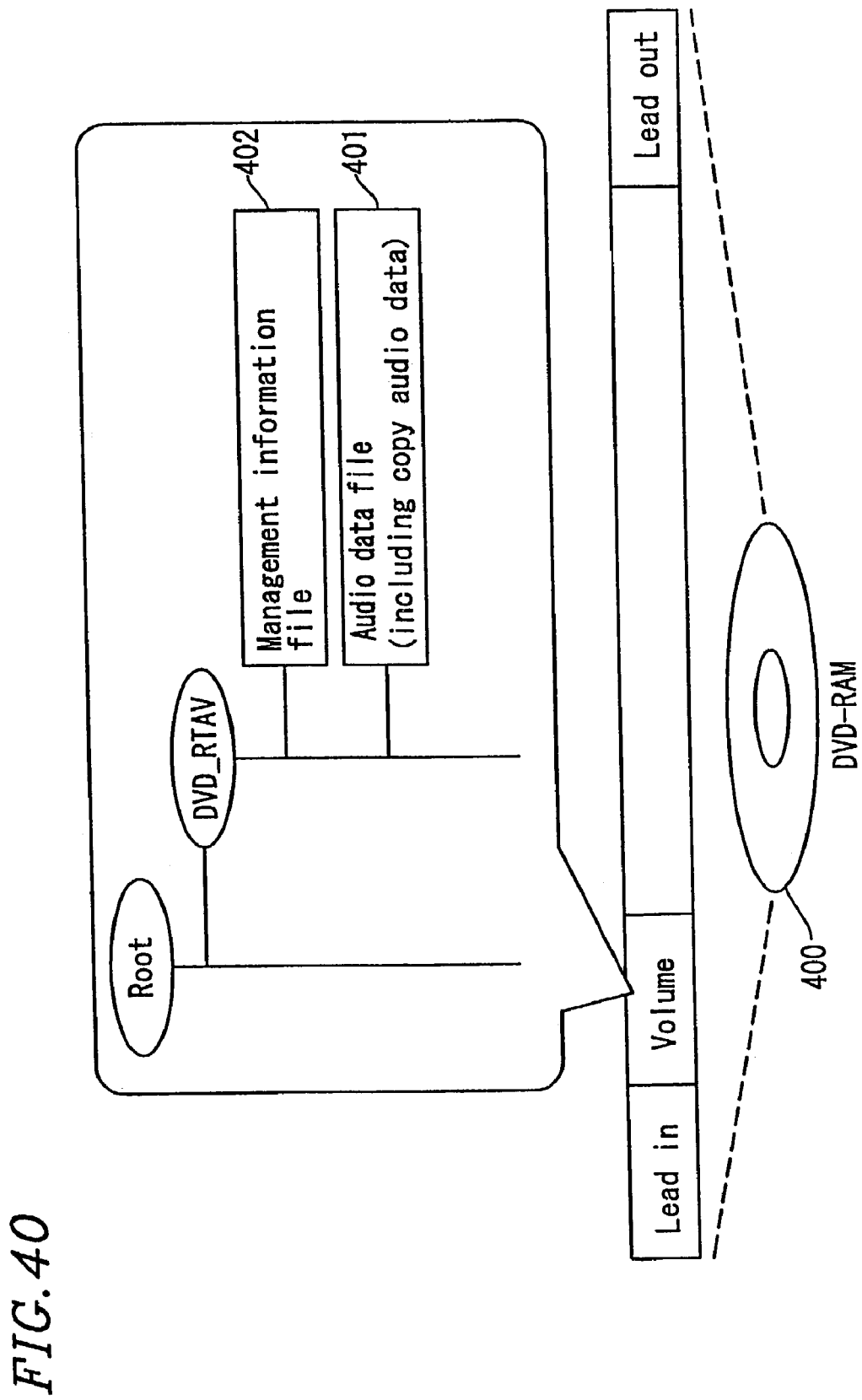
FIG. 40 is a schematic diagram of an information recording medium 400 according to Embodiment 5 of the present invention.

1. Structure of an information recording medium according to Embodiment 5 of the present invention FIG. 40 is a schematic diagram of an information recording medium 400 according to Embodiment 5. For example, the information recording medium 400 is a DVD-RAM disc. The DVD-RAM disc 400 includes an audio data file 401 and a management information file 402. The audio data file 401 includes reproduction-compatible audio data (first audio data) and copy audio data (second audio data). The management information file 402 mainly includes reproduction control information associated with the reproduction compatible-audio data.

Next, the data recorded to each file will be described in further detail.

Figure 41:
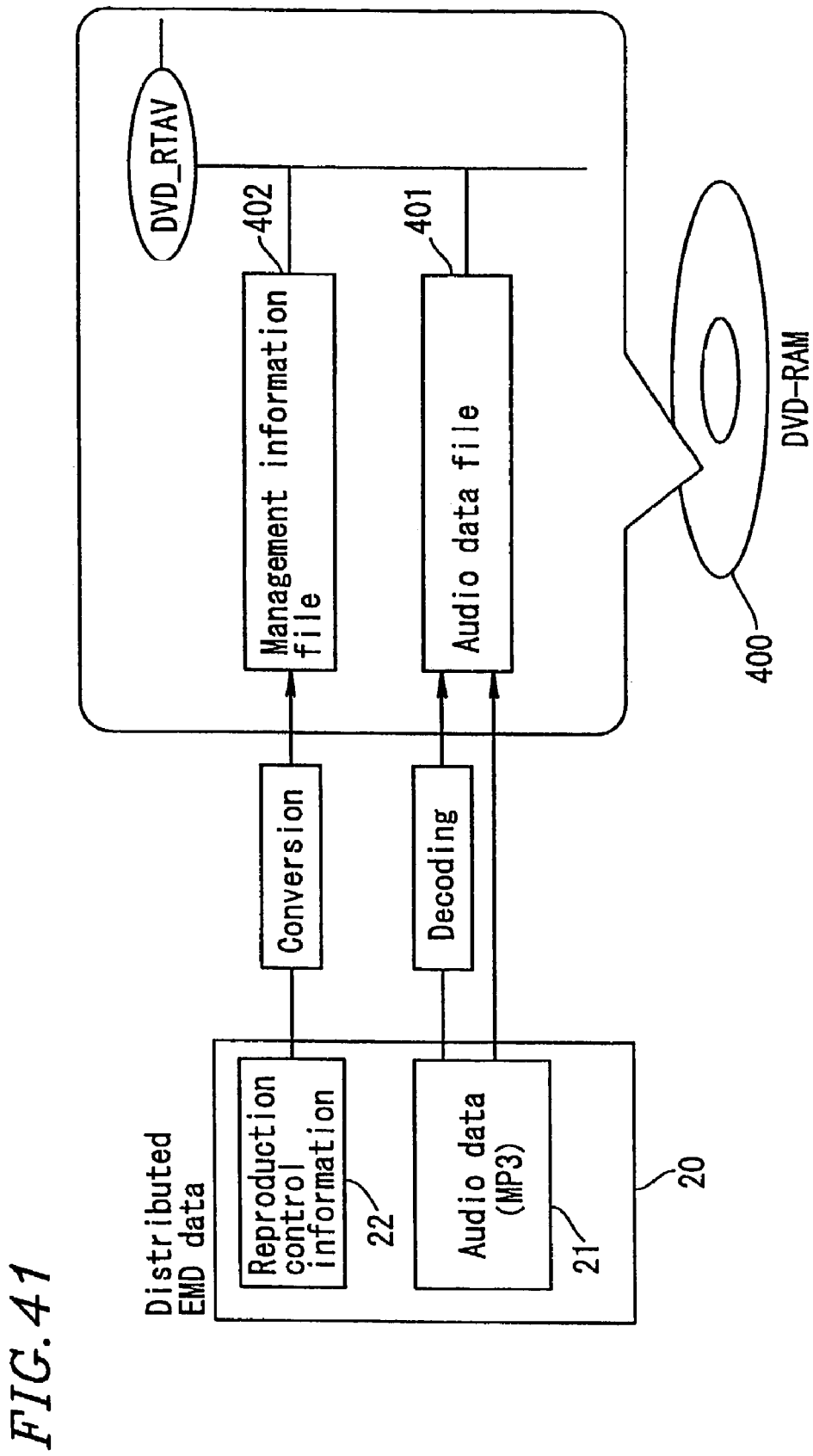
FIG. 41 illustrates how EMD data 20 is recorded to the information recording medium 400 of FIG. 40.

FIG. 41 schematically illustrates how the EMD data 20 is recorded to the DVD-RAM disc 400, shown in FIG. 40. In Embodiment 5, the EMD data 20 includes compressed audio data 21, which is compressed according to an MP3 method, and reproduction control information 22 associated with the compressed audio data 21.

When the EMD data 20 is distributed, the MP3 compressed audio data 21 included in the EMD data 20 is decoded, the decoded audio data is recorded as reproduction compatible-audio data to the audio data file 401. For example, the reproduction compatible-audio data is audio data encoded according to an LPCM method. The MP3 compressed audio data 21 included in the EMD data 20 is also recorded as copy audio data to the audio data file 401 as it is distributed. For example, the copy audio data is MP3 audio data. Information, which is converted from the reproduction control information 22 included in the distributed EMD data 20 so as to be decodable in the DVD-RAM disc 400, and information, which is used for managing the audio data file 401, are recorded to the management information file 402. As a result, the reproduction compatible-audio data, which ensures reproduction compatibility, i.e., LPCM audio data, and the copy audio data, which enables high-speed copying, i.e., MP3 audio data, are recorded to the DVD-RAM 400, and therefore it is possible to ensure reproduction compatibility and realize high-speed copying.

Figure 42:
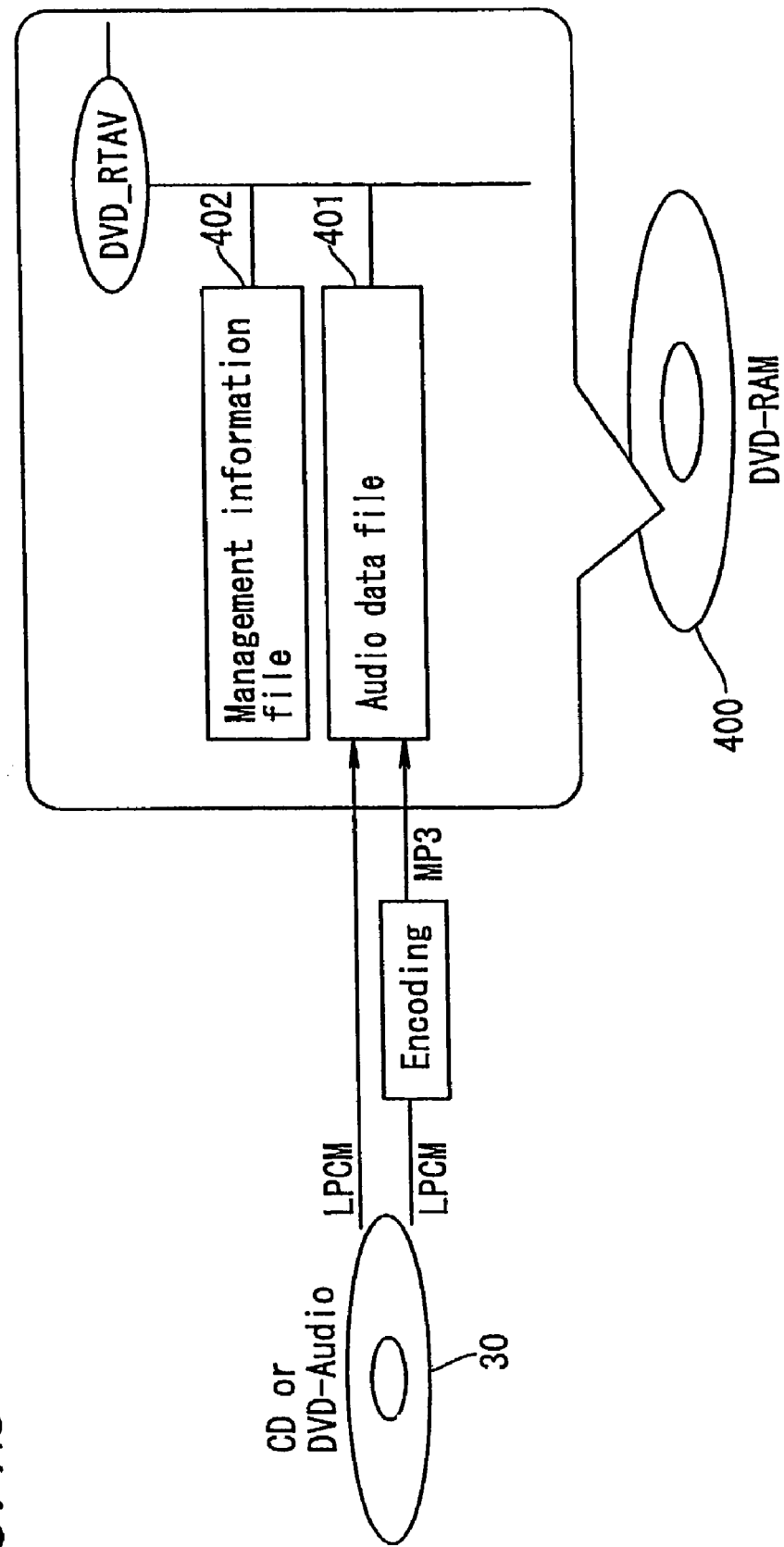
FIG. 42 illustrates how audio data recorded in a CD or DVD-Audio 30 is recorded to the information recording medium 400 of FIG. 40.

FIG. 42 schematically illustrates how audio data recorded in a CD or DVD-Audio 30 is recorded to the DVD-RAM disc 400 of FIG. 40. In Embodiment 5, the audio data recorded in the CD or DVD-Audio 30 is LPCM audio data. The LPCM audio data output from the CD or DVD-Audio 30 is recorded as reproduction compatible-audio data to the audio data file 401 as it is output. The LPCM audio data output from the CD or DVD-Audio 30 is also compressed by a compression encoding method, e.g., an MP3 method, so as to be recorded as copy audio data to the audio data file 401. Information for managing the audio data file 401 is recorded to the management information file 402. As a result, the reproduction compatible-audio data, which ensures reproduction compatibility, i.e., LPCM audio data, and the copy audio data, which enables high-speed copying, i.e., MP3 audio data, are recorded to the DVD-RAM 400, and therefore it is possible to ensure reproduction compatibility and realize high-speed copying. In this case, only the reproduction compatible-audio data may be recorded to the audio data file 401. The reproduction compatible-audio data is preferably audio data, which is encoded according to an encoding method, i.e., an LPCM method, and ensures reproduction compatibility. The copy audio data is preferably compressed according to an MP3 compression encoding method or the like.

Figure 43:
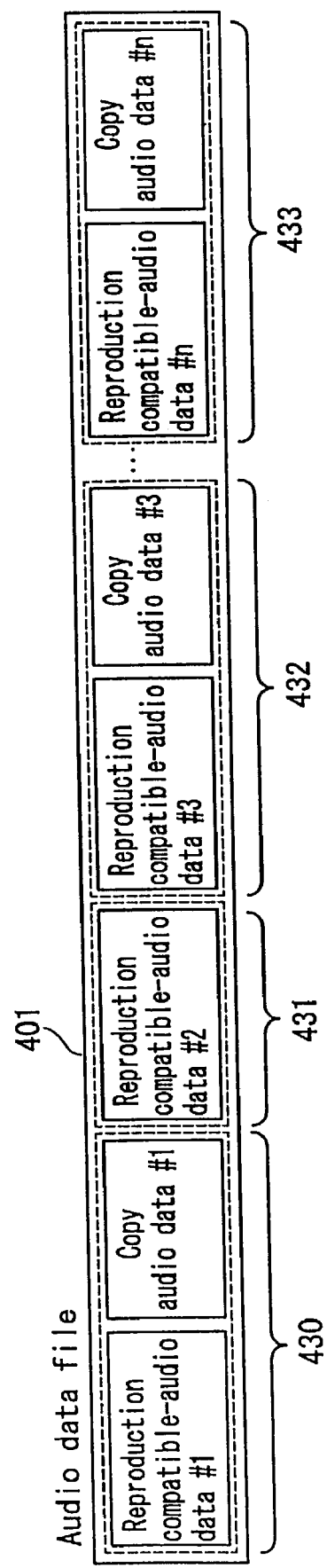
FIG. 43 is a diagram illustrating a detailed structure of an audio data file 401.

FIG. 43 is a diagram illustrating a detailed structure of the audio data file 401. The audio data file 401 includes reproduction compatible audio data #1, #2, #3, . . . #n, and copy audio data #1, #3, . . . , #n. In FIG. 43, the reproduction compatible-audio data #1 and the copy audio data #1 are created from the same piece of music and function together as an audio data portion 430. Similarly, the reproduction compatible-audio data #3 and the copy audio data #3 are created from the same piece of music and function together as an audio data portion 432. Moreover, the reproduction compatible-audio data #n and the copy audio data #n are created from the same piece of music and function together as an audio data portion 433. The audio data portion 431 includes the reproduction compatible-audio data #2 but does not include any copy audio data. In this manner, copy audio data corresponding to reproduction compatible-audio data may not be included in an audio data portion which represents a piece of music.

Figure 44:
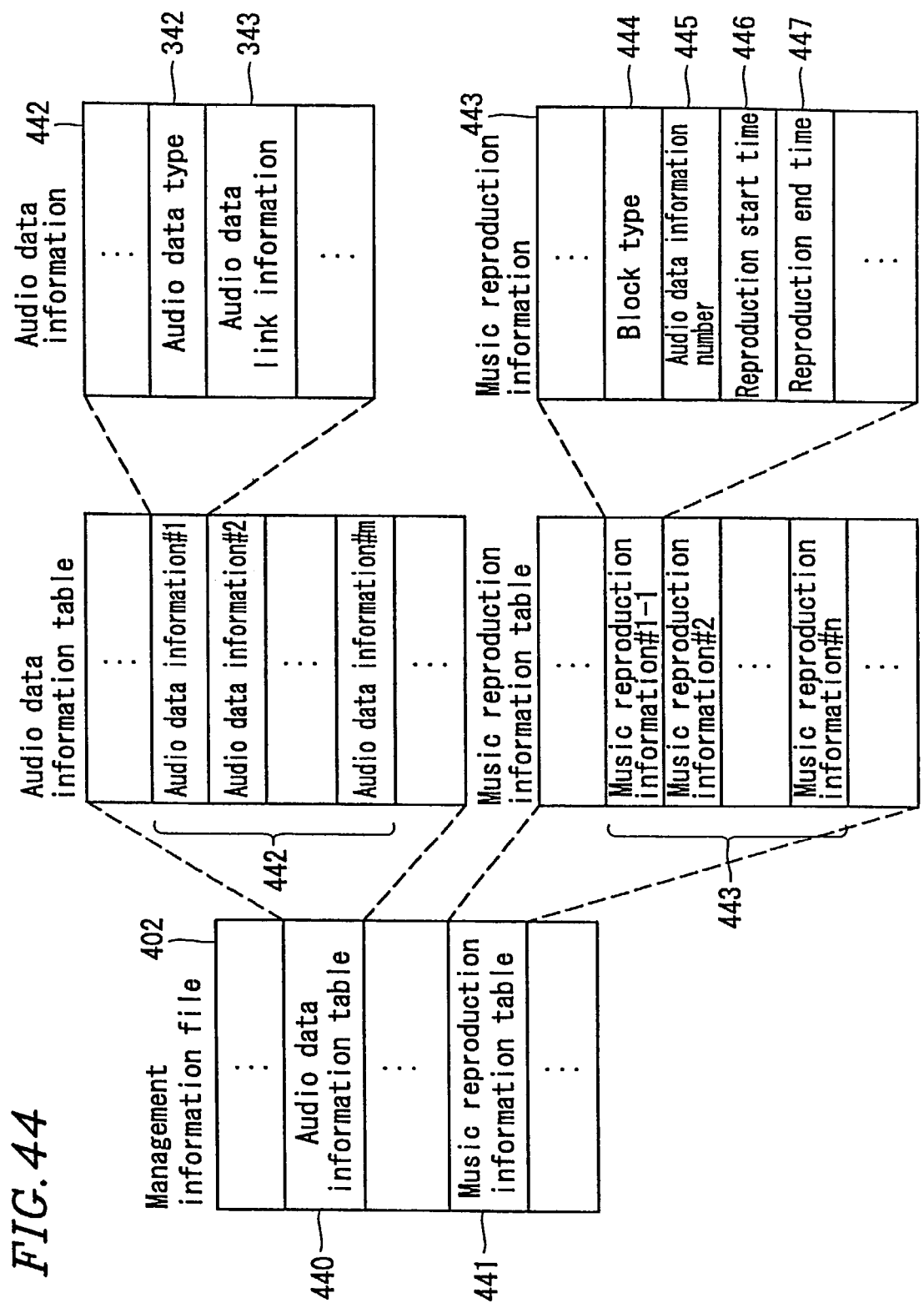
FIG. 44 is a diagram illustrating a detailed structure of a management information file 402.

FIG. 44 is a diagram illustrating a detailed structure of the management information file 402. The management information file 402 includes an audio data information table 440 and a music reproduction information table 441.

The audio data information table 440 includes audio data information 442 related to all audio data recorded in the audio data file 401, i.e., reproduction compatible-audio data and copy audio data. The audio data information 442 is provided such that a piece of the audio data information 442 corresponds to a piece of audio data recorded in the audio data file 401, i.e., reproduction compatible-audio data or copy audio data.

Similar to Embodiment 4, the audio data information 442 includes an audio data type 342 and audio data link information 343. The audio data type 342 is information which specifies an encoding method, e.g., an MP3 method, for encoding audio data indicated by the audio data link information 343. The audio data link information 343 indicates a recording position of audio data managed by the audio data information 442, e.g., are cording start address or a recording end address of the audio data.

The music reproduction information table 441 includes the entire music reproduction information 443, which manages information related to apiece of music, i.e., a unit of reproduction of audio data. The music reproduction information 443 is provided to each piece of audio data included in a piece of music which is a unit of reproduction.

The music reproduction information 443 includes a block type 444, an audio data information number 445, a reproduction start time 446, and are production end time 447.

The block type 444 is a flag which indicates whether the audio data indicated by the music reproduction information 443 is audio data for use in reproduction (first use), i.e., a first block type, or audio data for use in copying (second use), i.e., a second block type. The audio data information number 445 is assigned to the audio data information 442 so as to specify the audio data information 442. The reproduction start time 446 and the reproduction end time 447 represent a time for starting or ending the reproduction of audio data managed by the audio data information 442 indicated by the audio data information number 445.

Figure 45:
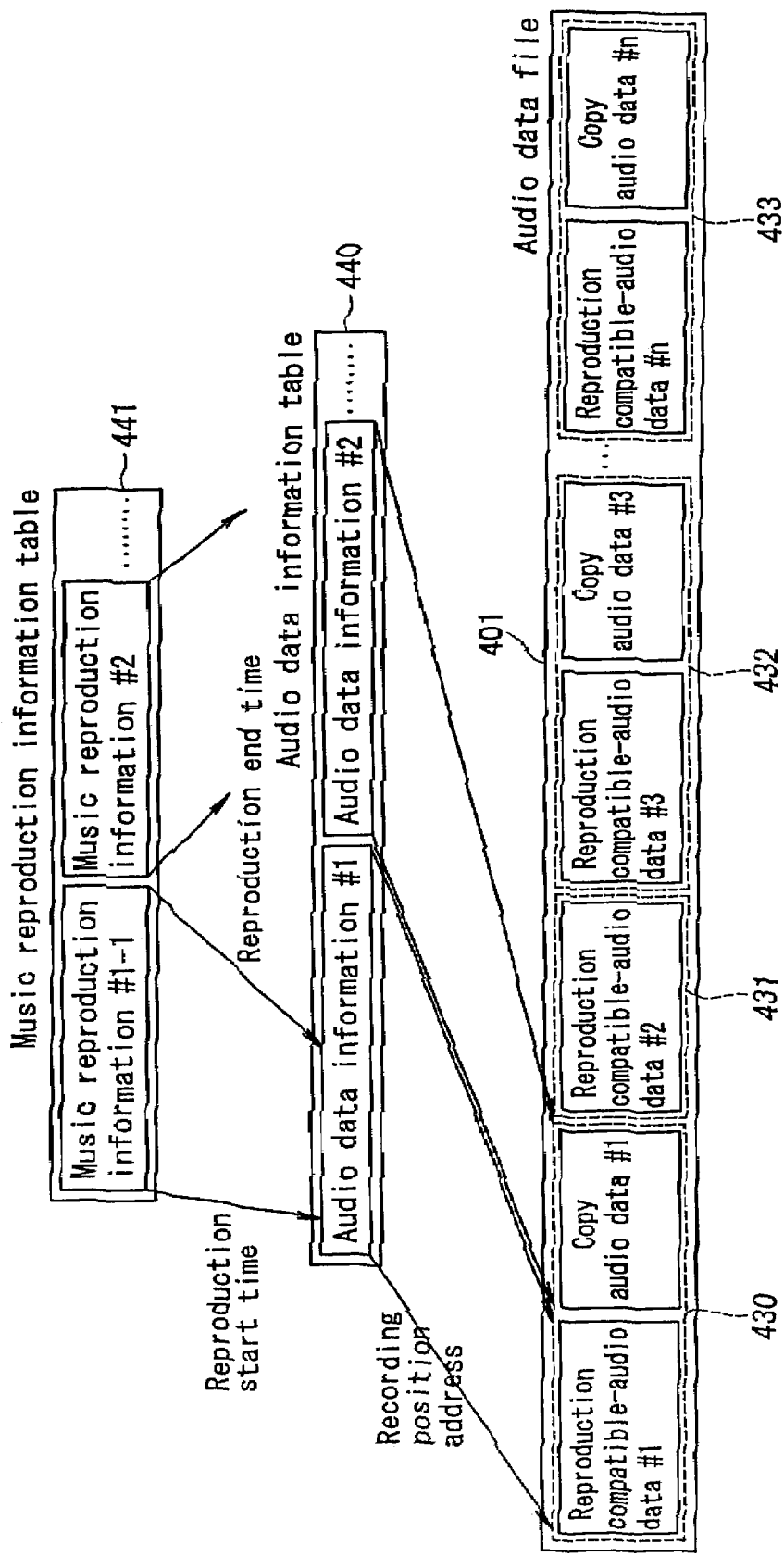
FIG. 45 illustrates relationships among an audio data file 401, an audio data information table 440, and a music reproduction information table 441.

FIG. 45 illustrates relationships among the audio data file 401, the audio data information table 440, and the music reproduction information table 441. In Embodiment 5, music reproduction information #1-1 (first music reproduction information) specifies the music data information #1 which specifies the reproduction compatible-audio data #1. The audio data information #2 specifies the copy audio data #1.

For example, in the case where the management information file 402 of the information recording medium 400 according to Embodiment 5 of the present invention is configured as illustrated in FIG. 44, a relationship between the audio data file 401 and the management information file 402 is as illustrated in FIG. 45, and the first one of a plurality pieces of music, e.g., the audio data portion 430 shown in FIG. 45, is reproduced, prescribed audio data may be reproduced in the following manner.

Firstly, the music reproduction information #1-1 is referred and the audio data information 442 indicated by the music reproduction information #1-1 is retrieved according to the audio data information number 445. Whether or not audio data can be reproduced is determined based on the audio data type 342 included in the audio data information 442. When it is determined that the audio data can be reproduced, audio data, which is present at a recording position address indicated by the audio data link information 343 is read. The audio data can be reproduced from one point in time to another point in time according to the reproduction start time 446 and the reproduction end time 447. Although not shown in FIG. 45, the music reproduction information #1-1 (first music reproduction information) and the music reproduction information #1-2 (second music reproduction information) are included in a music block. The term "music block" means music reproduction information corresponding to one audio data portion.

As illustrated in FIG. 45, the reproduction compatible-audio data #1 and the copy audio data #1, which are included in the audio data portion 430, are audio data representing the same piece of music, the reproduction compatible-audio data #3 and the copy audio data #3, which are included in the audio data portion 432, are audio data representing the same piece of music, and the reproduction compatible-audio data #n and the copy audio data #n, which are included in the audio data portion 433 are audio data representing the same piece of music. In the light of convenience for a user, it is desirable that the reproduction compatible-audio data #1, #3 and #n are reproduced and the copy audio data #1, #3 and #n are not reproduced. By decoding the block type 444 shown in FIG. 44, whether the audio data indicated by the music reproduction information 443 is reproduction compatible-audio data or copy audio data is determined. Accordingly, it is possible to reproduce either the reproduction compatible-audio data or the copy audio data based on the block type 444. It is preferable that the reproduction compatible-audio data is reproduced when the block type 444 is the first block type and the copy audio data is not reproduced when the block type 444 is the second block type. However, the copy audio data may be reproduced or the reproduction compatible-audio data may be used for copying so long as either one of two audio data, which represent the same piece of music, is used for reproduction or copying.

As described above, the music reproduction information 443 is provided to each piece of audio data. This means that the block type 444 is also provided to each piece of audio data. As shown in FIG. 43, even in the case where the audio data file 401 includes the audio data portions 430, 432, and 433, which includes both reproduction compatible-audio data and copy audio data for the same piece of music, together with the audio data portion 431, which includes only a piece of reproduction audio data for the same piece of music, when the block type 444 is decoded, the same piece of music is not reproduced twice.

Figure 46:
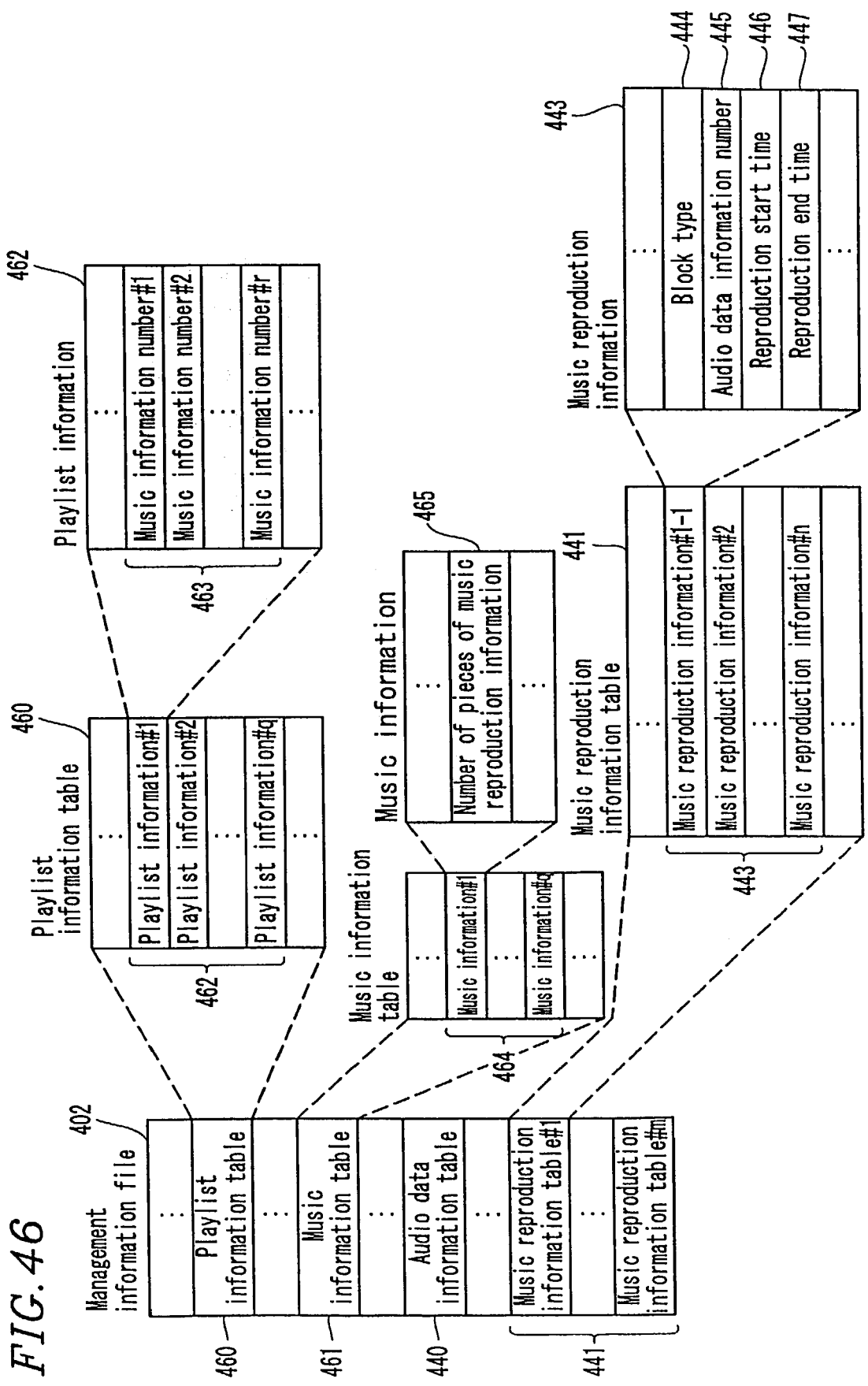
FIG. 46 is a diagram illustrating a further detailed structure of the management information file 402.

FIG. 46 is a diagram illustrating the structure of the management information file 402 in more detail. In addition to the audio data information table 440 and the music reproduction information table 441, the management information file 402 further includes a playlist information table 460 and a music information table 461. The audio data information table 440 and the music reproduction information table 444 have been described above with reference to FIGS. 44 and 45, and therefore the description thereof is omitted.

The playlist information table 460 includes playlist information 462 in which each piece of recorded information is associated with a playlist which defines the order of reproducing one or more pieces of music recorded in the information recording medium 400. The playlist information 462 includes music information number 463 corresponding to (one or more pieces of) music which is reproduced according to a corresponding playlist. The music information number 463 is recorded according to the order of music to be reproduced.

The music information table 461 includes music information 464 which includes information related to each piece of music and is recorded to the information recording medium 400. The music information 464 includes music reproduction information number 465 in which the number of pieces of music reproduction information 443 for managing audio data corresponding to a piece of music specified by the music information number 463 is recorded. The music reproduction information number 465 specifies the number of pieces of music reproduction information 443 for managing audio data.

Figure 47:
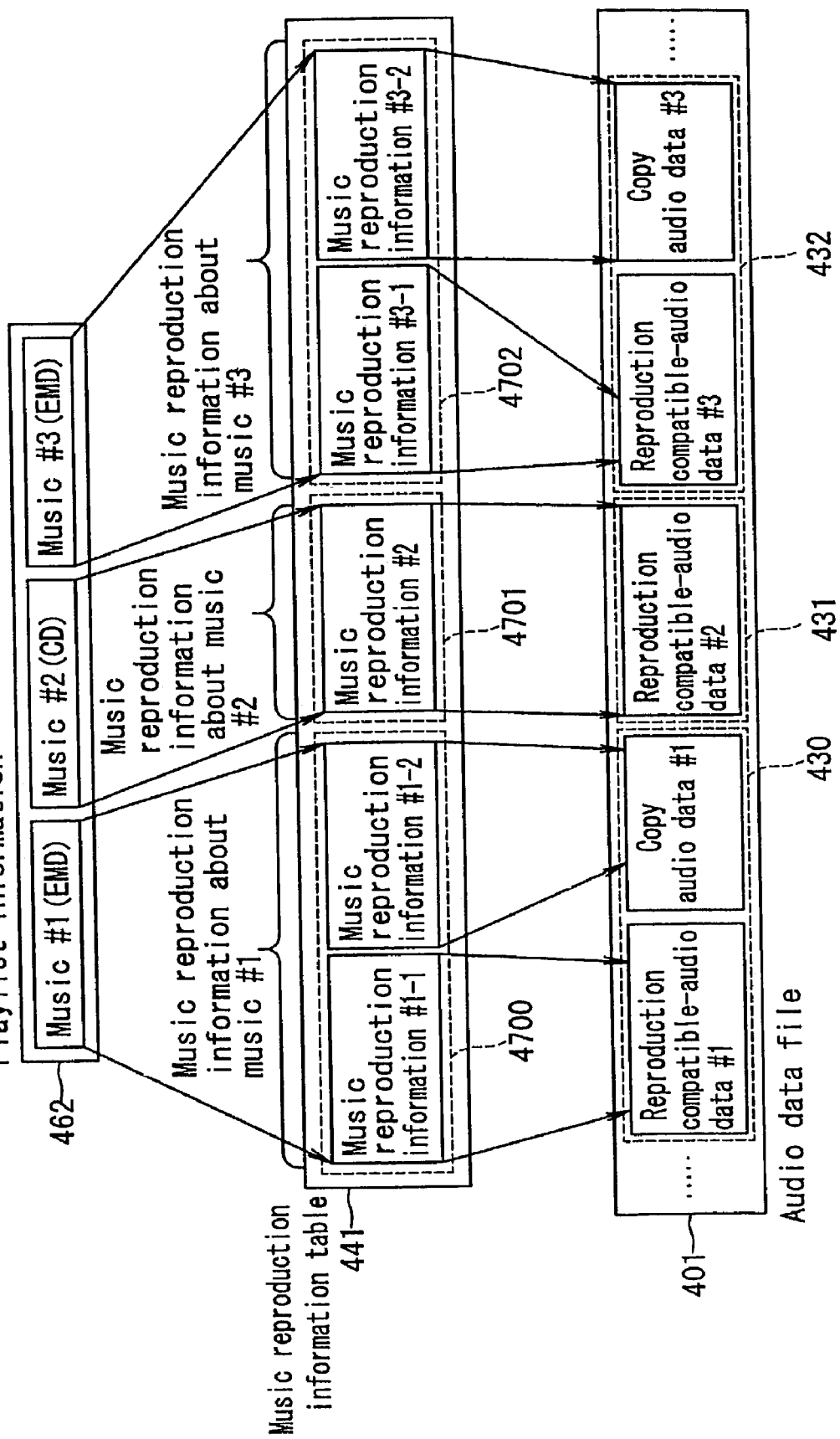
FIG. 47 illustrates relationships among the audio data file 401, the music reproduction information table 441, and playlist information 462.

FIG. 47 represents relationships among the audio datafile 401, the music reproduction information table 441, and the playlist information 462. FIG. 47 illustrates exemplary playlist information 462 which is defined such that reproduction is performed in the order of EMD data (music #1), data recorded in a CD (music #2), and, again, EMD data (music #3). Note that the audio data information table 440 is omitted from FIG. 47 for the sake of clarification of description, and the music reproduction information is recorded according to the order of reproduction. That is, music reproduction information associated with a first piece of music is recorded and music reproduction information associated with a second piece of music is recorded in the next place. FIG. 47 is intended to be an example and the present invention is not limited to the data format shown in FIG. 47.

The music #1 is associated with music reproduction information #1-1 (first music reproduction information) and music reproduction information #1-2 (second music reproduction information), which are included in a music block 4700. The music reproduction information #1-1 and #1-2 are respectively associated with the reproduction compatible-audio data #1 and the copy audio data #1, which are included in the reproduction data portion 430. The music #2 is associated with music reproduction information #2 which is included in a music block 4701. The music reproduction information #2 is associated with the reproduction compatible-audio data #2 which is included in the reproduction data portion 431. Similarly, the music #3 is associated with music reproduction information #3-1 and #3-2 which are included in a music block 4702. The music associated with the reproduction compatible-audio data #3 and the copy audio data #3, which are included in the reproduction data portion 432. As described above, the reproduction compatible-audio data #1 and the copy audio data #1 represent the same piece of music. Similarly, the reproduction compatible-audio data #3 and the copy audio data #3 represent the same piece of music.

As is apparent from FIG. 47, a piece of music is represented by a set of a single audio data portion and a single music block. The single audio data portion includes reproduction compatible-audio data (first audio data) and copy audio data (second audio data) or includes only the reproduction compatible-audio data (first audio data). The single music block includes the first music reproduction information, which includes a first block type, and the second music reproduction information, which includes a second block type, or includes only the first music reproduction information, which includes the first block type.

Each of the music reproduction information #1-1 and #3-1 includes a first block type, which specifies that audio data associated with each of these is for use in reproduction (first use). Each of the music reproduction information #1-2 and #3-2 includes a second block type, which specifies that audio data associated with each of these is for use in copying (second use).

In this case, the number of pieces of music reproduction information associated with the music #1 is 2, the number of music reproduction information associated with the music #2 is 1, and the number of music reproduction information associated with the music #3 is 2. When the third piece of music is reproduced, the number 4, which is obtained by adding 1 to the sum (i.e., 3=2+1) of the number of pieces of music reproduction information associated with the first and second music #1 and #2 among all the pieces of music reproduction information included in music defined by the playlist information 462 (the total number is 5 in the case of FIG. 47), is specified as indicating audio data which is reproduced at the beginning of the third music #3. As a result, audio data is reproduced such that the number of pieces of the audio data corresponds to the number of pieces of music reproduction information recorded as the music information 464 (FIG. 46) associated with the third music #3. However, in the example of FIG. 47, the third music #3 includes the reproduction compatible-audio data #3 and the copy audio data #3, and therefore either the reproduction compatible-audio data #3 or the copy audio data #3 is reproduced based on the block type 444. In consideration of sound quality, the reproduction compatible-audio data is preferably reproduced.

According to Embodiment 5 of the present invention, the music reproduction information for managing reproduction compatible-audio data is recorded to the music reproduction information table 441, first, and then the music reproduction information for managing copy audio data is recorded.

In this manner, by using the block type 444, it is possible to configure the audio data file 401 so as to retain both the reproduction compatible audio data and the copy audio data when recording EMD data and retain only the reproduction compatible-audio data when recording audio data recorded in a CD.

Accordingly, such a data format is useful for an information recording medium for recording music, which is represented by audio data recorded in a CD, together with music, which is represented by EMD data, and an information recording medium for recording music piece-by-piece.

In the example of FIG. 47, a case where a single piece of music corresponds to a single audio data portion (including reproduction compatible-audio data and copy audio data or including only the reproduction compatible-audio data) has been described. Next, an example in which a single piece of music corresponds to a plurality of audio data portions is described.

FIG. 48 illustrates relationships among the audio data file 401, the music reproduction information table 441, and the music information table 461, before and after combining pieces of music. Note that the audio data information table 440 is omitted from FIG. 48 for the sake of clarification of the description, and in FIG. 48, a single audio data portion includes only the reproduction compatible-audio data. FIG. 48 is intended to be an example and the present invention is not limited to the data format shown in FIG. 48.

In "before combining" shown in FIG. 48, the music information table 461 is defined such that music #i corresponding to the music information #i is reproduced, and then music #j corresponding to the music information #j is reproduced. The music #i is associated with music reproduction information #i included in a music block 4800. The music #j is associated with music reproduction information #j included in a music block 4803. The music reproduction information #i is associated with reproduction compatible-audio data included in an audio data section 4800. The music reproduction information #j is associated with reproduction compatible-audio data #j included in an audio data portion 4801. In this case, the number of pieces of music reproduction information indicated by the music reproduction information number 465 in the music information #i is 1 and the number of pieces of music reproduction information indicated by the music reproduction information number 465 in the music information #j is 1.

In "after combining" shown in FIG. 48, the music information table 461 is defined such that the music information

1 corresponding to the music #i and the music information #j corresponding to the music #j are combined and new music #i' corresponding to new music information #i' is reproduced. The music #i' is associated with music reproduction information #i and #j. The music reproduction information #i and #j are associated with the reproduction compatible-audio data #i included in the audio data section 4800 and the reproduction compatible-audio data #j included in the audio data portion 4801, respectively. In this case, the number of pieces of reproduction information associated with new music #i' created by the combining is 2.

In this manner, a piece of music may include a plurality of audio data portions. In such a case, the music reproduction information can indicate only part of audio data corresponding to a piece of music.

Figure 49:
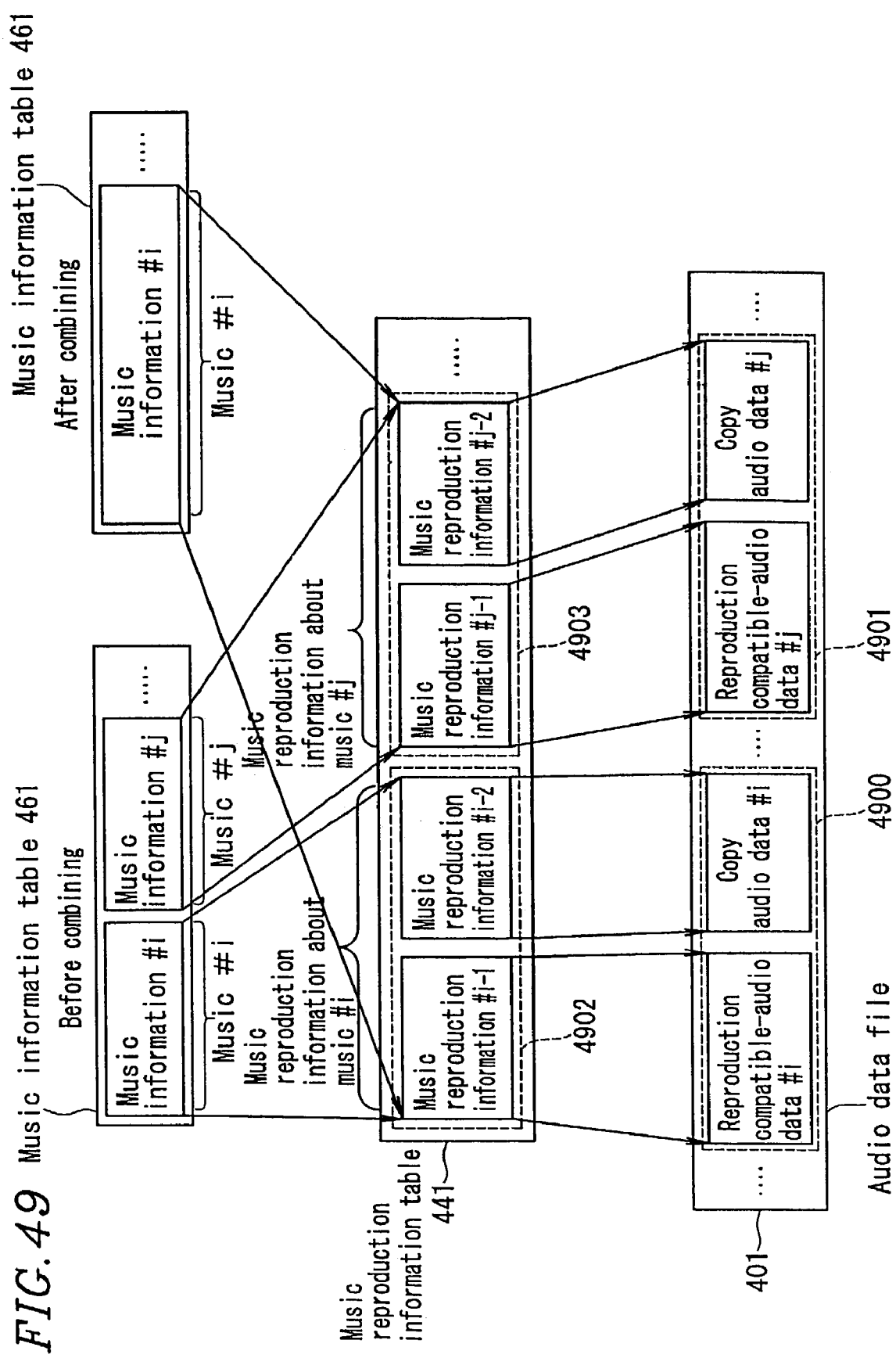
FIG. 49 illustrates other relationships among the audio data file 401, the music reproduction information table 441, and the music information table 461, with respect to the situation before and after combining pieces of music.

FIG. 49 illustrates other relationships among the audio data file 401, the music reproduction information table 441, and the music information table 461, with respect to before and after combining pieces of music. Note that the audio data information table 440 is omitted from FIG. 49 for the sake of clarification of the description. FIG. 49 is intended to be an example and the present invention is not limited to the data format shown in FIG. 49. Although the audio data portion described in conjunction with FIG. 48 includes only the reproduction compatible-audio data, an audio data portion described in conjunction with FIG. 49 includes reproduction compatible-audio data and copy audio data.

In "before combining" shown in FIG. 49, the music information table 461 is defined such that music #i corresponding to music information #i is reproduced, and then music #j corresponding to music information #j is reproduced. The music #i is associated with music reproduction information #i-1 and #i-2, which are included in a music block 4902. The music #j is associated with music reproduction information #j-1 and #j-2, which are included in a music block 4903. The music reproduction information #i-1 and #i-2 are associated with reproduction compatible-audio data #i and copy audio data #i, respectively, which are included in an audio data portion 4900. The music reproduction information #j-1 and #j-2 are associated with reproduction compatible-audio data #j and copy audio data #j, respectively, which are included in an audio data portion 4901. In this case, the number of pieces of music reproduction information associated with the music #i is 2 and the number of pieces of music reproduction information associated with the music #j is 2.

In "after combining" shown in FIG. 49, the music information table 461 is defined such that the music information #i corresponding to the music #i and the music information #j corresponding to the music #j are combined and new music #i' corresponding to new music information #i' is reproduced. The music #i' is associated with music reproduction information #i-1 and #i-2 and music reproduction information #j-1 and #j-2. The association between audio data and music reproduction information #i-1, #i-2, #j-1, and #j-2 is the same as that established before combining. In this case, the number of pieces of music reproduction information associated with the new music #i' created by combining is 4. In the case where the audio data portion include both the reproduction compatible audio data and the copy audio data, as in the case described with reference to FIG. 47, combining pieces of music can be readily performed. As described with reference to FIGS. 48 and 49, pieces of music, which are units of reproduction, are combined, thereby improving convenience for a user.

Figure 50:
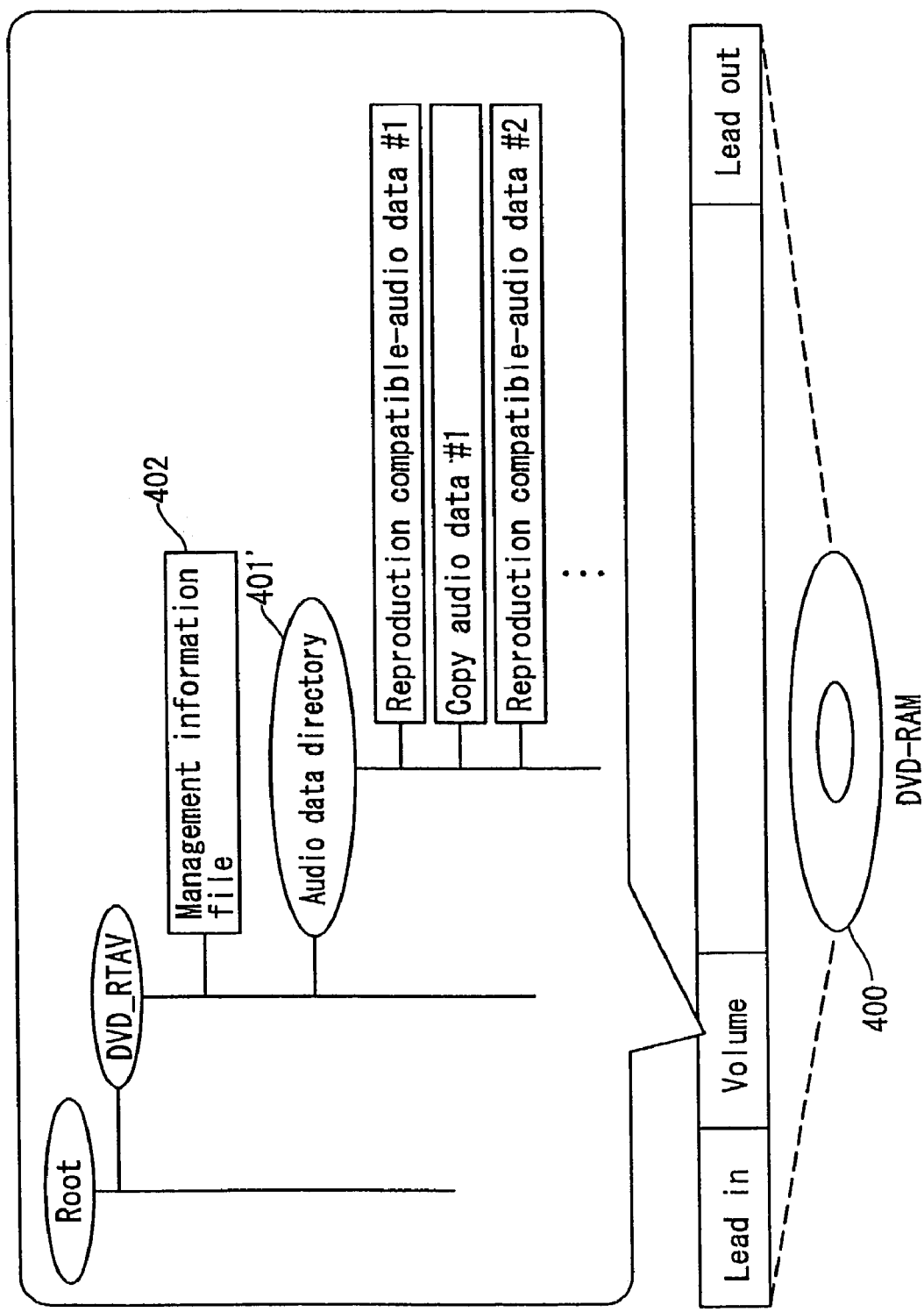
FIG. 50 is another schematic diagram of the information recording medium 400 according to Embodiment 5 of the present invention.

FIG. 50 is another schematic diagram of the information recording medium 400 according to Embodiment 5. In the information recording medium 400 of FIG. 50, an audio data directory 401' is included in place of the audio data file 401. A management information file 402 shown in FIG. 50 is the same as that shown in FIG. 40. Each piece of reproduction-compatible audio data and copy audio data maybe recorded as a file under the audio data directory 401'.

According to Embodiment 5 of the present invention, reproduction compatible-audio data is reproduced by decoding the management information file 402, thereby ensuring reproduction compatibility. High-speed copying of audio data can be realized by copying copy audio data. Reproduction is performed based on the block type assigned to each of the pieces of music reproduction information associated with the reproduction compatible-audio data and the copy audio data, respectively, which represent the same piece of music, and therefore the same piece of music is not reproduced twice, i.e., the copy audio data is reproduced after the reproduction of the reproduction compatible-audio data, or vice versa.

2. Structure and operation of an information recording apparatus according to Embodiment 5 of the present invention Next, an information recording apparatus according to Embodiment 5 of the present invention, which records audio data to an information recording medium 476, will be described.

Figure 51:
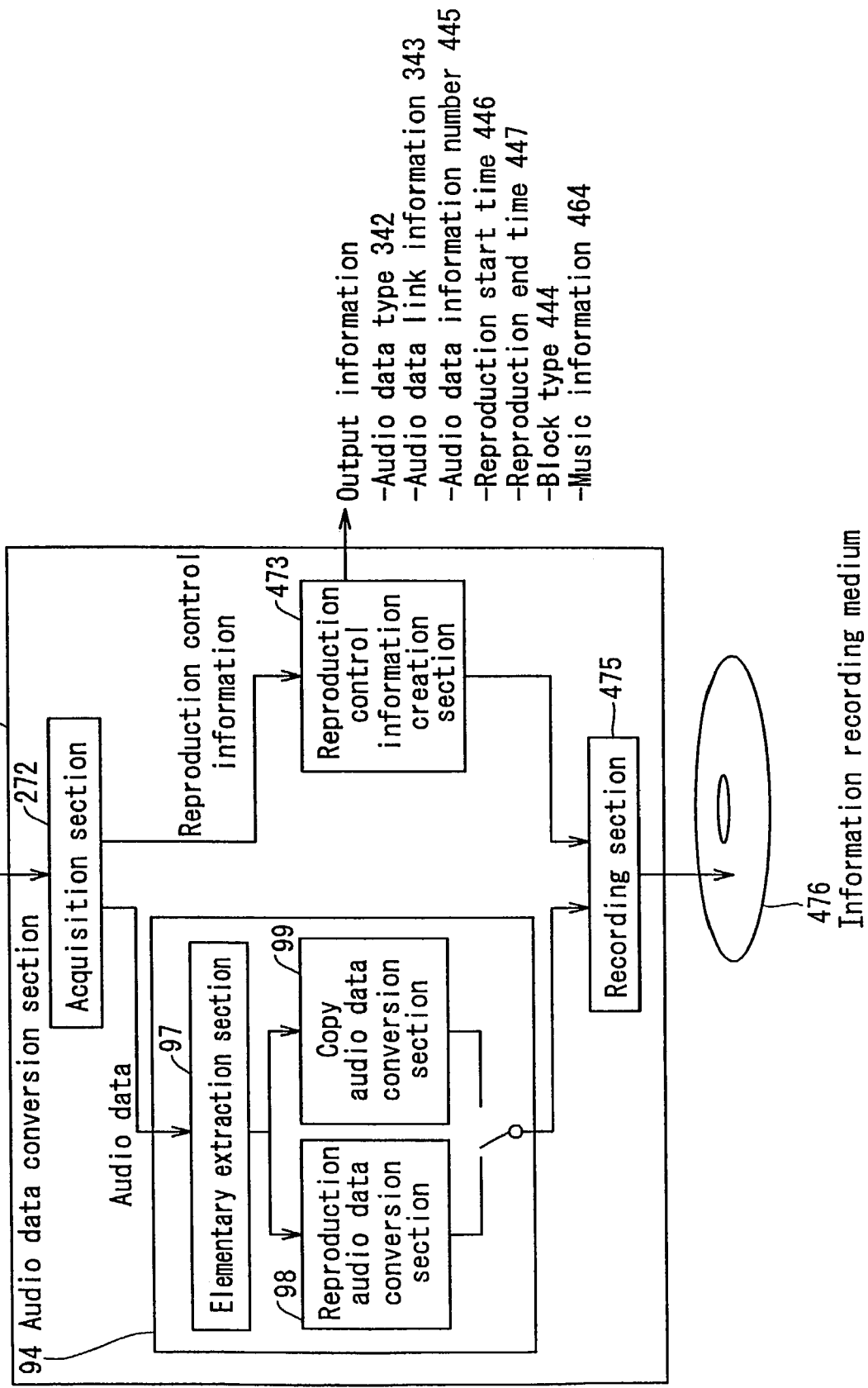
FIG. 51 is a block diagram of an information recording apparatus 471 according to Embodiment 5 of the present invention.

FIG. 51 is a block diagram of an information recording apparatus 471 according to Embodiment 5. The information recording apparatus 471 includes an acquisition section 272, a reproduction control information creation section 473, an audio data conversion section 94, and a recording section 275. The audio data conversion section 94 includes an elementary extraction section 97, are production audio data conversion section 98, and a copy audio data conversion section 99.

Next, a recording operation for recording the EMD data 20, which is distributed by an electronic music distribution system, to the information recording medium 476 will be described. Similar to Embodiment 1, when recording the EMD data 20, which includes reproduction control information 22 and compressed audio data 21, using the information recording apparatus 471, the acquisition section 92 acquires the EMD data 20 and outputs the reproduction control in formation 22 and the compressed audio data 21 to the reproduction control information creation section 473 and the audio data conversion section 94, respectively.

The elementary extraction section 97 extracts only elementary portions from the compressed audio data 21 output to the audio data conversion section 94 and outputs the elementary portions to the reproduction audio data conversion section 98 and the copy audio data conversion section 99. In the reproduction audio data conversion section 98, the compressed audio data 21 from which only the elementary portions are extracted is converted into reproduction-compatible audio data (first audio data) conforming to an encoding method, e.g., an LPCM method, which ensures reproduction compatibility. In the copy audio data conversion section 99, the compressed audio data 21 from which only the elementary portions are extracted is converted into copy audio data (second audio data) conforming to a compression encoding method, e.g., an MP3 method, and is used for a copying operation.

Lastly, the audio data conversion section 94 outputs the reproduction compatible-audio data and the copy audio data to the recording section 475. Note that when audio data input to the elementary extraction section 97 includes only the elementary portions, the input audio data is output to the reproduction audio data conversion section 98 and the copy audio data conversion section 99 as it is input. In the reproduction audio data conversion section 98 and the copy audio data conversion section 99, if the input audio data including only the elementary portions conforms to an encoding method which is used for conversion, no conversion operations are performed on the input audio data.

The reproduction control information creation section 473 creates, an audio data type 342, audio data link information 343, and an audio data information number 445 with respect to each of the reproduction compatible-audio data and the copy audio data.

The reproduction control information creation section 473 creates a reproduction start time 446, e.g., 0, of audio data and are production end time 447 (reproduction time of the audio data) in the case where a unit of reproduction of each of the reproduction compatible-audio data and the copy audio data is a piece of music.

The reproduction control information creation section 473 also creates a block type 444 which is information for distinguishing the use of audio data created by the audio data conversion section 94. When the block type 444 is the first block type, it is indicated that the created audio data is audio data for use in reproduction (for a first use). When the block type 444 is the second block type, it is indicated that the created audio data is audio data for use in copying (for a second use).

The reproduction control information creation section 473 also creates music information 464 which includes a music reproduction information number 465 for managing audio data included in a piece of music.

The reproduction control information creation section 473 outputs to the recording section 475 the audio data type 342, the audio data link information 343, the audio data information number 445, the reproduction start time 446, the reproduction end time 447, the block type 444, and the music information 464, which are created with respect to the audio data created by the audio data conversion section 94.

The recording section 475 records the reproduction compatible-audio data and the copy audio data, which are output by the audio data conversion section 94, to the audio data file 401 in the information recording medium 476, and also records an output result provided by the reproduction control information creation section 473 to the management information file 402 in the information recording medium 476. Note that the recording section 475 records reproduction compatible-audio data and copy audio data, which represent the same piece of music, as a single audio data portion, and the pieces of music reproduction information, which are associated with both the reproduction compatible-audio data and the copy audio data, as a single music block. These audio data portion and music block are recorded as a set.

When recording the music reproduction information 443, which includes the block type 444, the audio data information number 445, the reproduction start time 446, and the reproduction end time 447, to the information recording medium 476, the recording section 475 records the music reproduction information 443 according to the order of audio data to be reproduced. That is, music reproduction information f or managing audio data to be reproduced first is recorded, and then music reproduction information for managing audio data to be reproduced next is recorded.

When the recording section 475 records music reproduction information, which includes the first block type indicating audio data for use in reproduction, and music reproduction information, which includes the second block type indicating audio data for use in high-speed copying, the music reproduction information including the first block is recorded to the music reproduction information table 441, and then the music reproduction information including the second block type is recorded.

The recording section 475 may record each piece of the reproduction compatible-audio data and the copy audio data as a file in the audio data directory 401' (FIG. 50).

Next, an operation for recording audio data recorded in a CD or a DVD-Audio using the information recording apparatus 471 will be described. The acquisition section 272 acquires audio data input thereto. The audio data acquired by the acquisition section 272 is output to the audio data conversion section 94. In this case, the operation of the audio data conversion section 94 is the same as that of the acquisition section 94 in the case where the EMD data 20 is input to the information recording apparatus 471, and therefore the description thereof is omitted. Note that the copy audio data conversion section 99 does not necessarily convert the compressed audio data 21 into copy audio data. Specifically, the audio data conversion section 94 is only required to output at least reproduction compatible-audio data in a single piece of music to the recording section 475.

In such a manner, the data format for the information recording medium 400 described in "1. Structure of an information recording medium according to Embodiment 5 of the present invention" is obtained.

According to Embodiment 5 of the present invention, it is possible to provide the information recording medium 400 to which the reproduction compatible-audio data and the copy audio data are recorded and in which the management information file 402 can be referred to for these data. A block type is assigned to each of the pieces of music reproduction information associated with the reproduction compatible-audio data and the copy audio data, respectively, which represent the same piece of music, and therefore the same piece of music is not reproduced twice, i.e., the copy audio data is reproduced after the reproduction of the reproduction compatible-audio data, or vice versa.

3. Structure and operation of an information reproducing apparatus according to Embodiment 5 of the present invention Next, an information reproducing apparatus according to Embodiment 5 of the present invention, which reproduces audio data recorded in the information recording medium 400, will be described.

Figure 52:
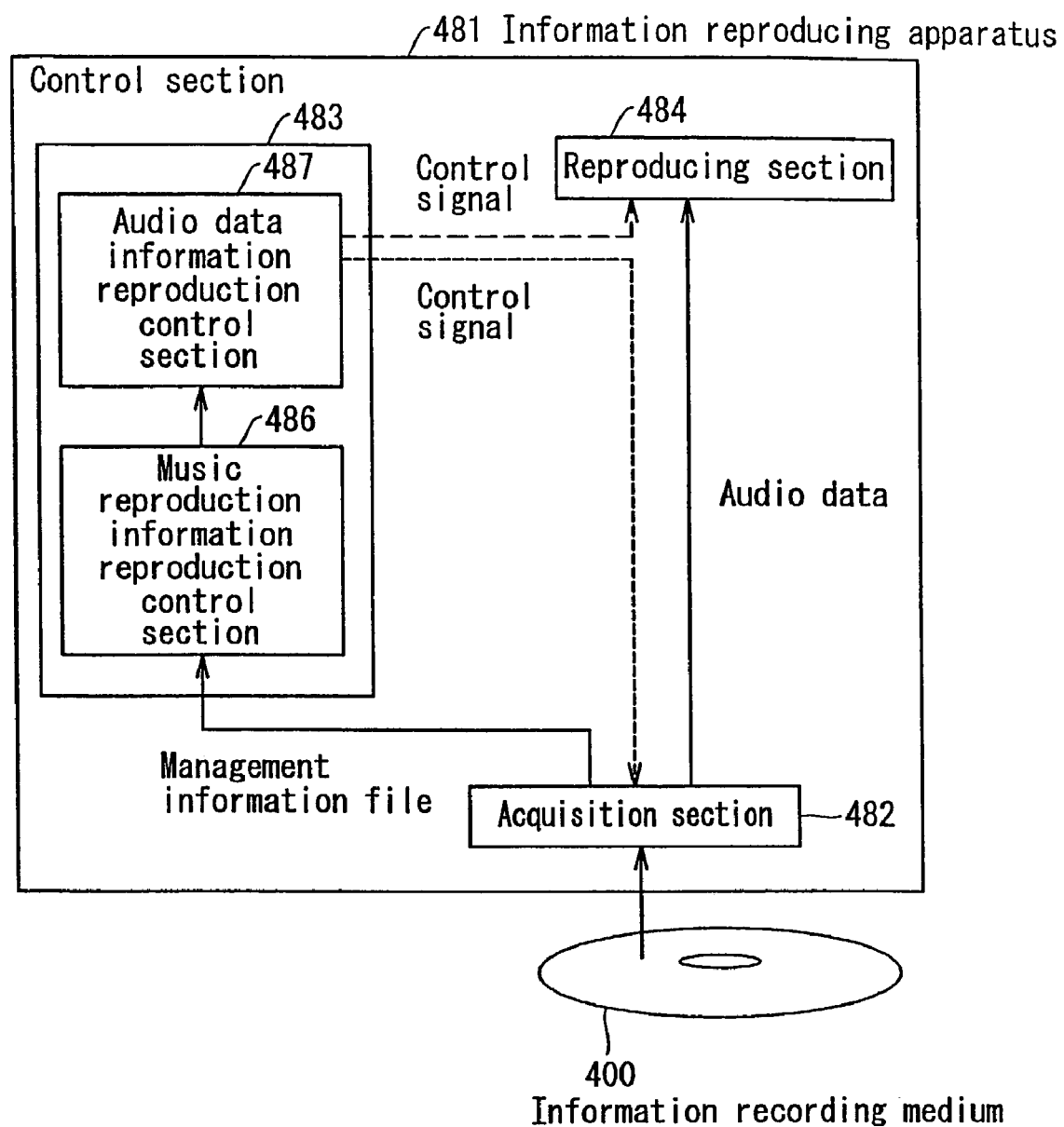
FIG. 52 is a block diagram of an information reproducing apparatus 481 according to Embodiment 5 of the present invention.

FIG. 52 is a block diagram of an information reproducing apparatus 481 according to Embodiment 5 of the present invention. The information reproducing apparatus 481 includes an acquisition section 482, a control section 483, and a reproducing section 484. The control section 483 includes a music reproduction information reproduction control section 486 and an audio data information reproduction control section 487. In this case, the data format of the information recording medium 400 is as shown in FIGS. 44 and 46.

The acquisition section 482 acquires a management information file 402 from the information recording medium 400 and outputs the acquired management information file 402 to the control section 483.

The music reproduction information reproduction control section 486 in the control section 483 decodes the management information file 402 so as to retrieve music reproduction information 443, which is related to the music to be reproduced, from the management information file 402. The music reproduction control information reproduction control section 486 also decodes the block type 444 assigned to the retrieved music reproduction information 443 so as to determine, based on the block type 444, whether audio data managed by the music reproduction information is audio data for use in reproduction or copying.

When the music reproduction information reproduction control section 486 determines that the audio data managed by the retrieved music reproduction information 443 is the audio data for use in reproduction, the audio data information reproduction control section 487 in the control section 483 retrieves audio data information 442 to which audio data information number 445 recorded in the music reproduction information 443 is assigned, from the management information file 402.

The audio data information reproduction control section 487 also decodes the audio data type 342 assigned to the retrieved audio data information 442 so as to determine whether or not audio data managed by the audio data information 442 can be reproduced.

As a result of the determination, when the audio data can be reproduced, the audio data information reproduction control section 487 outputs a control signal to the acquisition section 482 such that the acquisition section 482 acquires, based on the audio data link information 343 associated with the audio data information 442, audio data corresponding to a time period from the reproduction start time 446 to the reproduction end time 447, which are recorded in the music reproduction information 443, and outputs the acquired audio data to the reproducing section 484.

The control section 483 functions as a determination section since it determines, based on the block type 444 included in the acquired management information file 402, whether audio data managed by the music reproduction information 443 is audio data for use in reproduction or audio data for use in copying. Note that it is also possible to set the control section 483 so as to reproduce the audio data for use in copying.

Figure 53:
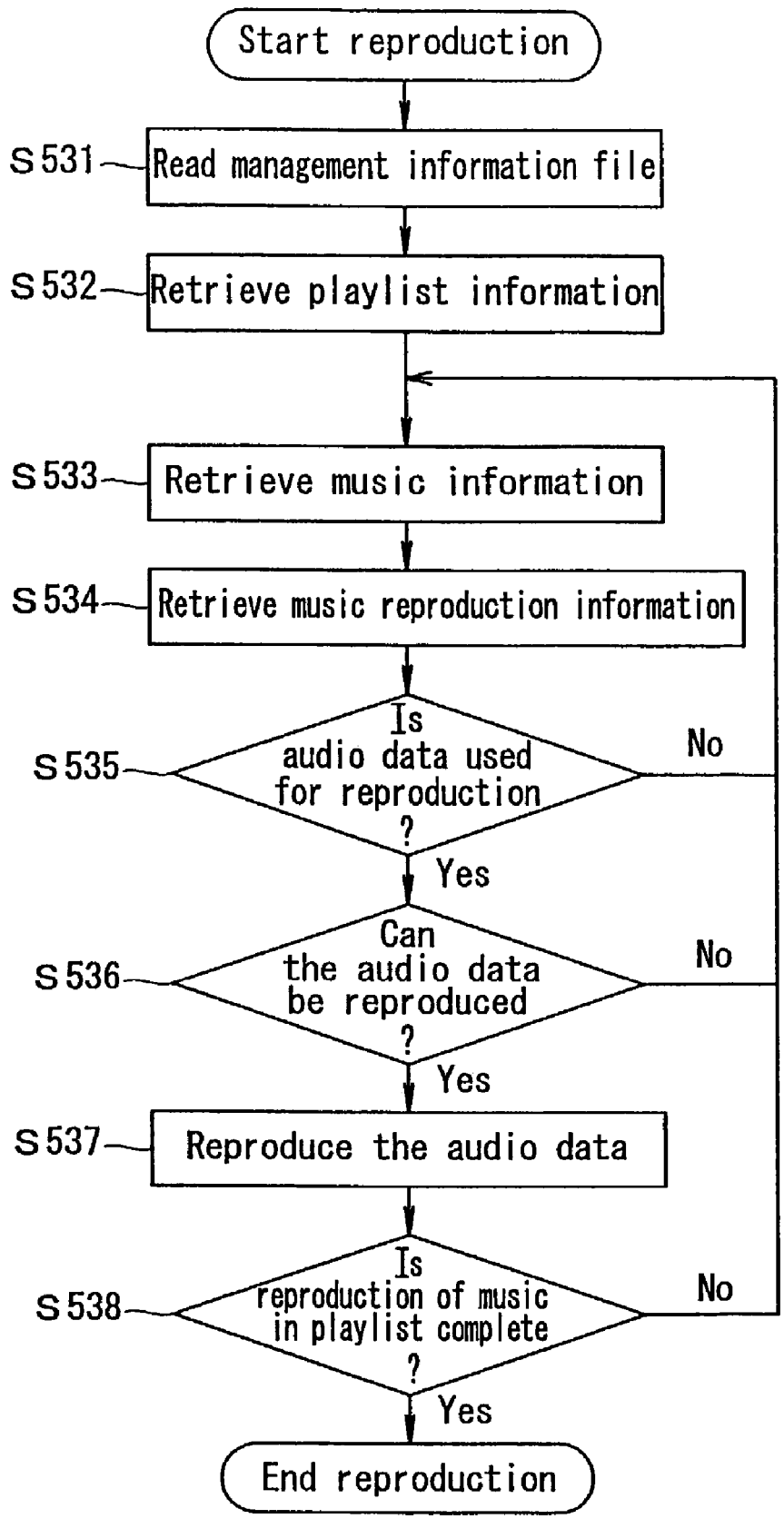
FIG. 53 illustrates the procedure for a reproduction process performed by the information reproducing apparatus 481 of FIG. 52.

FIG. 53 illustrates the procedure for a reproduction process performed by the information reproducing apparatus 481. It is assumed that a user refers to a playlist so as to reproduce audio data for use in reproduction.

At step S531, the management information file 402 is read from the information recording medium 400.

At step S532, playlist information 462 designated by a user is retrieved from the management information file 402. For example, in the case of the playlist information 462 shown in FIG. 47, the first piece of music is the music #1, the second piece of music is the music #2, and the third piece of music is the music #3.

At step S533, music information 464 corresponding to music information number recorded in the retrieved playlist information 462 is retrieved from the music information table 461.

At step S534, music reproduction information associated with a music block corresponding to the audio data for use in reproduction is retrieved based on the music reproduction information number 465 included in the music information 464. In this case, the music reproduction information number of the music #1 is 2, the music reproduction information number of the music #2 is 1 and the music reproduction information number of the music #3 is 2. For example, in the case of reproducing the third piece of music, a number, 4, which is obtained by adding 1 to the sum, 3, of the music reproduction information numbers of the music block included in the pieces of music information before the third piece of music information (i.e., the first and second pieces of music information), i.e., 2 (the first piece of music)+1 (the second piece of music)+1=4, is specified as the first piece of music reproduction information associated with the third piece of music. Thereafter, music reproduction information corresponding to the number of pieces of music reproduction information included in music information associated with the third piece of music is used as music reproduction information for managing audio data associated with the third piece of music. In the example of FIG. 47, the third piece of music includes only a set of a music block and an audio data portion, and therefore the reproduction of audio data included in the playlist is ended after the reproduction of audio data managed by the first music reproduction information associated with the third piece of music.

At step S535, the block type 444 is decoded so as to determine whether or not the audio data associated with the retrieved music reproduction information is audio data for use in reproduction. When the determination result is "YES", the process proceeds to step S536. When the determination result is "NO", the process returns to step S533 and music information is retrieved so as to reproduce the next piece of music.

At step S536, the audio data type 342 is decoded so as to determine whether the audio data for use in reproduction can be reproduced. When the determination result is "YES", the process proceeds to step S537. When the determination result is "NO", the process returns to step S533 and music information is retrieved so as to reproduce the next piece of music.

At step S537, the audio data is reproduced based on the audio data link information 343, the reproduction start time 446, and the reproduction end time 447.

Note that in the case where there are a plurality of music blocks for a piece of music, steps S534 through S537 are repeatedly performed on each music block.

At step S538, whether or not each piece of music to be reproduced, which is recorded in the playlist information 462 is completely reproduced is determined. When the determination result is "YES", the reproduction is complete. When the determination result is "NO", the process returns to step S533 and music information is retrieved so as to reproduce the next piece of music.

Note that at step S535, it is also possible to set copy audio data so as to be used for reproduction. However, in such a case, audio data for use in reproduction is set so as not to be reproduced.

In the case where the user does not use a playlist, the reproduction of music is started from step S533.

According to Embodiment 5 of the present invention, the management information file 402 is decoded so as to reproduce reproduction compatible-audio data, thereby ensuring reproduction compatibility. A block type assigned to music reproduction information associated with each of the reproduction compatible-audio data and the copy audio data, which represent the same piece of music, is decoded, and therefore the same piece of music is not reproduced twice, i.e., the copy audio data is reproduced after the reproduction of the reproduction compatible-audio data, or vice versa.

4. Structure and operation of a copying apparatus according to Embodiment 5 of the present invention Next, a copying apparatus according to Embodiment 5, which copies audio data recorded in the information recording medium 400 into another information recording medium, will be described.

Figure 54:
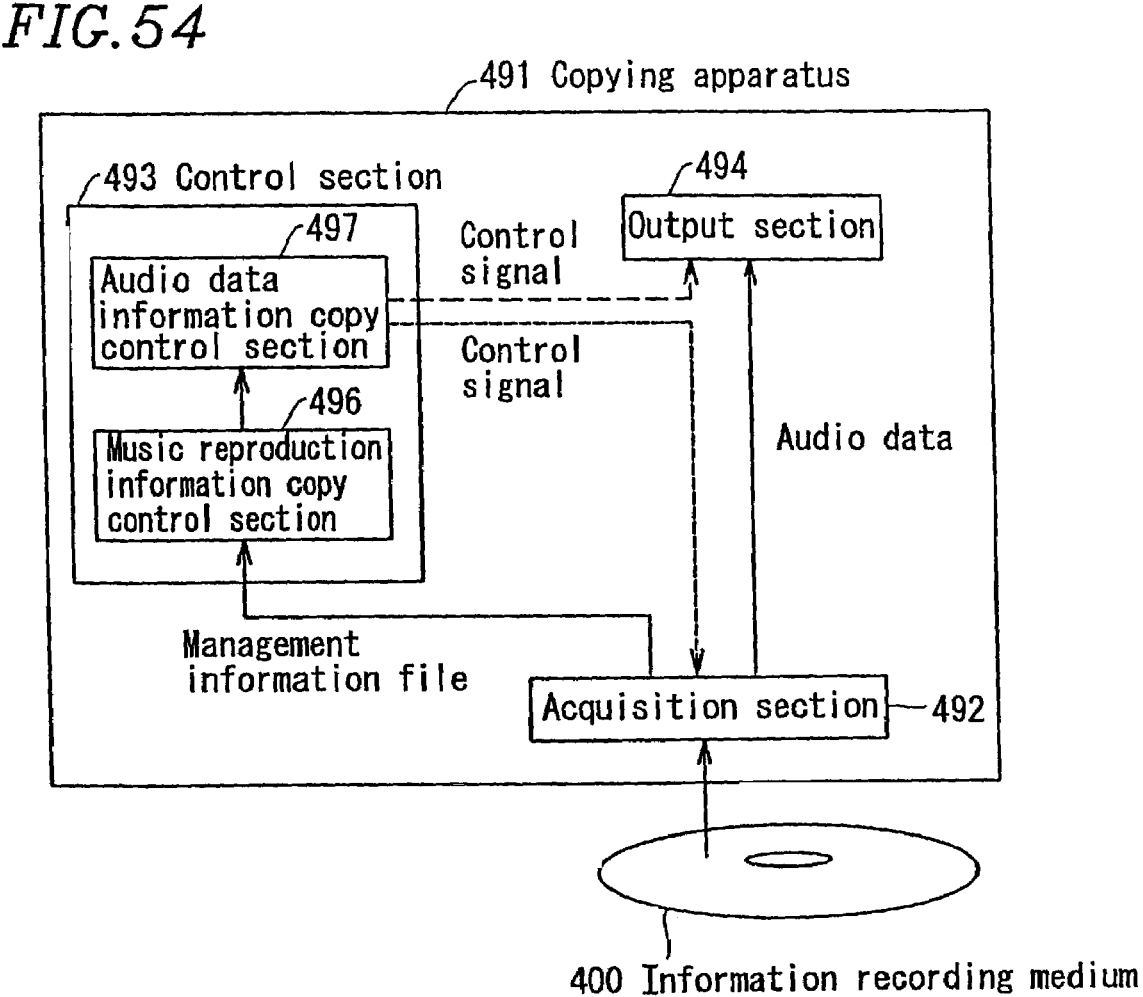
FIG. 54 is a block diagram of a copying apparatus 491 according to Embodiment 5 of the present invention.

FIG. 54 is a block diagram of a copying apparatus 491 according to Embodiment 5 of the present invention. The copying apparatus 491 includes an acquisition section 492, a control section 493, and an output section 494. The control section 493 includes a music reproduction information copy control section 496 and a music data information copy control section 497.

The acquisition section 492 acquires a management information file 402 from the information recording medium 400 and outputs the acquired management information file 402 to the control section 493. In this case, the data format of the management information file 402 is as shown in FIGS. 44 and 46.

The audio data copy control section 496 in the control section 493 decodes the management information file 402 so as to retrieve music reproduction information 443 associated with the music to be copied. The audio data copy control section 496 decodes the block type 444 assigned to the retrieved music reproduction information 443 so as to determine whether or not audio data managed by the music reproduction information 443 is audio data for use in copying.

When the audio data is determined to be audio data for use in copying, the audio data information copy control section 497 retrieves the audio data information 442 to which the audio data information number 445 recorded in the music reproduction information 443 is assigned, from the management information file 402.

When the audio data is not determined to be audio data for use in copying, the audio data information copy control section 497 retrieves music reproduction information to which a block type representing audio data for use in reproduction is assigned. In a similar manner, the audio data information copy control section 497 retrieves audio data information to which an audio data information number recorded in the music reproduction information is assigned, from the management information file 402.

Note that a method for retrieving the music reproduction information 443 associated with the music to be reproduced is the same as that described in "3. Structure and operation of an information reproducing apparatus according to Embodiment 5 of the present invention", and therefore the description thereof is omitted. Moreover, in the case of copying a playlist to another information recording medium, music reproduction information according to the playlist may be retrieved using a method similar to the reproduction method described in "3. Structure and operation of an information reproducing apparatus according to Embodiment 5 of the present invention".

The audio data information copy control section 497 outputs a control signal to the acquisition section 492 such that the acquisition section 492 acquires, based on audio data link information 343 associated with the audio data information 442, audio data corresponding to a time period from the reproduction start time 446 to the reproduction end time 447 which are recorded in the music reproduction information 443, and outputs the acquired audio data to the output section 494.

The audio data information copy control section 497 outputs a control signal to the output section 494 such that the output section 494 outputs audio data to another information recording medium.

The control section 493 functions as a determination section since it determines, based on the block type 444 included in the acquired management information file 402, whether audio data managed by the music reproduction information 443 is audio data for use in reproduction or audio data for use in copying.

According to Embodiment 5 of the present information, the management information file 402 is decoded, and therefore audio data can be copied using any copying apparatus.

In an information recording medium of the present invention, at least a set of an audio data portion and a music block, which represent a piece of music, is recorded. The audio data portion includes first audio data and the music block includes first music reproduction information associated with the first audio data. The first music reproduction information manages the reproduction of the first audio data and includes a first block type which represents that the first audio data is audio data for a first use. The use of audio data recorded in the information recording medium is specified by the block type, and therefore audio data can be reproduced according to the use thereof.

In the case where the audio data portion includes first and second audio data which represent the same piece of music, it is possible to prevent the same piece of music from being reproduced twice based on each block type assigned to music reproduction information for managing the first and second audio data.

According to the present invention, it is possible to record EMD data, which is distributed by a variety of distribution systems, to an information recording medium and ensure reproduction compatibility of the recorded EMD data. Further, it is possible to copy audio data included in the EMD data to another information recording medium without decoding the data format for the EMD data. A user can choose whether to ensure reproduction compatibility or perform long-time recording, and therefore the EMD data can be recorded according to the purpose for which a user uses the information recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording medium in which at least one set of an audio data portion and a music block, which represent a piece of music, and music information for managing the piece of music is recorded, wherein:

the audio data portion includes first audio data;

the music block includes first music reproduction information associated with the first audio data so as to manage reproduction of the first audio data; and the first music reproduction information includes a first block type which indicates that the first audio data for a first use is reproduction compatible-audio data, wherein:

the audio data portion included in at least one set of the at least one set of the audio data portion and the music block further includes second audio data;

the music block included in the at least one set of the at least one set of the audio data portion and the music block further includes second music reproduction information associated with the second audio data so as to manage reproduction of the second audio data; and the second music reproduction information includes a second block type which indicates that the second audio data for a second use is copyable data, which is different from the audio data for a first use, and the music information specifies the number of pieces of music reproduction information for managing audio data corresponding to the piece of music and indicates that the first audio data and the second audio data correspond to the same piece of music.

2. An information recording medium according to claim 1, wherein the music block includes only a piece of the first music reproduction information which includes the first block type.

3. An information recording apparatus comprising:
an acquisition section for acquiring audio data representing a piece of music;
an audio data conversion section for converting the acquired audio data so as to create first audio data and second audio data;
a reproduction control information creation section for creating first music reproduction information which is associated with the first audio data so as to manage reproduction of the first audio data and includes a first block type indicating that the first audio data for a first use is reproduction compatible-audio data, and for creating second music reproduction information which is associated with the second audio data so as to manage reproduction of the second audio data and includes a second block type indicating that the second audio data for a second use is copyable data which is different from the audio data for the first use, and for creating music information for managing the piece of music which specifies the number of pieces of music reproduction information for managing audio data corresponding to the piece of music and indicates that the first audio data and the second audio data correspond to the same piece of music; and
a recording section for recording the first and second audio data as an audio data portion and the first and second music reproduction information as a music block, which makes a set in conjunction with the audio data portion, to an information recording medium.

4. An information reproducing apparatus for reproducing audio data recorded in an information recording medium in which at least one set of an audio data portion and a music block which represent a piece of music is recorded, wherein the audio data portion includes first audio data, the music block includes first music reproduction information, which is associated with the first audio data so as to manage reproduction of the first audio data and includes a first block type indicating that the first audio data for a first use is reproduction compatible-audio data, wherein the audio data portion included in at least one set of the at least one set of the audio data portion and the music block further includes second audio data; the music block included in the at least one set of the at least one set of the audio data portion and the music block further includes second music reproduction information, which is associated with the second audio data so as to manage reproduction of the second audio data and includes a second block type indicating that the second audio data for a second use is copyable data, which is different from the audio data for the first use, and the music information specifies the number of pieces of music reproduction information for managing audio data corresponding to the piece of music and indicates that the first audio data and the second audio data correspond to the same piece of music, the information reproducing apparatus comprising:
an acquisition section for acquiring the music information, the first audio data and the first music reproduction information;
a determination section for determining, based on the first block type included in the acquired first music reproduction information, whether the first audio data is the audio data for the first use or audio data for the second use; and
a reproducing section for reproducing the first audio data based on the determination result.

5. A copying apparatus for copying audio data recorded in an information recording medium in which at least one set of an audio data portion and a music block, which represent a piece of music, and music information for managing the piece of music is recorded, to another information recording medium, which is different from the information recording medium, wherein the audio data portion includes first audio data and the music block includes first music reproduction information, which is associated with the first audio data so as to manage reproduction of the first audio data and includes a first block type indicating that the first audio data for a first use is copyable data, wherein the audio data portion included in at least one set of the at least one set of the audio data portion and the music block further includes second audio data; the music block included in the at least one set of the at least one set of the audio data portion and the music block further includes second music reproduction information, which is associated with the second audio data so as to manage reproduction of the second audio data and includes a second block type indicating that the second audio data for a second use is reproduction compatible-audio data, which is different from the audio data for the first use, and the music information specifies the number of pieces of music reproduction information for managing audio data corresponding to the piece of music and indicates that the first audio data and the second audio data correspond to the same piece of music, the copying apparatus comprising:
an acquisition section for acquiring the music information, the first audio data and the first music reproduction information;
a determination section for determining, based on the first block type included in the acquired first music reproduction information, whether the first audio data is the audio data for the first use or audio data for the second use; and
an output section for outputting the first audio data based on the determination result.

* * * * *